(12) United States Patent
Uchimura

(10) Patent No.: US 11,395,018 B2
(45) Date of Patent: Jul. 19, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/311,585

(22) PCT Filed: Jun. 30, 2017

(86) PCT No.: PCT/JP2017/024125
§ 371 (c)(1),
(2) Date: Dec. 19, 2018

(87) PCT Pub. No.: WO2018/016294
PCT Pub. Date: Jan. 25, 2018

(65) Prior Publication Data
US 2019/0191192 A1    Jun. 20, 2019

(30) Foreign Application Priority Data
Jul. 20, 2016  (JP) .............................. JP2016-142694

(51) Int. Cl.
*H04N 21/2362*  (2011.01)
*G11B 20/12*    (2006.01)
(Continued)

(52) U.S. Cl.
CPC ......... *H04N 21/2362* (2013.01); *G06F 12/00* (2013.01); *G11B 20/10* (2013.01);
(Continued)

(58) Field of Classification Search
CPC .................................................. H04N 21/2362
(Continued)

(56) References Cited

U.S. PATENT DOCUMENTS

2005/0135787 A1* 6/2005 Yoo ...................... G11B 27/105
                                                      386/230
2008/0125302 A1* 5/2008 Maxwell ............... B04B 11/082
                                                      494/37
(Continued)

FOREIGN PATENT DOCUMENTS

JP    2004-127396 A    4/2004
JP    2006-217322 A    8/2006
(Continued)

OTHER PUBLICATIONS

Blu-ray Disc Association, Application Definition Blu-ray Disc Format, BD-J Baseline Application and Logical Model Definition for BD-ROM, Mar. 2005, pp. 1-45.
(Continued)

*Primary Examiner* — Daniel T Tekle
(74) *Attorney, Agent, or Firm* — Paratus Law Group, PLLC

(57) ABSTRACT

To enable MMT format data to be recorded as BDAV format data in a medium, and a list of video-recorded contents to be displayed and reproduced by an application for BDAV. Data to be recorded in a playlist or clip information file defined in a BDAV format is extracted from MMT format data input on a broadcast wave or the like thereby to generate a data file thereof. For example, data applied to display a list of video-recorded contents is extracted from MMT-SI or TLV-SI in the MMT format data and recorded in the playlist or clip information file.

19 Claims, 44 Drawing Sheets

(51) Int. Cl.

| | | |
|---|---|---|
| *G11B 27/02* | (2006.01) | |
| *H04N 5/92* | (2006.01) | |
| *G11B 20/10* | (2006.01) | |
| *G06F 12/00* | (2006.01) | |
| *H04N 21/4402* | (2011.01) | |
| *G11B 27/00* | (2006.01) | |
| *H04N 5/76* | (2006.01) | |
| *H04N 21/435* | (2011.01) | |
| *H04N 5/91* | (2006.01) | |
| *G11B 27/32* | (2006.01) | |

(52) U.S. Cl.
CPC .............. *G11B 20/12* (2013.01); *G11B 27/00* (2013.01); *G11B 27/02* (2013.01); *G11B 27/329* (2013.01); *H04N 5/76* (2013.01); *H04N 5/91* (2013.01); *H04N 5/92* (2013.01); *H04N 21/435* (2013.01); *H04N 21/4402* (2013.01)

(58) Field of Classification Search
USPC ........................................................ 386/217
See application file for complete search history.

(56) References Cited

U.S. PATENT DOCUMENTS

| | | | |
|---|---|---|---|
| 2008/0152302 A1* | 6/2008 | Kido | H04N 5/76 386/290 |
| 2015/0189337 A1* | 7/2015 | Pedan | H04L 65/4084 370/474 |
| 2018/0227625 A1* | 8/2018 | Yoshizawa | H04N 21/4334 |

FOREIGN PATENT DOCUMENTS

| | | |
|---|---|---|
| JP | WO 2006/121049 A1 | 11/2006 |
| JP | 2011-023071 A | 2/2011 |
| JP | 2013-115552 A | 6/2013 |
| JP | 2016-096512 A | 5/2016 |
| JP | 2016-103745 A | 6/2016 |
| JP | WO 2016/084591 A1 | 6/2016 |
| WO | WO 2006/121049 A1 | 11/2006 |
| WO | WO 2016/084591 A1 | 6/2016 |

OTHER PUBLICATIONS

Blu-ray Disc Association, White paper Blue-ray Disc Format, 2.B Audio Visual Application Format Specifications for BD-ROM, Mar. 2005, pp. 1-35.

* cited by examiner

FIG. 2

| TIME INFORMATION | VIDEO | AUDIO | SUBTITLE | MMT-SI | APPLICATION | Content download, etc. | | | |
|---|---|---|---|---|---|---|---|---|---|
| NTP | HEVC | AAC | TTML | | HTML5 | File delivery method | | | |
| | | | MMT | | | | UDP/IP | TLV | PHY |
| TLV-SI | | | | | | | | | |

FIG. 9

| TITLE NAME | VIDEO-RECORD TIME | BROADCASTING STATION | ADDITIONAL INFORMATION 1 (PROGRAM GENRE) | ADDITIONAL INFORMATION 2 (VIDEO INFORMATION) |
|---|---|---|---|---|
| A | 7/1 13:00-16:00 | 7ch | GENRE: DOCUMENTARY | HEVC 3840x2160 |
| B | 7/2 19:00-21:00 | 4ch | GENRE: DRAMA | HEVC 3840x2160 |
| C | | | | |
| D | | | | |
| .. | .. | .. | .. | .. |

FIG. 10

| Syntax | No. of bits | Mnemonic |
|---|---|---|
| PlayList() { | | |
|   version number | 32 | uimsbf |
|   length | | |
|   Playlist_type | 12 | bslbf |
|   CPI_type | 4 | bslbf |
|   reserved | 16 | uimsbf |
|   UIAPPInfoPlayList() | | |
|   number_of_PlayItems | 16 | uimsbf |
|   if (<Virtual-PlayList> && PL_CPI_type==1) { | 16 | bslbf |
|     number_of_SubPlayItems | | |
|   }else{ | | |
|     reserved_for_word_align | | |
|   } | | |
|   for (PlayItem_id=0; | | |
|     PlayItem_id<number_of_PlayItems; | | |
|     PlayItem_id++) { | | |
|     PlayItem() | | |
|   } | | |
|   if (<Virtual-PlayList> && PL_CPI_type==1) { | | |
|     for (i = 0; i < number_of_SubPlayItems, i++) { | | |
|       SubPlayItem() | | |
|     } | | |
|   } | | |
| } | | |

101 {  (bracket grouping UIAPPInfoPlayList())

FIG. 11

| Syntax | No. of bits | Mnemonic |
|---|---|---|
| UIAPPInfoPlayList() { | | |
| length | 32 | uimsbf |
| reserved_for_future_use | 16 | bslbf |
| PlayList_character_set | 8 | uimsbf |
| reserved_for_word_align | 4 | bslbf |
| Playback_protect_flag | 1 | bslbf |
| write_protect_flag | 1 | bslbf |
| Is_played_flag | 1 | bslbf |
| Is_edited_flag | 1 | bslbf |
| time_zone | 8 | bslbf |
| reserved_for_word_align | 8 | bslbf |
| record_time_and_date  (P1) VIDEO-RECORD TIME/DATE | 4*14 | bslbf |
| Playlist_duration | 4*6 | bslbf |
| maker_ID | 16 | uimsbf |
| maker_model_code  (P2) CHANNEL NUMBER | 16 | uimsbf |
| channel_number | 16 | buimsbf |
| reserved_fo_word_align | 8 | bslbf |
| channel_name_length  (P3) CHANNEL NAME | 8 | uimsbf |
| channel_name | 8*20 | bslbf |
| Playlist_name_length  (P4) VIDEO-RECORDED PROGRAM NAME | 8 | uimsbf |
| Playlist_name | 8*255 | bslbf |
| PlayList_detail_length  (P5) VIDEO-RECORDED PROGRAM DETAILS | 16 | uimsbf |
| PlayList_detail | 8*1200 | bslbf |
| } | | |

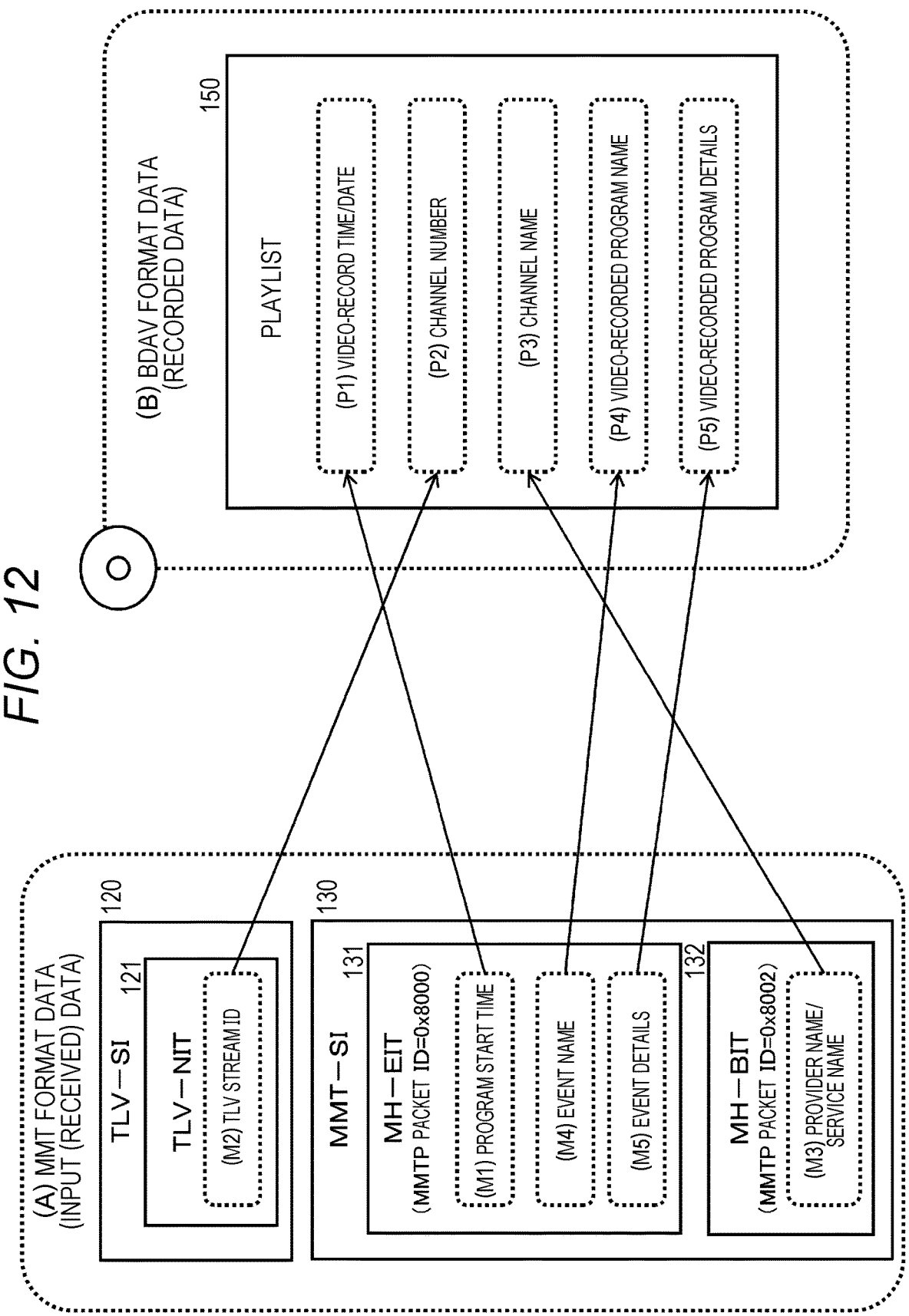

FIG. 13

| Syntax | No. of bits | Mnemonic |
|---|---|---|
| MH-Event_Information_Table (){ | | |
| table_id | 8 | uimsbf |
| section_syntax_indicator | 1 | bslbf |
| reserved_future_use | 1 | bslbf |
| reserved | 2 | bslbf |
| section_length | 12 | uimsbf |
| service_id | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| tlv_stream_id | 16 | uimsbf |
| original_network_id | 16 | uimsbf |
| segment_last_section_number | 8 | uimsbf |
| last_table_id | 8 | uimsbf |
| for(i=0; i<N; i++){ | | |
| event_id | 16 | uimsbf |
| start_time | 40 | bslbf |
| duration | 24 | uimsbf |
| running_status | 3 | uimsbf |
| free_CA_mode | 1 | bslbf |
| descriptors_loop_length | 12 | uimsbf |
| for(i=0; i<N; i++){ | | |
| descriptor () | | |
| } | | |
| } | | |
| CRC_32 | 32 | rpchof |
| } | | |

(2)
(M1) PROGRAM START TIME
=
(P1) VIDEO-RECORD TIME/DATE (1) EVENT ID (PROGRAM ID)
(3) PROGRAM DURATION
160 EVENT (PROGRAM) INFORMATION RECORDING REGION
(4) CHARGED OR FREE
(5) PROGRAM DETAIL INFORMATION

FIG. 14

| Syntax | No. of bits | Mnemonic |
|---|---|---|
| TLV Network Information Table () { | | |
|   table_id | 8 | uimsbf |
|   section_syntax_indicator | 1 | bslbf |
|   '1' | 1 | bslbf |
|   '11' | 2 | bslbf |
|   section_length | 12 | uimsbf |
|   network_id | 16 | uimsbf |
|   '11' | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   network_descriptors_length | 12 | uimsbf |
|   for(i=0; i<N; i++) { | | |
|     descriptor () | | |
|   } | | |
|   reserved_future_use | 4 | bslbf |
|   TLV_stream_loop_length | 12 | uimsbf |
|   for(i=0; i<N; i++) { | | |
|     tlv_stream_id | 16 | uimsbf |
|     original_network_id | 16 | uimsbf |
|     reserved_future_use | 4 | bslbf |
|     tlv_stream_descriptors_length | 12 | uimsbf |
|     for(j=0; j<N; j++) { | | |
|       descriptor () | | |
|     } | | |
|   } | | |
|   CRC_32 | 32 | rpchof |
| } | | |

(M2) TLV STREAM ID = (P2) CHANNEL NUMBER

162 NETWORK INFORMATION RECORDING REGION

FIG. 15

| Syntax | No. of bits | Mnemonic |
|---|---|---|
| MH-Broadcaster_Name_Descriptor (){ | | |
|   descriptor_tag | 16 | uimsbf |
|   descriptor_length | 8 | uimsbf |
|   for(i=0; i<N; i++){ | | |
|     char | 8 | uimsbf |
|   } | | |
| } | | |

(M3) PROVIDER NAME/SERVICE NAME
=
(P3) CHANNEL NAME

FIG. 16

| Syntax | No. of bits | Mnemonic |
|---|---|---|
| MH-Short_Event_Descriptor (){ | | |
|   descriptor_tag | 16 | uimsbf |
|   descriptor_length | 8 | uimsbf |
|   ISO_639_language_code | 24 | bslbf |
|   event_name_length | 8 | uimsbf |
|   for (i=0; i<event_name_length; i++){ | | |
|     event_name_char | 8 | uimsbf |
|   } | | |
|   text_length | 8 | uimsbf |
|   for (i=0; i<text_length; i++){ | | |
|     text_char | 8 | uimsbf |
|   } | | |
| } | | |

(M4) EVENT NAME = (P4) VIDEO-RECORDED PROGRAM NAME (M5) EVEN DETAILS = (P5) VIDEO-RECORDED PROGRAM DETAILS

FIG. 17

| Syntax | No. of bits | Mnemonic |
|---|---|---|
| zzzzz. clpi{ | | |
|   type_Indicator | 8*4 | bslbf |
|   version_number | 8*4 | bslbf |
|   SequenceInfo_start_address | 32 | uimsbf |
|   ProgramInfo_start_address | 32 | uimsbf |
|   CPI_start_address | 32 | uimsbf |
|   ClipMark_start_address | 32 | uimsbf |
|   ExtensionData_start_address | 32 | uimsbf |
|   reserved | 96 | bslbf |
|   ClipInfo() | | |
|   for(i=0;i<N1;i++){ | | |
|     padding_word | 16 | bslbf |
|   } | | |
|   SequenceInfo() | | |
|   for(i=0;i<N2;i++){ | | |
|     padding_word | 16 | bslbf |
|   } | | |
|   ProgramInfo() | | |
|   for(i=0;i<N3;i++){ | | |
|     padding_word | 16 | bslbf |
|   } | | |
|   CPI() | | |
|   for(i=0;i<N4;i++){ | | |
|     padding_word | 16 | bslbf |
|   } | | |
|   ClipMark() | | |
|   for(i=0;i<N5;i++){ | | |
|     padding_word | 16 | bslbf |
|   } | | |
|   ExtensionData() | | |
|   for(i=0;i<N6;i++){ | | |
|     padding_word | 16 | bslbf |
|   } | | |
| } | | |

| Syntax | No. of bits | Mnemonic |
|---|---|---|
| ProgramInfo() { | | |
|   length | 32 | uimsbf |
|   reserved_for_word_align | 8 | bslbf |
|   num_of_program_sequences | 8 | uimsbf |
|   for(i=0; i<num_of_program_sequences; i++){ | | |
|     SPN_program_sequence_start[i] | 32 | uimsbf |
|     program_map_PID[i] | 16 | bslbf |
|     num_of_streams_in_ps[i] | 8 | uimsbf |
|     num_of_groups[i] | 8 | uimsbf |
|     for (stream_index=0; stream_index < num_of_streams_in_ps[i]; stream_index++) { | | |
|       stream_PID[i][stream_index] | 16 | uimsbf |
|       StreamCodingInfo(i, stream_index) | | |
|     } | | |
|     if (num_of_groups[i] > 1) { | | |
|       for(j=0; j<num_of_groups[i]; j++){ | | |
|         num_of_streams_in_group[i][j] | 8 | uimsbf |
|         for (k=0; k<num_of_streams_in_group[i][j];k++) | | |
|           ref_to_stream_index[i][j][k] | 8 | uimsbf |
|         } | | |
|       } | | |
|       if (num_of_streams_in_group[i][j]%2==0) { | | |
|         reserved_for_word_align | 8 | bslbf |
|       } | | |
|     } | | |
|   } | | |
| } | | |

FIG. 19

| Syntax | No. of bits | Mnemonic |
|---|---|---|
| StreamCodingInfo(i, stream_index){ | | |
|   length | 8 | bslbf |
|   stream_coding_type | 8 | uimsbf |
|   if(stream_coding_type==0x01 \|\| | | |
|     stream_coding_type==0x02 \|\| | | |
|     stream_coding_type==0x1B){ | | |
|     video_format | 4 | uimsbf |
|     frame_rate | 4 | uimsbf |
|     aspect_ratio | 4 | uimsbf |
|     reserved_fo_word_align | 2 | bslbf |
|     cc_flag | 1 | uimsbf |
|     original_video_format_flag | 1 | bslbf |
|     if(original_video_format_flag==1{ | | |
|       original_video_format | 4 | uimsbf |
|       original_aspect_ratio | 4 | uimsbf |
|       reserved_for_word_align | 8 | bslbf |
|     } | | |
|   }else if(stream_coding_type==0x03 \|\| | | |
|     stream_coding_type==0x04 \|\| | | |
|     stream_coding_type==0x0F \|\| | | |
|     stream_coding_type==0x80 \|\| | | |
|     stream_coding_type==0x81){ | | |
|     audio_presentation_type | 4 | uimsbf |
|     sampling_frequency | 4 | uimsbf |
|     reserve_for_word_align | 8 | bslbf |
|   }else{ | | |
|     padding_word | | |
|   } | | |
| } | | |

221 — (brace covering upper section)
222 — (brace covering middle section)
223 — HEVC CODED DATA-RELATED INFORMATION RECORDING REGION
224 — MPEG-4-AAC, ALS CODED DATA-RELATED INFORMATION RECORDING REGION

FIG. 20

| | |
|---|---|
| 0x00 | reserved for future use |
| 0x01 | MPEG-1 video stream |
| 0x02 | MPEG-2 video stream or MPEG-1 constrained parameter video stream |
| 0x03 | MPEG-1 audio |
| 0x04 | MPEG-2 multi-channel audio, backward compatible to MPEG-1 |
| 0x05 | ITU-T Rec.H.222.0\|ISO/IEC 13818-1 private sections |
| 0x06 | Teletext defined in SESF/DVB or Subtitle defined in ISDB or PES packets containing streaming, synchronized data defined in ATSC or ITU-T Rec.H.222.0\|ISO/IEC 13818-1 PES packets containing private data |
| 0x07 | ISO/IEC 13522 MHEG |
| 0x08 | ITU-T Rec.H.222.0\|ISO/IEC 13818-1 Annex A DSM CC |
| 0x09 | ITU-T Rec.H.222.1 |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | ISO/IEC 13818-1 auxiliary |
| 0x0F | MPEG-2 AAC audio with ADTS transport syntax |
| 0x10 - 0x13 | reserved for future use |
| 0x14 | DSM-CC sections containing non-streaming, synchronized data defined in ATSC |
| 0x15 - 0x1A | reserved for future use |
| 0x1B | MPEG-4 AVC video stream |
| 0x1C - 0x7F | reserved for future use |
| 0x80 | SESF LPCM audio or HDMV LPCM audio |
| 0x81 | Dolby AC-3 audio |
| 0x82 - 0x8F | reserved for future use |
| 0x90 | Presentation Graphics stream |
| 0x91 - 0x94 | reserved for future use |
| 0x95 | Sections conveying Data Service Table, Network Resources Table defined in ATSC |
| 0x96 - 0xC1 | reserved for future use |
| 0xC2 | PES packets containing streaming, synchronous data defined in ATSC |
| 0xC3 | Tip data stream |
| 0xC4 - 0xFF | reserved for future use |

0x10=MPEG-4 AAC audio with LATM/LOAS

0x11=MPEG-4 ALS with LATM/LOAS

0x24=HEVC

FIG. 21

(a) DATA RECORDED IN HEVC CODED DATA-RELATED INFORMATION RECORDING REGION 223

```
If (stream_coding_type==0x24) == HEVC
{
    video_format
    frame_rate
    aspect_ratio
    video_transfer_characteristics
    cc_flag
    reserved
    original_video_format_flag
    if (original_video_format_flag==1){
        original_video_format
        original_aspect_ratio
        original_video_transfer_characteristics
    }
    reserved for future use
}
```

(b) DEFINITION OF Video_transfer_characteristics (VIDEO SIGNAL TRANSFER CHARACTERISTICS)

| Video_transfer_characteristics (VIDEO SIGNAL TRANSFER CHARACTERISTICS) | MEANING |
|---|---|
| 0 | NOT DESIGNATED |
| 1 | transfer_characteristics=1 OF VUI (Rec. ITU-R BT. 709-5) |
| 2 | transfer_characteristics=11 OF VUI (IEC 61966-2-4) |
| 3 | transfer_characteristics=14 OF VUI (Rec. ITU-R BT. 2020) |
| 4 | transfer_characteristics=16 OF VUI (SMPTE ST 2084) |
| 5 | transfer_characteristics=18 OF VUI (ARIB STD-B607) |
| 6-15 | RESERVE |

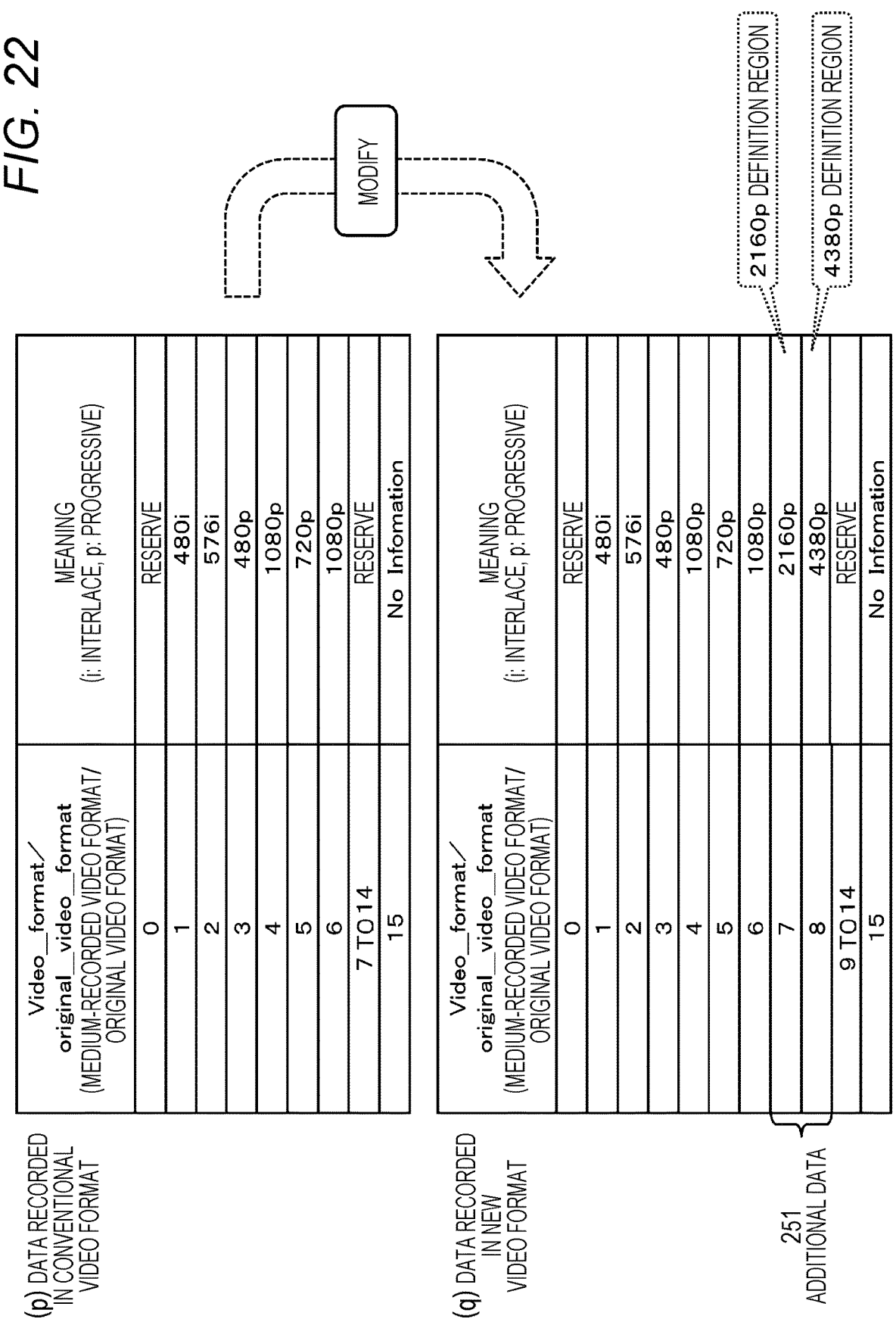

(p) DATA RECORDED AT CONVENTIONAL FRAME RATE

| frame_rate | MEANING (Hz) |
|---|---|
| 0 | RESERVE |
| 1 | 24 000/1001 (23.976···) |
| 2 | 24 |
| 3 | 25 |
| 4 | 30 000/1001 (29.97···) |
| 5 | 30 |
| 6 | 50 |
| 7 | 60 000/1001 (59.94···) |
| 8 | 60 |
| 9 TO 14 | RESERVE |
| 15 | No Information |

(q) DATA RECORDED AT NEW FRAME RATE

| frame_rate | MEANING (Hz) |
|---|---|
| 0 | RESERVE |
| 1 | 24 000/1001 (23.976···) |
| 2 | 24 |
| 3 | 25 |
| 4 | 30 000/1001 (29.97···) |
| 5 | 30 |
| 6 | 50 |
| 7 | 60 000/1001 (59.94···) |
| 8 | 60 |
| 9 | 120 000/1001 (119.94···) |
| 10 | 120 |
| 15 | No Information |

252 ADDITIONAL DATA

FIG. 24

| aspect_ratio/ original_asoect_ratio (MEDIUM-RECORDED VIDEO ASPECT RATIO/ ORIGINAL VIDEO ASPECT RATIO) | MEANING |
|---|---|
| 0 | RESERVE |
| 1 | RESERVE |
| 2 | 4:3 |
| 3 | 16:9 |
| 4 | 2.21:1 |
| 5-14 | RESERVE |
| 15 | No Infomation |

FIG. 25

(a) AUDIO TYPE INFORMATION RECORDING DATA

| audio_presentation_type (AUDIO TYPE INFORMATION) | MEANING |
| --- | --- |
| 0 | reserved for future use |
| 1 | single mono channel |
| 2 | dual mono channel |
| 3 | stereo(2-channel) |
| 4 | multi-lingual |
| 5 | surround sound |
| 6 | multi-channel |
| 7-12 | reserved for future use |
| 13 | audio description for the virtually impaired |
| 14 | audio for the hard of hearing |
| 15 | No Infomation |

(b) SAMPLING FREQUENCY RECORDING DATA

| sampling_frequency (SAMPLING FREQUENCY) | MEANING |
| --- | --- |
| 0 | reserved for future use |
| 1 | 48kHz |
| 2 | 44.1kHz |
| 3 | 32kHz |
| 4 | 96kHz |
| 5 | 192kHz |
| 6-14 | reserved for future use |
| 15 | No Information |

FIG. 27

| Syntax | No. of bits | Mnemonic |
|---|---|---|
| MMT_Package_Table () { | | |
|   table_id | 8 | uimsbf |
|   version | 8 | uimsbf |
|   length | 16 | uimsbf |
|   reserved | 6 | bslbf |
|   MPT_mode | 2 | bslbf |
|   MMT_package_id_length | 8 | uimsbf |
|   for (i=0; i<N; i++) { | | |
|     MMT_package_id_byte | 8 | bslbf |
|   } | | |
|   MPT_descriptors_length | 16 | uimsbf |
|   for ( i=0; i<N; i++) { | | |
|     MPT_descriptors_byte | 8 | bslbf |
|   } | | |
|   number_of_assets | 8 | uimsbf |
|   for (i=0; i<N; i++) { | | |
|     identifier_type | 8 | uimsbf |
|     asset_id_scheme | 32 | uimsbf |
|     asset_id_length | 8 | uimsbf |
|     for (j=0; j<M; j++) { | | |
|       asset_id_byte | 8 | uimsbf |
|     } | | |
|     asset_type  ······· ASSET TYPE | 32 | char |
|     reserved | 7 | bslbf |
|     asset_clock_relation_flag | 1 | bslbf |
|     location_count | 8 | uimsbf |
|     for (j=0; j<M; j++) { | | |
|       MMT_general_location_info () | | |
|     } | | |
|     asset_descriptors_length | 16 | uimsbf |
|     for (j=0; j<M; j++) { | | |
|       asset_descriptors_byte ······· ASSET DESCRIPTOR | 8 | bslbf |
|     } | | |
|   } | | |
| } | | |

FIG. 28

| CHARACTERS | MEANING OF ASSET TYPE |
|---|---|
| hvc1 | HEVC DEFINED IN ITU-T RECOMMENDED H.265 |
| mp4a | ISO/IEC 14496-3 AUDIO |
| stpp | TIMED TEXT (SUBTITLE/CHARACTER SUPERIMPOSITION) |
| aapp | APPLICATION |
| asgd | SYNCHRONOUS GENERAL-PURPOSE DATA |
| aagd | ASYNCHRONOUS GENERAL-PURPOSE DATA |

FIG. 29

(1) VIDEO INFORMATION RECORDED AS ASSET DESCRIPTOR WITH ASSET TYPE OF VIDEO (HEVC)

| Syntax | No. of bits | Mnemonic |
|---|---|---|
| Video_Component_Descriptor (){ | | |
|   descriptor_tag | 16 | uimsbf |
|   descriptor_length | 8 | uimsbf |
|   video_resolution (M6) RESOLUTION | 4 | uimsbf |
|   video_aspect_ratio (M9) ASPECT RATIO | 4 | uimsbf |
|   video_scan_flag (M7) OUTPUT FORMAT (SCAN FLAG (INTERLACE or PROGRESSIVE)) | 1 | bslbf |
|   reserved | 2 | bslbf |
|   video_frame_rate (M8) FRAME RATE | 5 | uimsbf |
|   component_tag | 16 | uimsbf |
|   video transfer characteristics (M10) VIDEO SIGNAL TRANSFER CHARACTERISTICS | 4 | uimsbf |
|   reserved | 4 | bslbf |
|   ISO_639_language_code | 24 | bslbf |
|   for (i=0; i<N; i++) { | | |
|     text_char | 8 | uimsbf |
|   } | | |
| } | | |

FIG. 30

(M6) RESOLUTION INFORMATION RECORDED IN MPT

| VIDEO SIGNAL RESOLUTION | MEANING |
|---|---|
| 0 | NOT DESIGNATED |
| 1 | 180 |
| 2 | 240 |
| 3 | 480(525) |
| 4 | 720(750) |
| 5 | 1080(1125) |
| 6 | 2160 |
| 7 | 4320 |
| 8-15 | RESERVE |

FIG. 31

(M8) FRAME RATE INFORMATION RECORDED IN MPT

| VIDEO FRAME RATE | MEANING |
|---|---|
| 0 | NOT DESIGNATED |
| 1 | 15 |
| 2 | 24/1.001 |
| 3 | 24 |
| 4 | 25 |
| 5 | 30/1.001 |
| 6 | 30 |
| 7 | 50 |
| 8 | 60/1.001 |
| 9 | 60 |
| 10 | 100 |
| 11 | 120/1.001 |
| 12 | 120 |
| 13-31 | RESERVE |

FIG. 32

(M9) ASPECT RATIO INFORMATION RECORDED IN MPT

| VIDEO SIGNAL ASPECT RATIO | MEANING |
|---|---|
| 0 | NOT DESIGNATED |
| 1 | 4:3 |
| 2 | 16:9 WITH PAN VECTOR |
| 3 | 16:9 WITHOUT PAN VECTOR |
| 4 | >16:9 |
| 5-15 | RESERVE |

FIG. 33

(M10) VIDEO SIGNAL TRANSFER CHARACTERISTICS INFORMATION RECORDED IN MPT

| VIDEO SIGNAL TRANSFER CHARACTERISTICS | MEANING |
|---|---|
| 0 | NOT DESIGNATED |
| 1 | transfer_charactristics=1 OF VUI (Rec. ITU-R BT. 709-5) |
| 2 | transfer_charactristics=11 OF VUI (IEC 61066-2-4) |
| 3 | transfer_charactristics=14 OF VUI (Rec. ITU-R BT. 2020) |
| 4 | transfer_charactristics=16 OF VUI (SMPTE ST 2084) |
| 5 | transfer_charactristics=18 OF VUI (ARIB STD-B67) |
| 6-15 | RESERVE |

FIG. 34

(2) AUDIO INFORMATION RECORDED AS ASSET DESCRIPTOR WITH ASSET TYPE OF AUDIO

| Syntax | No. of bits | Mnemonic |
|---|---|---|
| MH-Audio_Component_Descriptor (){ | | |
|   descriptor_tag | 16 | uimsbf |
|   descriptor_length | 16 | uimsbf |
|   reserved_future_use | 4 | bslbf |
|   stream_content — (M11) STREAM CONTENTS | 4 | uimsbf |
|   component_type — (M12) COMPONENT TYPE | 8 | uimsbf |
|   component_tag | 16 | uimsbf |
|   stream_type | 8 | uimsbf |
|   simulcast_group_tag | 8 | bslbf |
|   ES_multi_lingual_flag | 1 | bslbf |
|   main_component_flag | 1 | bslbf |
|   quality_indicator | 2 | bslbf |
|   sampling_rate — (M13) SAMPLING FREQUENCY | 3 | uimsbf |
|   reserved_future_use | 1 | bslbf |
|   ISO_639_language_code | 24 | bslbf |
|   if (ES_multi_lingual_flag == 1){ | | |
|     ISO_639_language_code_2 | 24 | bslbf |
|   } | | |
|   for(i=0; i<N; i++){ | | |
|     text_char | 8 | uimsbf |
|   } | | |
| } | | |

FIG. 35

(M11) STREAM CONTENT INFORMATION RECORDED IN MPT

| COMPONENT CONTENTS | MEANING |
|---|---|
| 0x0 | RESERVE |
| 0x1 | UNUSED |
| 0x2 | AUDIO STREAM WITH UNSPECIFIED CODING SYSTEM |
| 0x3 | MPEG-4 AAC AUDIO STREAM |
| 0x4 | MPEG-4 ALS AUDIO STREAM |
| 0x5 | UNUSED |
| 0x6—0x8 | RESERVE |
| 0x9 | UNUSED |
| 0xA—0xB | RESERVE |
| 0xC—0xF | PROVIDER DEFINITION |

FIG. 36

(M12) COMPONENT TYPE INFORMATION RECORDED IN MPT

| AUDIO MODE (b0—b4) | MEANING |
|---|---|
| 00000 | RESERVE |
| 00001 | 1/0 MODE (SINGLE MONAURAL) |
| 00010 | 1/0+1/0 MODE (DUAL MONAURAL) |
| 00011 | 2/0 MODE (STEREO) |
| 00100 | 2/1 MODE |
| 00101 | 3/0 MODE |
| 00110 | 2/2 MODE |
| 00111 | 3/1 MODE |
| 01000 | 3/2 MODE |
| 01001 | 3/2+LFE MODE (3/2. 1 − MODE) |
| 01010 | 3/3. 1 MODE |
| 01011 | 2/0/0-2/0/2-0. 1 MODE |
| 01100 | 5/2. 1 MODE |
| 01101 | 3/2/2. 1 MODE |
| 01110 | 2/0/0-3/0/2-0. 1 MODE |
| 01111 | 0/2/2-3/0/2-0. 1 MODE |
| 10000 | 2/0/0-3/2/3-0. 2 MODE |
| 10001 | 3/3/3-5/2/3-3/0/0. 2 MODE |
| 10010−11111 | RESERVE |

FIG. 37

(M13) SAMPLING FREQUENCY INFORMATION RECORDED IN MPT

| SAMPLING FREQUENCY | MEANING |
|---|---|
| 000 | RESERVE |
| 001 | 16kHz |
| 010 | 22.05kHz |
| 011 | 24kHz |
| 100 | RESERVE |
| 101 | 32kHz |
| 110 | 44.1kHz |
| 111 | 48kHz |

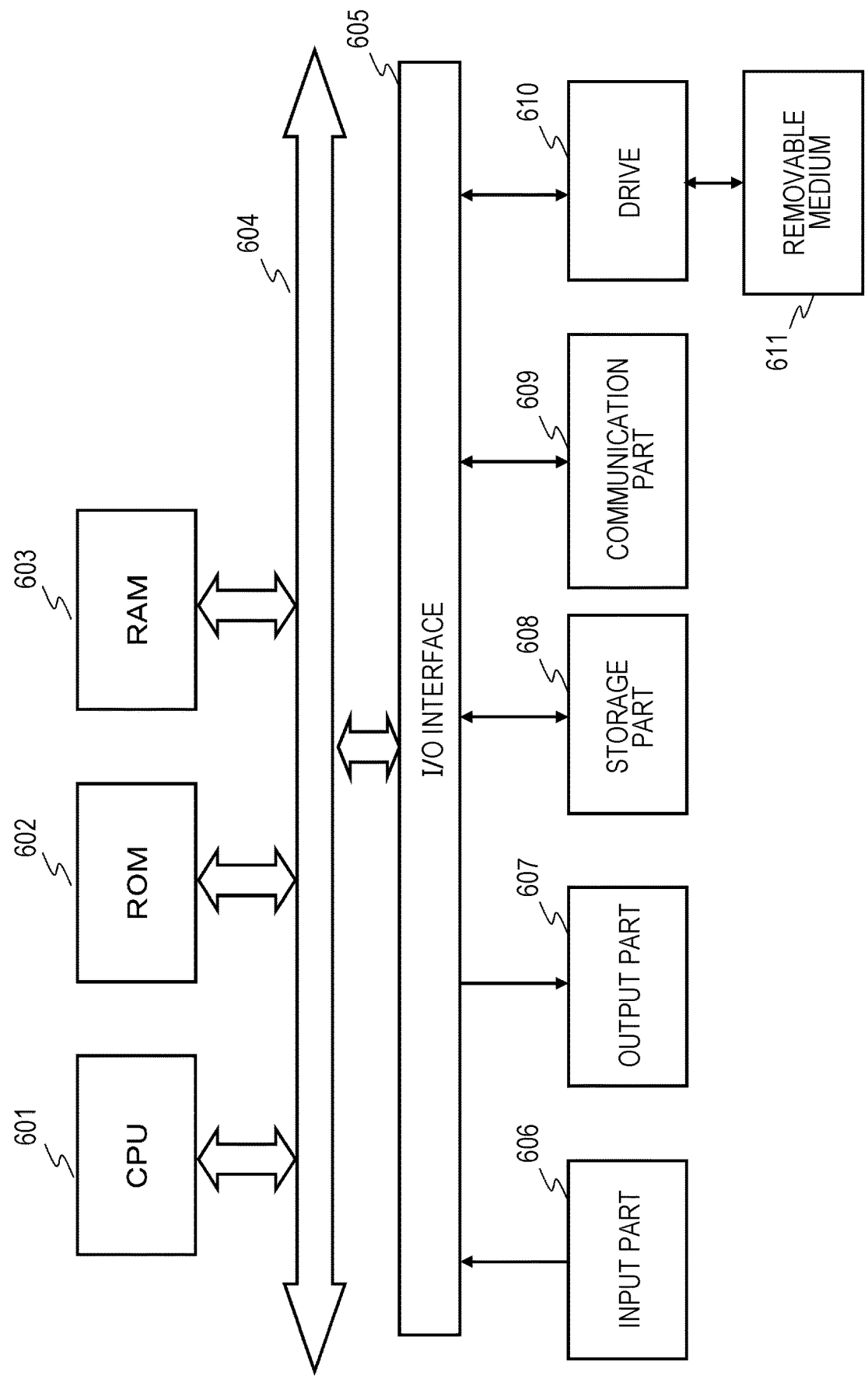

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/024125 (filed on Jun. 30, 2017) under 35 U.S.C. § 371, which claims priority to Japanese Patent Application No. 2016-142694 (filed on Jul. 20, 2016), which are all hereby incorporated by reference in their entirety.

TECHNICAL FIELD

The present disclosure relates to an information processing apparatus, an information processing method, and a program. More specifically, the present disclosure relates to an information processing apparatus capable of inputting MPEG media transport (MMT) format data, which is being standardized as a future data transmission standard in broadcast waves and the like, recording it in a medium, and reproducing it, an information processing method, and a program.

BACKGROUND ART

Broadcasting and the like of 4K video, 8K video, and the like are being currently standardized in order to realize high-quality video data transmission, and as one solution thereof, a data delivery system using MPEG media transport (MMT) format is being discussed.

The MMT format defines a data transport system (transport format) for transmitting coded data configuring contents such as video, audio, and subtitle on a broadcast wave or via a network.

The MMT format is a format for transmitting contents such as video, audio, and subtitle, and is to be used for broadcasting next-generation contents such as 4K video and high dynamic range (HDR) video, for example.

On the other hand, information recording mediums used to record and reproduce contents configured of video, audio, subtitle, and the like include Blu-ray (registered trademark) disc (BD) or flash memory, for example. A MPEG-2TS format is known as a currently-available data format used for the information recording mediums.

In a case where data delivered in the MMT format is received and the received data is recorded in a BD or flash memory, contents to be reproduced such as video, audio, and subtitle data may be recorded in the MPEG-2TS format converted from the MMT format, and may be recorded in the MMT format, which is being currently discussed.

However, for example, in a case where contents such as video, audio, and subtitle are reproduced from a medium such as Blu-ray (registered trademark) disc (BD) or flash memory, reproduction control information or index information for reproducing the contents is required. The reproduction control information or the index information is generally called database file.

The reproduction control information or the index information is different depending on a reproduction application for reproducing data recorded in a medium.

For example, current recording/reproducing application standards (formats) include BDMV and BDAV standards (formats). The application standards are defined as data recording/reproducing application standards mainly using Blu-ray (registered trademark) disc (BD).

Additionally, BDMV and BDAV are data recording/reproducing application standards mainly using BD, but the standards are applicable to recording and reproducing data using a medium other than BD, such as flash memory, not limited to BD.

A configuration of the data recording/reproducing processing using BD is described in Patent Document 1 (Japanese Patent Application Laid-Open No. 2011-023071) and the like, for example.

BDMV is an application standard developed for BD-ROM previously recording movie contents and the like, for example, and is widely used mainly in non-rewritable BD-ROM for package contents and the like.

On the other hand, BDAV is a standard developed for a data recording/reproducing processing mainly using rewritable BD-RE disc, one-time recordable BD-R disc, and the like. BDAV is used to record and reproduce videos shot with a video camera or the like by a user, or to record and reproduce TV broadcasting, for example.

Data needs to be recorded in the BDAV format in order to record contents delivered in the MMT format in an information recording medium and to reproduce contents from the medium by use of a reproduction application for BDAV format.

As described above, the BDAV format defines a database file such as playlist file or clip information file as a reproduction control information recording file, and the reproduction application for BDAV performs the data reproduction processing with reference to the information recorded in the reproduction control information file (database file).

However, the data delivered in the MMT format does not include a playlist file or a clip information file defined in the BDAV format.

Thus, a processing of generating a playlist file or a clip information file defined in the BDAV format and recording it in a medium is required in order to record the MMT format data in the medium and to reproduce contents by use of an application for BDAV format.

However, the processing is not actually embodied at present.

CITATION LIST

Patent Document

Patent Document 1: Japanese Patent Application Laid-Open No. 2011-023071

SUMMARY OF THE INVENTION

Problems to be Solved by the Invention

The present disclosure has been made in terms of the above problems, for example, and is directed to provide an information processing apparatus capable of inputting data delivered in a MMT format, generating and recording a database file defined in a BDAV format in a medium, and reproducing medium-recorded contents by use of the database file, an information processing method, and a program.

Further, a configuration according to one aspect of the present disclosure is directed to providing an information processing apparatus capable of inputting data delivered in a MMT format, generating and recording a database file defined in a BDAV format in a medium, and outputting a list of video-recorded contents by use of the database file, an information processing method, and a program.

Solutions to Problems

A first aspect of the present disclosure lies in an information processing apparatus including:

a data processing part configured to input MMT format data and to generate data recorded in a BDAV format as a data recording format in an information recording medium, in which the data processing part extracts data to be recorded in a database file defined in a BDAV format from MMT format data to be input, and generates a database file.

Furthermore, a second aspect of the present disclosure lies in an information processing apparatus including:

a data processing part configured to reproduce data recorded in an information recording medium, in which the information recording medium is an information recording medium that stores data in which MMT format data is recorded in a BDAV format, the data processing part acquires information recorded in a playlist file and a clip information file as database files defined in a BDAV format, and generates a list of video-recorded contents, and the data processing part outputs data extracted from a signaling message included in the MMT format data as output data of the list of video-recorded contents.

Furthermore, a third aspect of the present disclosure lies in an information processing method performed in an information processing apparatus, in which the information processing apparatus includes a data processing part configured to input MMT format data and to generate data recorded in a BDAV format as a data recording format in an information recording medium, and the data processing part extracts data to be recorded in a database file defined in a BDAV format from MMT format data to be input, and generates a database file.

Furthermore, a fourth aspect of the present disclosure lies in an information processing method performed in an information processing apparatus, in which the information processing apparatus includes a data processing part configured to reproduce data recorded in an information recording medium, the information recording medium is an information recording medium that stores data in which MMT format data is recorded in a BDAV format, the data processing part acquires information recorded in a playlist file and a clip information file as database files defined in a BDAV format, and generates a list of video-recorded contents, and outputs data extracted from a signaling message included in the MMT format data as output data of the list of video-recorded contents.

Furthermore, a fifth aspect of the present disclosure lies in a program for causing an information processing apparatus to perform an information processing, in which the information processing apparatus includes a data processing part configured to input MMT format data and to generate data recorded in a BDAV format as a data recording format in an information recording medium, and the program causes the data processing part to extract data to be recorded in a database file defined in a BDAV format from MMT format data to be input and to generate a database file.

Furthermore, a sixth aspect of the present disclosure lies in a program for causing an information processing apparatus to perform an information processing, in which the information processing apparatus includes a data processing part configured to reproduce data recorded in an information recording medium, the information recording medium is an information recording medium that stores data in which MMT format data is recorded in a BDAV format, the program causes the data processing part to acquire information recorded in a playlist file and a clip information file as database files defined in a BDAV format and to generate a list of video-recorded contents, and to output data extracted from a signaling message included in the MMT format data as output data of the list of video-recorded contents.

Additionally, the program according to the present disclosure can be provided to an information processing apparatus or computer system capable of executing various program codes, for example, in a computer readable storage medium or communication medium. The program is provided in a computer readable form so that the processings depending on the program are realized on the information processing apparatus or computer system.

Other objects, characteristics, or advantages of the present disclosure will be more apparent by more detailed description based on embodiments or accompanying drawings of the present disclosure described below. Additionally, a system in the present specification is a logical collection of a plurality of apparatuses, and the apparatuses in each configuration are not necessarily in the same casing.

Effects of the Invention

In a configuration according to one aspect of the present disclosure, there is realized a configuration capable of recording MMT format data as BDAV format data in a medium, displaying a list of video-recorded contents, and reproducing it by an application for BDAV.

Specifically, for example, data to be recorded in a playlist or clip information file defined in the BDAV format is extracted from the MMT format data input on a broadcast wave or the like, and a data file thereof is generated. For example, data applied to display the list of video-recorded contents is extracted from MMT-SI or TLV-SI of the MMT format data and is recorded in the play list or clip information file.

With the configuration, there is realized a configuration capable of recording MMT format data as BDAV format data in a medium, displaying a list of video-recorded contents, and reproducing it by an application for BDAV.

Additionally, the effects described in the present specification are merely exemplary and are not restrictive, and additional effects may be obtained.

BRIEF DESCRIPTION OF DRAWINGS

FIG. 2 is a diagram for explaining a MMT format.

FIG. 9 is a diagram for explaining exemplary display data of a list of video-recorded contents.

FIG. 10 is a diagram for explaining a data configuration of a playlist file.

FIG. 11 is a diagram for explaining detailed user interface application information (UIAppInfoPlayList).

FIG. 12 is a diagram for explaining exemplary processings of recording recorded data of the MMT format data in a playlist file.

FIG. 13 is a diagram illustrating a data configuration (syntax) of an event information table (MH-EIT).

FIG. 14 is a diagram illustrating a data configuration (syntax) of a TLV network information table (TLV-NIT).

FIG. 15 is a diagram illustrating a data configuration (syntax) of a MH-broadcaster name descriptor as configuration data of a broadcaster information table (MH-BIT) defined in the MMT format.

FIG. 16 is a diagram illustrating a data configuration (syntax) of a "MH-short event descriptor (MH-Short_Event_Descriptor)" recorded in the event information table (MH-EIT).

FIG. 17 is a diagram illustrating a data configuration (syntax) of a clip information file.

FIG. 18 is a diagram illustrating a data configuration (syntax) of program information [ProgramInfo( )] of the clip information file.

FIG. 19 is a diagram for explaining an exemplary data configuration of coding information of the clip information file.

FIG. 20 is a diagram illustrating exemplary settings of coding types of video streams and audio streams defined in the BDAV format.

FIG. 21 is a diagram for explaining exemplary stream coding information [StreamCodingInfo] recording data of HEVC video data.

FIG. 22 is a diagram for explaining exemplary data recording of a video format (video_format) of the clip information file.

FIG. 24 is a diagram for explaining exemplary data recording of an aspect ratio (aspect_ratio) of the clip information file.

FIG. 25 is a diagram for explaining exemplary data recording of audio information of the clip information file.

FIG. 27 is a diagram illustrating a data configuration (syntax) of a MMT package table (MPT).

FIG. 28 is a diagram for explaining specific examples of asset type (asset_type) recorded in the MMT package table (MPT).

FIG. 29 is a diagram illustrating video attribute information recorded in the MMT package table (MPT).

FIG. 30 is a diagram illustrating specific examples of (M6) Resolution (video_resolution) recorded in the MMT package table (MPT).

FIG. 31 is a diagram illustrating specific examples of (M8) Frame rate (video_frame_rate) recorded in the MMT package table (MPT).

FIG. 32 is a diagram illustrating specific examples of (M9) Aspect ratio (video_aspect_ratio) recorded in the MMT package table (MPT).

FIG. 33 is a diagram illustrating specific examples of (M10) Video signal transfer characteristics (video_transfer_characteristics) recorded in the MMT package table (MPT).

FIG. 34 is a diagram illustrating audio attribute information recorded in the MMT package table (MPT).

FIG. 35 is a diagram illustrating specific examples of (M11) Stream content information recorded in the MMT package table (MPT).

FIG. 36 is a diagram illustrating specific examples of (M12) Component type recorded in the MMT package table (MPT).

FIG. 37 is a diagram illustrating specific examples of (M13) Sampling frequency recorded in the MMT package table (MPT).

FIG. 44 is a diagram for explaining an exemplary hardware configuration of an information processing apparatus applied to the processings according to the present disclosure.

MODE FOR CARRYING OUT THE INVENTION

Figure 1:
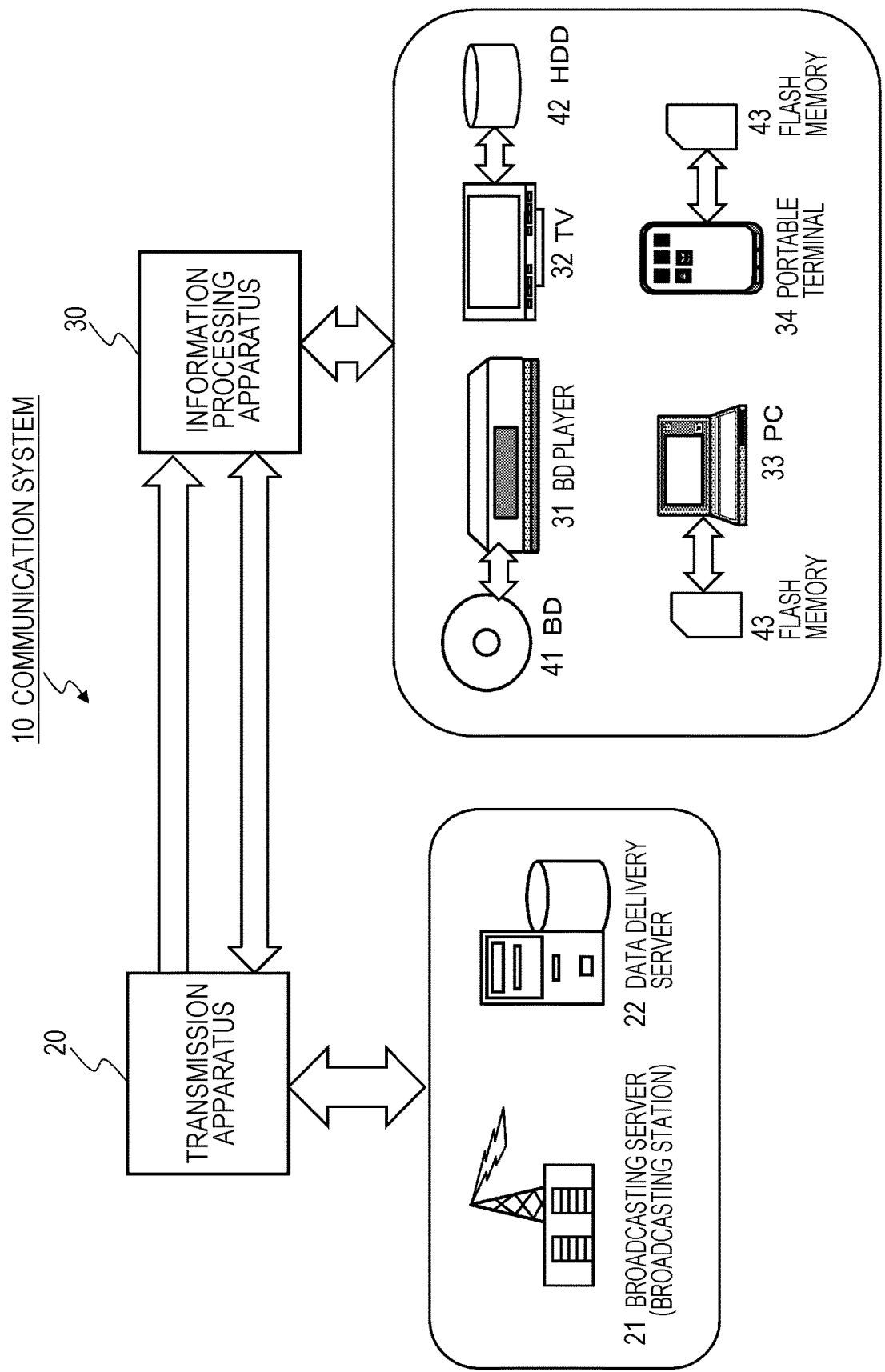
FIG. 1 is a diagram for explaining an exemplary use configuration of an information processing apparatus configured to perform processings according to the present disclosure.

An information processing apparatus and an information processing method as well as a program according to the present disclosure will be described below in detail with reference to the drawings. Additionally, the description will be made in the following order.

1. Exemplary configuration of communication system
2. MPEG media transport (MMT) format
3. BDAV format
4. Processing of recording MMT format data in BDAV format
5. Exemplary recording of recorded contents' attribute data in playlist file
5-1. Exemplary processing of recording (P1) Video-record time/date (record_time_and_date)
5-2. Exemplary processing of recording (P2) Channel number (channel_number)
5-3. Exemplary processing of recording (P3) Channel name (channel_name)

5-4. Exemplary processing of recording (P4) Video-recorded program name (Playlist_name) and (P5) Video-recorded program details (Playlist_detail)

6. Exemplary recording of video-recorded contents' attribute data in clip information file 6-1. MMT package table (MPT)

6-2. Exemplary processing of recording video attribute information in clip information file 6-3. Exemplary processing of recording audio attribute information in clip information file 7. Configuration and processings of information processing apparatus configured to perform processing of recording data in information recording medium 8. Configuration and processings of information processing apparatus configured to perform processing of reproducing data from information recording medium 9. Exemplary configuration of information processing apparatus 10. Summary of configurations of present disclosure

[1. Exemplary Configuration of Communication System]

An exemplary communication system as an exemplary use configuration of an information processing apparatus configured to perform processings according to the present disclosure will be first described with reference to FIG. 1.

An information processing apparatus 30 illustrated in FIG. 1 mounts a medium such as Blu-ray (registered trademark) disc (BD), flash memory, or hard disc (HDD), and performs a processing of recording data in the mounted medium and a processing of reproducing data from the mounted medium.

Data to be recorded in the medium by the information processing apparatus 30 is transmitted contents provided by a transmission apparatus 20 such as a broadcasting station (broadcasting server) 21 or a data delivery server 22, for example. Specifically, the transmitted contents are broadcasted programs provided by TV stations or the like.

The transmitted contents are transmitted from the transmission apparatus 20 to the information processing apparatus 30 on a broadcast wave or via a network such as Internet.

The information processing apparatus 30 is a BD player 31, a TV 32, a PC 33, a portable terminal 34, or the like, for example. The information processing apparatus mounts various mediums such as a Blu-ray (registered trademark) disc (BD) 41, a hard disc (HDD) 42, and a flash memory 43, and performs a processing of recording data in the mediums or a processing of reproducing data from the mediums, for example.

Data is transmitted from the transmission apparatus 20 to the information processing apparatus 30 in a MPEG media transport (MMT) format.

The MMT format defines a data transport system (transport format) for transmitting coded data as content configuration data such as video, audio, and subtitle on a broadcast wave or via a network.

The transmission apparatus 20 codes content data, generates a data file including coded data and metadata of the coded data, and stores and transmits the generated coded data in a MMT protocol (MMTP) packet defined in MMT on a broadcast wave or via a network.

Data provided from the transmission apparatus 20 to the information processing apparatus 30 is configured of guidance information or notification information of program guide and the like, control information, and the like in addition to the data to be reproduced such as video, audio, and subtitle.

[2. MPEG Media Transport (MMT) Format]

As described above, data is transmitted from the transmission apparatus 20 to the information processing apparatus 30 in the MPEG media transport (MMT) format.

The MPEG media transport (MMT) format will be described in and subsequent to FIG. 2.

FIG. 2 is a diagram illustrating a stack model of the MMT format.

A physical layer (PHY) is present in the lowermost layer in the MMT stack model illustrated in FIG. 2. The physical layer is divided into a broadcasting layer for broadcasting-based processings and a broadband layer for network-based processings.

MMT is capable of the processings using two communication networks of broadcasting-based and network-based.

A type length value (TLV) layer is present on the physical layer (PHY). TLV is a format definition layer defining an IP packet multiplexing system. A plurality of IP packets are multiplexed and transmitted as a TLV packet. TLV-SI is a signaling message transmission layer in a TLV format.

A signaling message is configured of setting information required to receive contents (programs) in the information processing apparatus 30, guidance information or notification information of program guide and the like, control information, and the like.

A signaling message stored in a TLV packet generated in the TLV layer is TLV-SI, and a signaling message stored in a MMTP packet generated according to the MMT protocol is MMT-SI indicated in the uppermost layer.

A UDP/IP layer is set on the TLV layer.

The UDP/IP layer can be divided into an IP layer and a UDP layer in detail, and is directed for defining transmission for storing a UDP packet in the payload of an IP packet.

A MMT layer and a File delivery method layer are set on the UDP/IP layer.

A system of storing and transmitting a MMTP packet in an IP packet and a system of transmitting data as an IP packet by use of File delivery method as a data transmission system not using a MMTP packet can be used together.

The following layers are set on the MMT layer.

Video data as coded video data according to high efficiency video coding (HEVC) as video coding standard, Audio data as coded audio data according to advanced audio coding (AAC) as audio coding standard, Subtitle data as coded subtitle data according to timed text markup language (TTML) as subtitle coding standard, Signaling message (MMT-SI) transmitted in MMTP packet, and Various applications described in hyper text markup language 5 (HTML5).

Each item of the data is stored and transmitted in a MMTP packet.

The signaling message (MMT-SI) is transmitted in a MMTP packet, and is configured of setting information required to receive contents (programs) in the information processing apparatus 30, guidance information or notification information of program guide and the like, control information, and the like.

Additionally, network time protocol (NTP) is absolute time information, and is directly stored and transmitted in a UDP packet.

Data service for other data delivery (Data service), content downloading (Contentdownload, etc.), and the like can be delivered by use of a different file delivery method from MMT.

As illustrated in FIG. 2, the signaling message (MMT-SI) including video, audio, subtitle, and various items of notification information or control information, or an application is transmitted in a MMTP packet.

An exemplary configuration of a MMTP packet will be specifically described with reference to FIG. 3.

Figure 3:
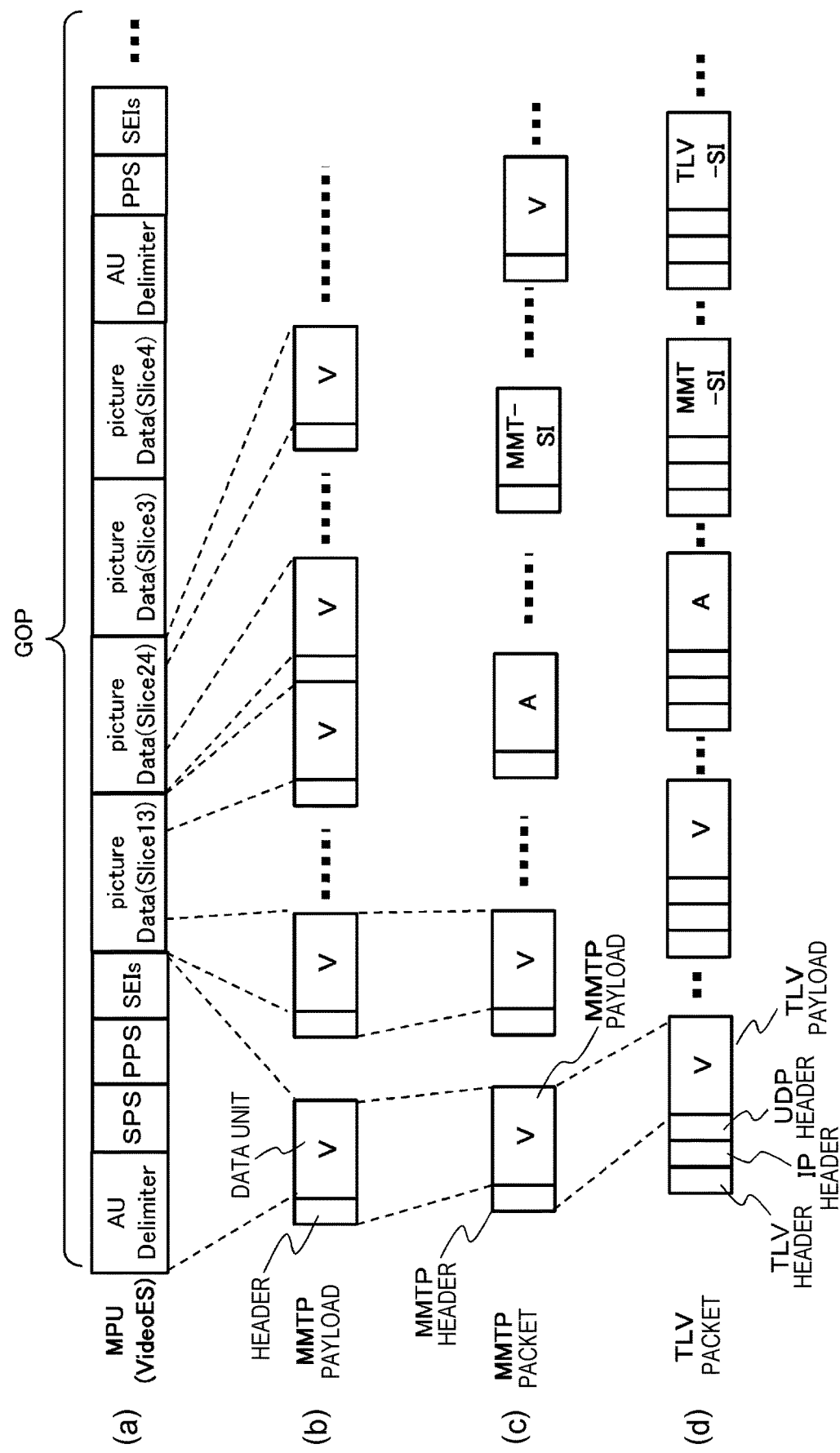
FIG. 3 is a diagram for explaining an exemplary video data storage configuration in the MMT format.

FIG. 3 illustrates the following four exemplary data configurations.

(a) Media presentation unit (MPU)
(b) MMTP payload
(c) MMTP packet
(d) TLV packet (d) TLV packet is transmitted on a broadcast wave or via a network, and the TLV packet sets each item of header information of UDP header, IP header, and TLV header. The TLV packet is set as an individual packet per data type.

That is, one type of data is stored in the TLV pay load of one TLV packet. Specifically, for example, one type of data among video (V), audio (A), subtitle (S), signaling message (MMT-SI) stored in a MMTP packet, and signaling message (TLV-SI) transmitted in a TLV packet is stored in an individual TLV packet.

An exemplary TLV payload as a payload of a TLV packet is a MMTP packet illustrated in FIG. 3(c).

The MMTP packet illustrated in FIG. 3(c) is configured of a MMTP header and a MMTP payload.

One type of data is stored in the MMTP payload of one MMTP packet. Specifically, one type of data among video (V), audio (A), subtitle (S), and signaling message (MMT-SI) stored in a MMTP packet is stored in an individual MMTP packet, for example.

FIGS. 3(a) and 3(b) illustrate detailed configurations of video data stored in the MMTP payload of the MMTP packet illustrated in FIG. 3(c).

FIG. 3(b) illustrates the MMTP payloads including only video data (V) in the MMTP packets illustrated in FIG. 3(c).

The MMTP payloads illustrated in FIG. 3(b) are each configured of a header and a data unit.

Video data and various parameters described below are stored in the data unit as illustrated in FIG. 3(a).

Access unit delimiter (AU delimiter)
Sequence parameter set (SPS)
Picture parameter set (PPS)
Supplemental enhancement information (SEIs)

The parameters are used for video display.

The media presentation unit (MPU) illustrated in FIG. 3(a) is a data processing unit in the MMT format. The example illustrated in FIG. 3(a) is exemplary MPU of video data, and is the same unit as group of pictures (GOP) as a coding/decoding processing unit.

In this way, for example, video data is divided into parameters and video configuration data defined in the MMT format as illustrated in FIG. 3(a), is stored in the MMTP pay load illustrated in FIG. 3(b), and is configured as a MMTP packet illustrated in FIG. 3(c).

Further, the MMTP packet is set as a payload of a TLV packet illustrated in FIG. 3(d), and the TLV packet is transmitted on a broadcast wave or via a network.

Additionally, a MMTP packet and a TLV packet in units of data type are set also for each item of data of audio, subtitle, and the like, and each item of data of MMT-SI.

TLV-SI is not stored in the MMTP packet, and is stored and transmitted in the TLV packet.

[3. BDAV Format]

A BDAV format as a recorded data format in a case where contents delivered in the MMT format are recorded in and reproduced from a medium such a s Blu-ray (registered trademark) disc (BD), flash memory, or hard disc, for example, will be described below in and subsequent to FIG. 4.

For example, in a case where contents such as video, audio, and subtitle are reproduced from a medium such as Blu-ray (registered trademark) disc (BD) or flash memory, reproduction control information or index information for reproducing the contents is required. The reproduction control information or the index information is generally called database file.

The reproduction control information or the index information is different depending on a reproduction application for reproducing data recorded in a medium.

As described above, the current recording/reproducing application standards (=data recording formats) include BDMV and BDAV standards (data recording formats). The application standards are defined as data recording/reproducing application standards mainly using Blu-ray (registered trademark) disc (BD).

Additionally, BDMV and BDAV are data recording/reproducing application standards mainly using BD, and are data recording formats (standards), but the standards are applicable also for recording and reproducing data by use of a medium other than BD, such as flash memory, not limited to BD.

BDMV is an application standard developed for BD-ROM previously recording movie contents or the like, for example, and is widely used mainly in non-rewritable BD-ROM for package contents and the like.

On the other hand, BDAV is a standard developed for a data recording/reproducing processing mainly using rewritable BD-RE disc, one-time recordable BD-R disc, or the like. BDAV is used for recording and reproducing videos shot with a video camera or the like by a user or for recording and reproducing TV broadcasting, for example.

Data needs to be recorded in the BDAV format in order to reproduce contents from a medium recording contents delivered in the MMT format by use of a reproduction application for BDAV format.

As described above, the BDAV format defines a playlist file, a clip information file, and the like as recording files of the reproduction control information, and the reproduction application for BDAV performs the data reproduction processing by use of the information recorded in the reproduction control information files (database files).

Figure 4:
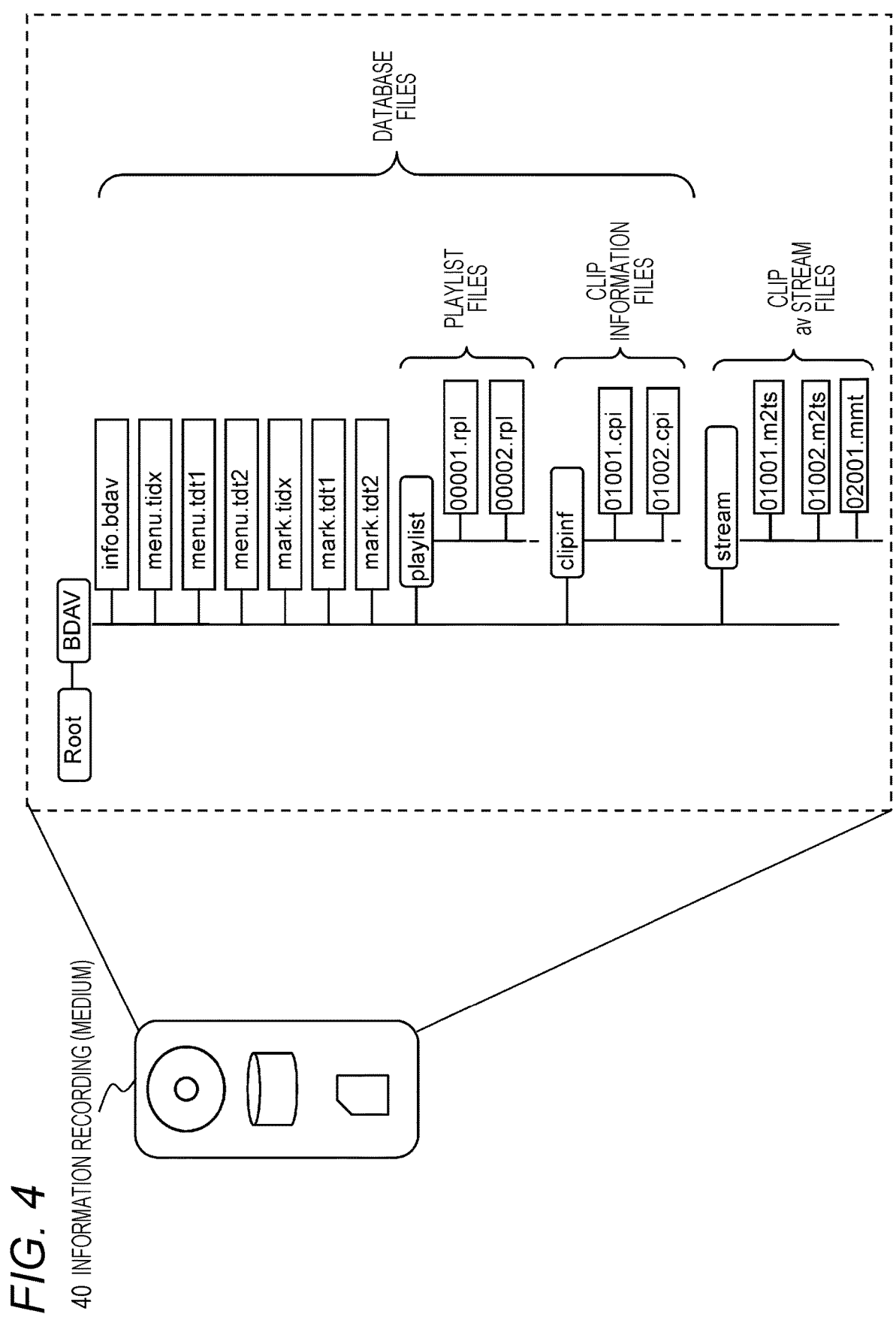
FIG. 4 is a diagram for explaining a BDAV format.

FIG. 4 is a diagram illustrating an exemplary directory configuration of data recorded in an information recording medium 40 in the BDAV format.

Various items of management information and reproduction control information, and files storing data to be reproduced are set in the directory as illustrated in FIG. 4.

The management information file is configured of an info file (info), menu files (menu), mark files (mark), and the like illustrated in FIG. 4, for example. The files mainly store the management information and the like of the titles presented to the user.

Further, the reproduction control information files record a playlist file (playlist) and a clip information file (clipinf), for example.

Further, clip AV stream files (stream) are recorded as files for storing data to be reproduced.

The playlist file defines a content reproduction order and the like according to program information of a reproduction program designated by a title, and has designation information and the like of a clip information file recording reproduction position information and the like therein, for example.

The clip information file is designated by a playlist file, and has reproduction position information and the like of a clip AV stream file.

The clip AV stream file stores AV stream data to be reproduced. The clip AV stream file is configured of packets storing each item of data of video, audio, subtitle, and the like to be reproduced.

Additionally, conventional broadcasted data or network-delivered data is MPEG-2TS format data configured of transport stream (TS) packets, but data including high-definition video such as video of 4K or 8K or the like is expected to be MMT format data configured of the MMTP packets.

FIG. 4 illustrates two kinds of stream files as clip AV stream files (stream) including a stream file (nnnnn.m2ts) including MPEG-2TS format data configured of TS packets, and MMT format data (nnnnn. mmt) configured of MMTP packets.

The exemplary directory illustrated in FIG. 4 is set such that in a case where data received by the information processing apparatus 30 is MPEG-2TS format data, the received data is recorded as MPEG-2TS format data in the medium, and in a case where the received data is MMT format data, the received data is recorded as MMT format data in the medium.

The directory is exemplary, and for example, in a case where the information processing apparatus 30 has a format conversion function, the following processings can be performed.

In a case where received data is MMT format data, the MMT format is converted into the MPEG-2TS format, and all the clip AV stream files to be recorded in the medium are standardized as MPEG-2TS format data and recorded.

On the other hand, the MPEG-2TS format is converted into the MMT format so that all the clip AV stream files to be recorded in the medium can be standardized as MMT format data.

The processings will be discussed in the future.

The management information files, the playlist files, the clip information files, and their data files store the management information, the reproduction control information, the reproduction data attribute information, and the like applied for reproducing video, audio, subtitle, and the like as reproduction data stored in the clip AV stream files, and are called database files.

A sequence of reproducing contents recorded in the information recording medium is as follows.

(a) First designate a specific title from the management information files by the reproduction application.

(b) Select a playlist associated with the designated title.

Figure 5:
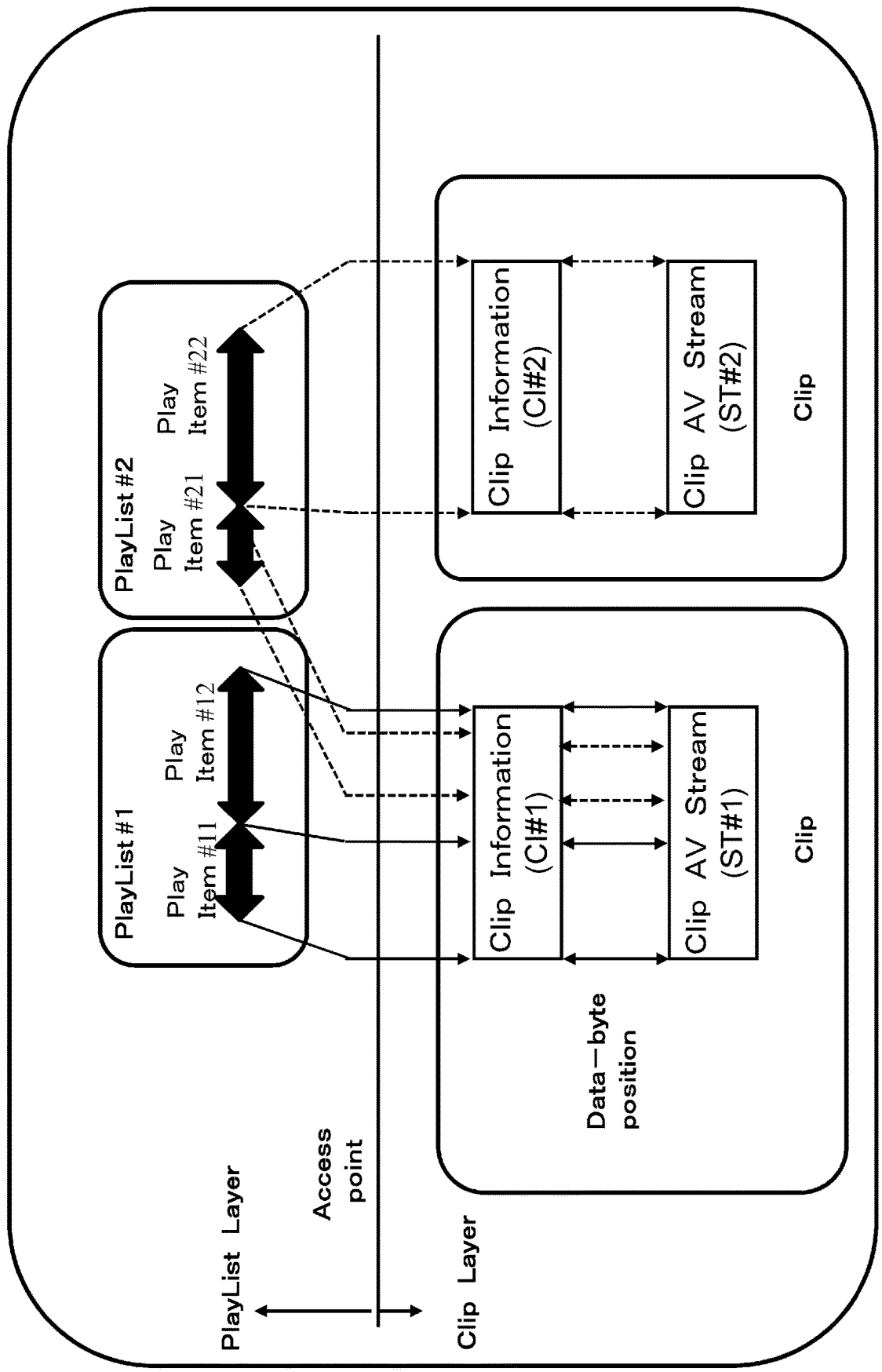
FIG. 5 is a diagram for explaining an exemplary data reproduction processing in the BDAV format.

(c) Read an AV stream or command as content actual data by clip information defined in the selected playlist, and reproduce the AV stream or execute the command FIG. 5 is a diagram for explaining correspondences of the following data recorded in the information recording medium 40, or the playlist files, the clip information files, and the clip AV stream files.

An AV stream configured of data to be reproduced such as video, audio, and subtitle, which is actual data to be reproduced, is recorded as a clip AV stream file, and a playlist file and a clip information file are defined for a management information and a reproduction control information file of the AV stream.

The files in a plurality of categories can be classified into two layers of a playlist layer including the playlist files and a clip layer configured of clip AV stream files and clip information files.

Additionally, one clip AV stream file is associated with one clip information file, and the pair is considered as one object and is collectively called clip or clip file.

Detailed information of the data included in the clip AV stream file such as the management information of EP map and the like recording I picture position information of MPEG data, for example, is recorded in the clip information file.

Additionally, the clip AV stream file is configured of TS packets in a case where it is MPEG-2TS format data.

Further, in a case where the clip AV stream file is MMT format data, it is configured of MMTP packets.

The clip information file stores the management information for acquiring a data position of byte string data of the clip AV stream file, a reproduction start position of the data stored in the clip AV stream file such as corresponding data of reproduction time position of (entry point (EP)) or the like as reproduction start point developed on a time axis, and the like, for example.

A playlist has information for designating the access points corresponding to a reproduction start position and a reproduction end position of clip by time stamps as information on a time axis.

For example, a data reading position of the clip AV stream file, or an address as reproduction start point can be acquired with reference to the clip information file on the basis of the time stamp indicating the reproduction time elapse position from the start point of the contents.

The clip information file is used for finding the address information where the stream in the clip AV stream file is to start being decoded from the time stamp.

In this way, the playlist file has reproduction period designation information for reproducible data included in the clip (=clip information file+clip AV stream file) layer.

One or more play items (PlayItem) are set in the playlist file, and each of the play items has reproduction period designation information for reproducible data included in the clip (=clip information file+clip AV stream file) layer.

Additionally, the clip AV stream file storing data to be reproduced is configured of TS packets in a case where it is conventional MPEG-2TS format data as described above.

Further, for high-definition video data such as 4K or 8K video expected to be more widely used in the future, in a case where the clip AV stream file is MMT format data, it is configured of MMTP packets.

Figure 6:
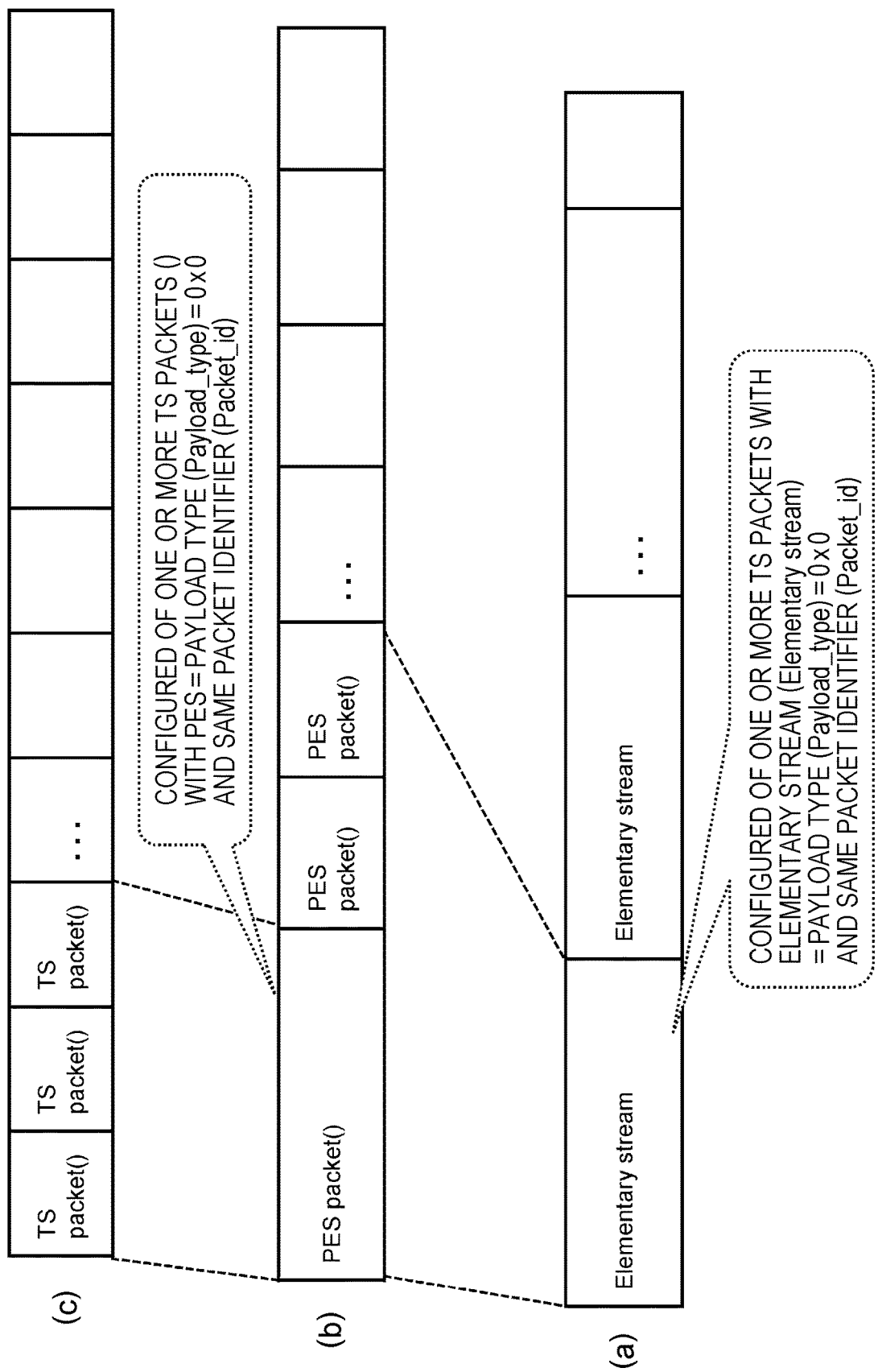
FIG. 6 is a diagram for explaining a MPEG-2TS format.

The MMT format and the MPEG-2TS format will be described with reference to FIG. 6 and FIG. 7.

The MPEG-2TS format will be first described with reference to FIG. 6.

The MPEG-2TS format defines a data storage format (container format) for coded data and the like when storing coded data as content configuration data such as video, audio, and subtitle in a recording medium or transmitting it on a broadcast wave or via a network.

The MPEG-2TS format is standardized in ISO13818-1, and is used for data recording in a Blu-ray (registered trademark) disc (BD), digital broadcasting, and the like, for example.

FIGS. 6(a) to 6(c) are diagrams illustrating a configuration of MPEG-2TS format data.

FIG. 6(a) at the lowermost stage is a diagram illustrating an entire configuration of the MPEG-2TS format data.

As illustrated in FIG. 6(a), the MPEG-2TS format data is configured of a plurality of elementary streams.

An elementary stream is a unit set as one unit of video, audio, subtitle, or the like, for example.

As illustrated in FIG. 2(b), one elementary stream is configured of one or more packetized elementary stream (PES) packets.

Specifically, one elementary stream is configured of one or more PES packets with a payload type (Payload_type)=0×0 and the same packet identifier (Packet_id).

As illustrated in FIG. 6(c), one PES packet is configured of one or more TS packets.

Specifically, one PES packet is configured of one or more TS packets with a payload type (Payload_type)=0×0 and the same packet identifier (Packet_id).

A TS packet has a fixed length unlike the above-described MMTP packets, and the packet size of one TS packet is fixed at 188 bytes.

The MPEG media transport (MMT) format will be described below with reference to FIG. 7.

Figure 7:
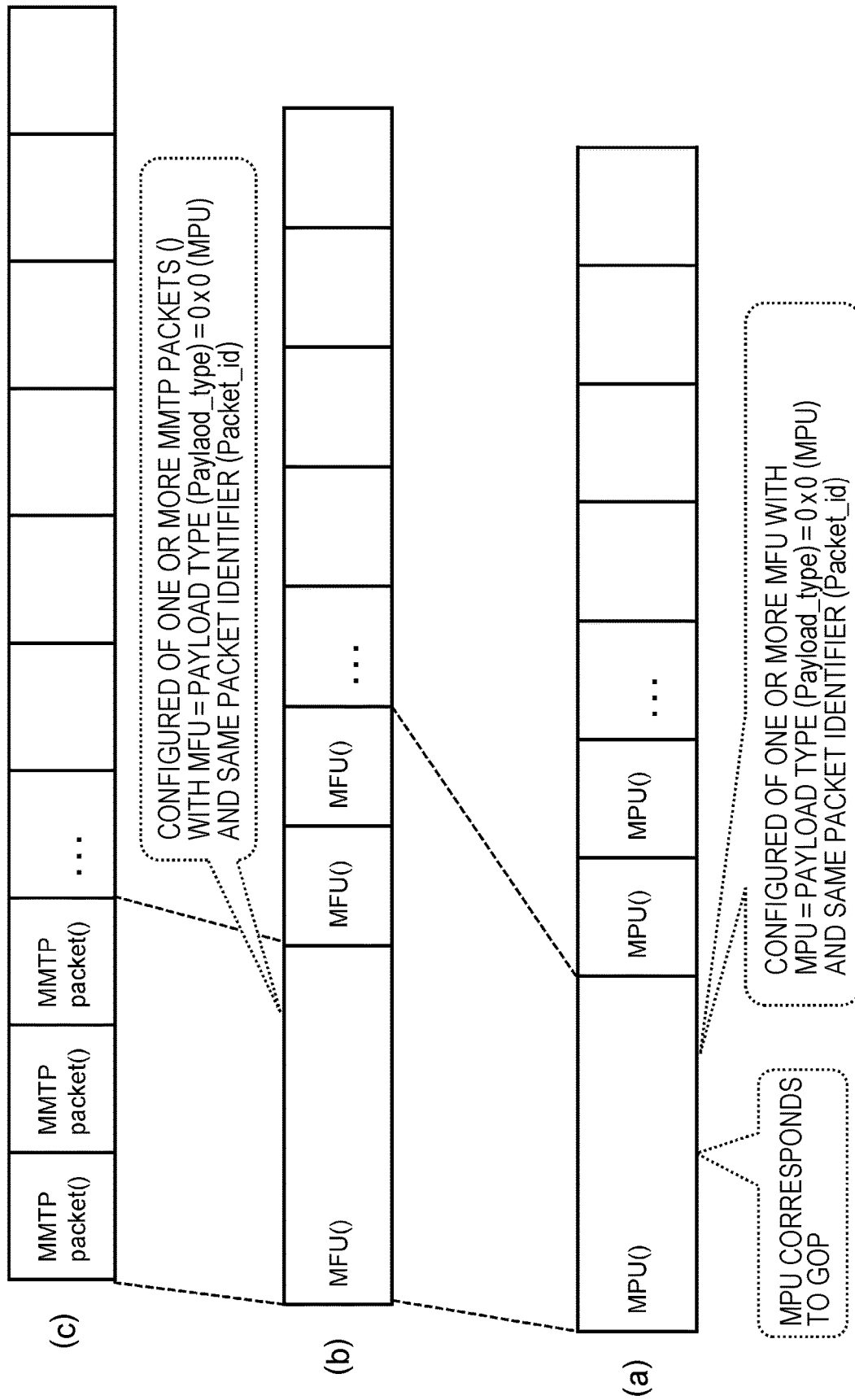
FIG. 7 is a diagram for explaining the MMT format.

The MMT format has been described above with reference to FIG. 3, and the explanatory diagrams of the MMT format in FIG. 7 illustrate a correspondence to the MPEG-2TS format described with reference to FIG. 6 in an easy way.

As described above, the MMT format defines a data transport system (transport format) for transmitting coded data as content configuration data such as video, audio, and subtitle on a broadcast wave or via a network.

FIG. 7 is a diagram for explaining the MMT format as a file format defined in ISO/IEC 23008-1.

FIGS. 7(a) to 7(c) illustrate a configuration of MMT format data.

FIG. 7(a) illustrated at the lowermost stage is a diagram illustrating an entire configuration of the MMT format data.

As illustrated in FIG. 7(a), the MMT format data is configured of a plurality of media presentation units (MPUs).

A MPU is set as one unit of video, audio, subtitle, or the like, for example. For example, one MPU of video corresponds to 1 group of picture (GOP) as one MPEG compressed video unit.

As illustrated in FIG. 7(b), one MPU is configured of one or more media fragment units (MFUs).

Specifically, one MPU is configured of one or more MFUs with a pay load type (Payload_type)=0×0 (MPU) and the same packet identifier (Packet_id).

As illustrated in FIG. 7(c), one MFU is configured of one or more MMTP packets.

Specifically, one MFU is configured of one or more MMTP packets with a pay load type (Payload_type)=0×0 (MPU) and the same packet identifier (Packet_id).

The MMTP packet has a variable length, and can be set at various packet sizes.

Each of the MMTP packets is configured of a header (MMTP header) for storing attribute information and the like, and a payload (MMPT payload) for storing actual data and the like of a coded video.

[4. Processing of Recording MMT Format Data in BDAV Format]

A processing of recording the MMT format data in the BDAV format will be described below.

As described above, the MMT format is a data delivery format, and conforms to the stack described with reference to FIG. 3.

On the other hand, the BDAV format is a format for recording data in a medium, and defines the database files including the reproduction control information files such as playlist file or clip information file as described with reference to FIG. 4.

Additionally, the BDAV format is a data recording format and is for a data recording/reproducing application standard, and data recorded in a medium in the BDAV format is reproduced by use of a reproduction application for BDAV format.

Thus, data needs to be recorded in the BDAV format in order to record contents delivered in the MMT format in a medium and to reproduce contents from the recording medium by use of a reproduction application for BDAV format.

Each item of data of video, audio, subtitle, and the like as data to be reproduced may be recorded in the MMT format, or may be converted into a MEG-2TS file and recorded as a clip AV stream file.

However, the BDAV format defines the database files specific to the BDAV format of reproduction control information files including playlist file, clip information file, and the like, and the reproduction application for BDAV performs the data reproduction processing by use of the information recorded in the reproduction control information files (database files).

On the other hand, data delivered in the MMT format does not include the playlist file or the clip information file.

Therefore, a playlist file or clip information file defined in the BDAV format needs to be generated and recorded in a medium in order to record the MMT format data in the medium and to reproduce contents by use of an application for BDAV format.

Figure 8:
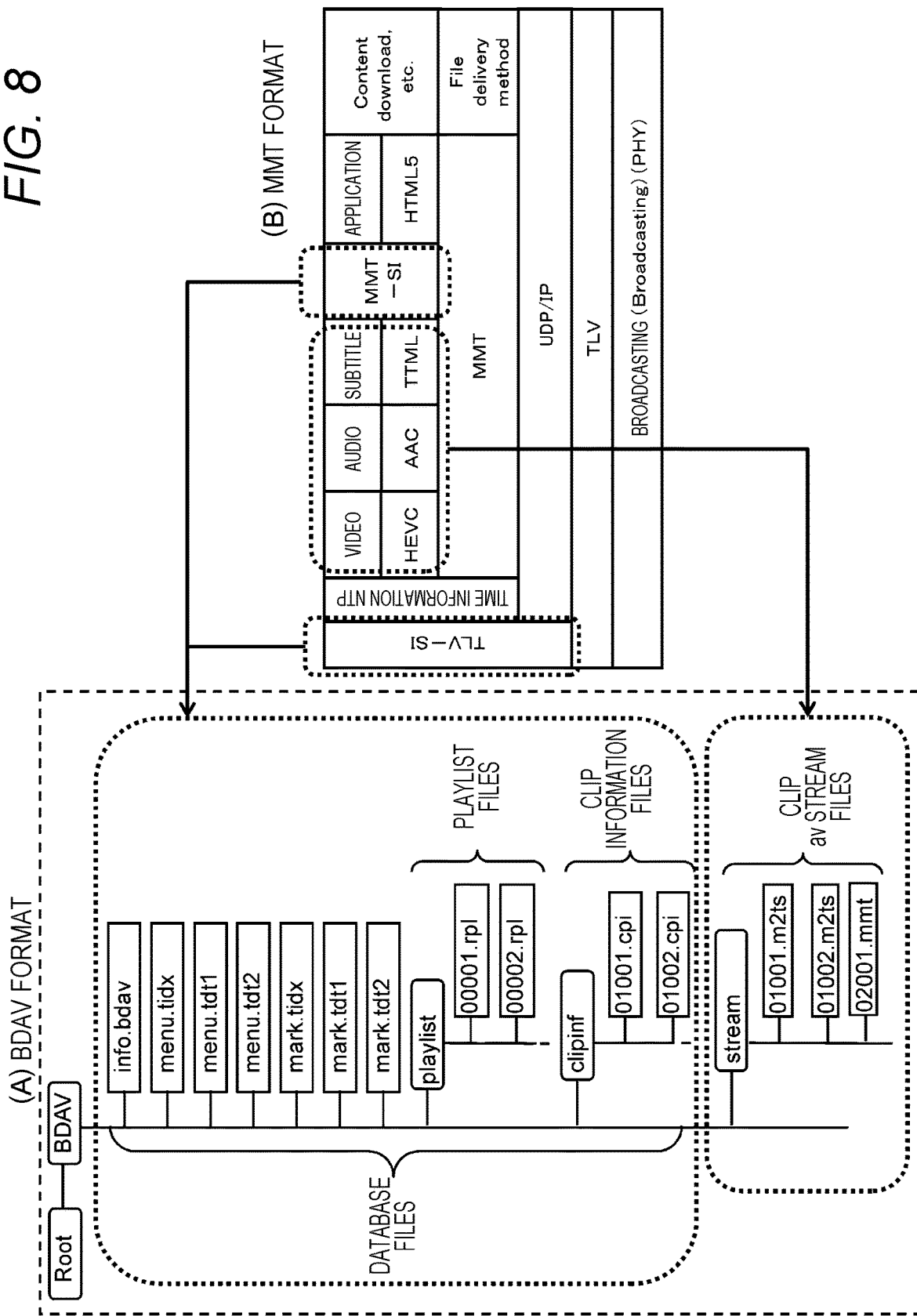
FIG. 8 is a diagram for explaining exemplary processings in a case where MMT format data is recorded as BDAV format data.

FIG. 8 is a diagram for explaining exemplary processings of generating BDAV format data to be recorded in a medium on the basis of data delivered in the MMT format.

As illustrated in FIG. 8, each item of data of video, audio, and subtitle to be reproduced is recorded as a clip AV stream file. The data to be reproduced can be subjected to various processings such as being recorded in the MMT format or being converted into and recorded in a TS format.

On the other hand, a database file such as management information file, playlist file, or clip information file defined in the BDAV format is not included in the MMT format.

As described above with reference to FIG. 2, the MMT format data includes a signaling message including setting information required to receive contents, guidance information or notification information of program guide and the like, control information, and the like.

A signaling message stored in the TLV packet generated in the TLV layer is TLV-SI, and a signaling message stored in a MMTP packet generated in the MMT protocol is MMT-SI.

The information processing apparatus 30 which receives the MMT format data and records the received data in the medium needs to select information to be recorded in a database file in the BDAV format from the signaling message of TLV-SI, MMT-SI, or the like included in the MMT format, and to generate a playlist file, a clip information file, or the like defined in the BDAV format, Various items of data as the reproduction control information of the clip AV stream file are recorded in the playlist file or clip information file defined in the BDAV format. Attribute information of the contents stored in the clip AV stream file is recorded as part of the reproduction control information.

For example, in a case where contents such as programs provided by the transmission apparatus 20 such as broadcasting station are recorded in the medium and reproduced, the user displays a list of video-recorded contents (programs) on the display part in order to select contents (program) to be reproduced, and selects the contents (program) to be reproduced from the list to start the reproduction processing.

The information for generating the list of video-recorded contents is also included in the data recorded in the playlist file or clip information file FIG. 9 illustrates an exemplary list of video-recorded contents displayed on the display part in the information processing apparatus 30 in order to enable the user to select contents to be reproduced from various contents recorded in the information recording medium.

The list of video-re corded contents illustrated in FIG. 9 includes each item of information associated with the video-recorded contents (programs) described below.
(1) Title
(2) Video-record time
(3) Broadcasting station
(4) Additional information 1 (program genre)
(5) Additional information 2 (video information: codec/resolution)

For example, the list of video-recorded contents including the information is displayed on the display part in the information processing apparatus, and the user can select contents to be reproduced from the displayed list and can start the reproduction processing.

All the data included in the list of video-recorded contents illustrated in FIG. 9 is recorded in the playlist file or the clip information file in the BDAV format data.

An application for performing the data processing on the BDAV format data generates a video recording list as illustrated in FIG. 9 and displays it on the display part by use of the data recorded in the playlist file or the clip information file.

Therefore, in a case where the MMT format data is recorded as BDAV format data in the medium, the information processing apparatus 30 needs to select video-recorded contents' attribute data similar to the data output as the list of video-recorded contents illustrated in FIG. 9 from the MMT format data, and to record the selected data in a playlist file and a clip information file defined in the BDAV format.

The specific processings will be described below.

Exemplary recording of specific video-recorded contents' attribute data in each of a playlist file and a clip information file will be sequentially described below.

[5. Exemplary Recording of Video-Recorded Contents' Attribute Data in Playlist File]

Exemplary recording of video-recorded contents' attribute data in a playlist file will be first described with reference to FIG. 10.

As described above, a playlist file records information associated with data to be reproduced by use of the playlist. Specifically, the playlist file defines the content reproduction order and the like, for example, and has designation information and the like of the clip information file recording the reproduction position information and the like.

FIG. 10 is a diagram illustrating a data configuration (syntax) of one playlist.

Main data recorded in the playlist illustrated in FIG. 10 will be described.

Version number (version number) indicates the version number of the playlist.

Length (length) indicates the number of bytes immediately from the length field to the end of the playlist file configuration data.

CPI type (CPI_type) is information indicating a CPI type in the clip information file referred to by the play item (PlayItem) defined in the playlist file. Characteristic Point Information (CPI) is data recorded in the clip information file, such as data for acquiring the data address at a reproduction start point. CPI includes EP_map, for example.

EP_map has address information for finding the place of an entry point (EP) to start decoding in the AV stream.

User interface application information (UIAppInfoPlayList) 101 is a region in which the parameters of the user interface application for the playlist are recorded.

The data applied to display the list of video-recorded contents (programs) described with reference to FIG. 9, for example, is recorded in the field.

The user interface application information (UIAppInfoPlayList) 101 will be further described in detail with reference to FIG. 11.

The number of play items (number of PlayItems) indicates the number of play items (PlayItem) defined in the playlist file.

The user interface application information (UIAppInfoPlayList) 101 will be described below in detail with reference to FIG. 11.

FIG. 11 is a diagram illustrating a data configuration (syntax) of the user interface application information (UIAppInfoPlayList) 101.

The user interface application information (UIAppInfoPlayList) 101 records the following data, for example, as illustrated in FIG. 11.
(P1) Video-record time/date (record_time_and_date)
(P2) Channel number (channel_number)
(P3) Channel name (channel_name)
(P4) Video-recorded program name (Playlist_name)
(P5) Video-recorded program details (Playlist_detail)

All the information is available as display data of the list of video-recorded contents (programs) illustrated in FIG. 9.

(P1) Video-Record Time/Date (Record_Time_and_Date)

The field is a field with 4×14=56 bits for recording the record start time/date of contents to be reproduced (stream file storage contents to be reproduced) in the playlist. The field indicates 14 numbers of year/month/day/hour/minute/second coded in 4-bit Binary Coded Decimal (BCD).

For example, 2016/07/01:01:02:03 is recorded as [0×20160701010203]

(P2) Channel Number (Channel_Number)

The field indicates the channel number or service number of a provider of contents to be reproduced (stream file storage contents to be reproduced) in the playlist, (P3) Channel Name (Channel_Name)

The field indicates the channel name or service name of a provider of contents to be reproduced (stream file storage contents to be reproduced) in the playlist.

(P4) Video-Recorded Program Name (Playlist_Name)

The field records the name of the playlist, or in many cases, the title (program) name of contents to be reproduced (stream file storage contents to be reproduced) in the playlist.

(P5) Video-Recorded Program Details (Playlist_Detail)

The field records detailed information of contents to be reproduced (stream file storage contents to be reproduced) in the playlist, such as information indicating program genre or cast, for example.

In this way, the playlist file defined in the BDAV format needs to record each item of information described below as data available as display data of the list of video-recorded contents (programs) described above with reference to FIG. 9.

(P1) Video-record time/date (record_time_and_date)
(P2) Channel number (channel_number)
(P3) Channel name (channel_name)
(P4) Video-recorded program name (Playlist_name)
(P5) Video-recorded program details (Playlist_detail)

A playlist file recording each item of data needs to be generated during the video-recording processing in order to display the list of video-recorded contents (programs) illustrated in FIG. 9.

For example, the information processing apparatus which receives contents (program) delivered from a broadcasting station in the MMT format data and records the received contents in the information recording medium needs to extract the data corresponding to (P1) to (P5) described above from the received data in the MMT format data, and to generate a playlist file recording the data therein.

As described above with reference to FIG. 2 and others, the MMT format data includes a signaling message configured of the setting information required to receive contents (programs) in the information processing apparatus 30, the guidance information or notification information of program guide and the like, the control information, and the like.

The signaling messages defined in the MMT format include a signaling message (MMT-SI) transmitted in MMTP packets and a signaling message (TLV-SI) transmitted in TLV packets.

The information processing apparatus 30 which receives the MMT format data and records the received data in the medium extracts the data corresponding to (P1) to (P5) described above from a signaling message of TLV-SI, MMT-SI, or the like included in the MMT format, and generates a playlist file recording the data therein.

Specific examples of the processings performed by the information processing apparatus 30 will be described with reference to FIG. 12.

FIG. 12 illustrates (A) MMT format data received by the information processing apparatus 30, and (B) BDAV format data in a format of data recorded in a medium.

(A) MMT format data of FIG. 12 indicates only the respective items of data including a signaling message (TLV-SI) 120 transmitted in TLV packets and a MMTP packet signaling message (MMT-SI) 130.

On the other hand, (B) BDAV format data indicates only a playlist 150.

The playlist 150 illustrated in FIG. 12(B) indicates the video-recorded contents' attribute information used as output data of the list of video-recorded contents (programs) described above with reference to FIG. 10 and FIG. 11, or the following items of data.

(P1) Video-record time/date (record_time_and_date)
(P2) Channel number (channel_number)
(P3) Channel name (channel_name)
(P4) Video-recorded program name (Playlist_name)
(P5) Video-recorded program details (Playlist_detail)

The information processing apparatus 30 acquires data similar to the video-recorded contents' attribute information (P1) to (P5) from the data recording fields of the signaling message (TLV-SI) 120 and the signaling message (MMT-SI) 130 transmitted in the MMT format, and records it in the playlist 150 in order to record the video-re corded contents' attribute information (P1) to (P5) in the playlist.

As illustrated in FIG. 12, each item of the video-recorded contents' attribute information (P1) to (P5) to be recorded in the playlist 150 corresponds to the following data (M1) to (M5) recorded in the MMT format, respectively.

The information processing apparatus acquires each item of data of (P1) to (P5) to be recorded in the playlist from the MMT format data and records it in the playlist as follows.

For (P1) Video-record time/date (record_time_and_date), (M1) Program start time recorded in an event information table (MH-EIT) 131 transmitted as the signaling message (MMT-SI) 130 is acquired and recorded in the playlist 150.

The event information table (MH-event information table (EIT)) 131 defined in the MMT format records notification information associated with a program such as program name, broadcast time/date, and explanation of contents.

Additionally, the event information table (MH-EIT) 131 is stored in a MMTP packet with a packet ID=0×8000, and the information processing apparatus can determine the packet storing the event information table (MH-EIT) 131 on the basis of the packet ID.

For (P2) Channel number (channel_number), (M2) TLV stream ID recorded in a TLV network information table (TLV-NIT) 121 transmitted as the signaling message (TLV-SI) 120 is acquired and recorded in the playlist 150.

The TLV network information table (TLV-NIT) 121 defined in the MMT format records notification information associated with a physical network.

For (P3) Channel name (channel_name), (M3) Provider name/service name recorded in a broadcaster information table (MH-BIT) 132 transmitted as the signaling message (MMT-SI) 130 is acquired and recorded in the playlist 150.

The broadcaster information table (MH-bloadcaster information table (BIT)) 132 defined in the MMT format records notification information associated with a broadcaster of a broadcasting station or the like on a network.

Additionally, the broadcaster information table (MH-BIT) 132 is stored in a MMTP packet with a packet ID=0×8002, and the information processing apparatus can determine the packet storing the broadcaster information table (MH-BIT) 132 on the basis of the packet ID.

For (P4) Video-recorded program name (Playlist_name), (M4) Event name recorded in the event information table (MH-EIT) 131 transmitted as the signaling message (MMT-SI) 130 is acquired and recorded in the playlist 150.

For (P5) Video-recorded program details (Playlist_detail), (M5) Event details recorded in the event information table (MH-EIT) 131 transmitted as the signaling message (MMT-SI) 130 is acquired and recorded in the playlist 150.

In this way, the content (program) attribute information to be recorded in the playlist file, or the following information corresponding to:
(P1) Video-record time/date (record_time_and_date)
(P2) Channel number (channel_number)
(P3) Channel name (channel_name)
(P4) Video-recorded program name (Playlist_name)
(P5) Video-recorded program, details (Playlist_detail) is recorded in the TLV-SI 120 and the MMT-SI 130 as signaling data delivered in the MMT format:
(M1) Program start time
(M2) TLV stream ID
(M3) Provider name/service name
(M4) Event name
(M5) Event details.

The information processing apparatus which receives the MMT format data and records it as BDAV format data in the medium acquires each item of data of (M1) to (M5) described above from the TLV-SI 120 and the MMT-SI 130 as signaling data included in the MMT format data, and stores the data in the playlist 150 defined in the BDAV format and records it in the medium.

Specific examples of the processings of acquiring each item of the above information (M1) to (M5) from the MMT format data and recording it in the playlist file will be described below in and subsequent to FIG. 13.

[5-1. Exemplary Processing of Recording (P1) Video-Record Time/Date (Record_Time_and_Date)]

A processing of acquiring "(M1) Program start time" in the MMT format data corresponding to "(P1) Video-record time/date (record_time_and_date)" as information recorded in the playlist will be first described with reference to FIG. 13.

As described above, "(M1) Program start time" is acquired from the event information table (MH-EIT) 131 transmitted as the signaling message (MMT-SI) 130.

The event information table (MH-Event information Table (EIT)) 131 defined in the MMT format records notification information associated with a program such as program name, broadcast time/date, and explanation of contents.

FIG. 13 is a diagram illustrating a data configuration (syntax) of the event information table (MH-Event Information Table (EIT)) 131.

The even information table (MH-EIT) sets therein an event information recording region 160 for recording various items of information in units of event such as program.

Each item of the following data associated with each event (program) is recorded in the event information recording region 160.

(1) Event (program) ID (event_id)
(2) Program start time (start_time)
(3) Program duration (duration)
(4) Program fee information (charged/free (free_CA_mode))
(5) Program detail information (descriptor)

The information is data recorded in units of program.

(2) Program start time (start_time) among the above data corresponds to (M1) Program start time described with reference to FIG. 12, and the information processing apparatus acquires "(M1) Program start time" information corresponding to contents (program) recorded in the medium from the event information table (MH-EIT) illustrated in FIG. 13.

Further, the information processing apparatus stores the acquired "(M1) Program start time" information in "(P1) Video-record time/date (record_time_and_date)" recording region in the playlist file generated in the BDAV format, and records it in the information recording medium.

[5-2. Exemplary Processing of Recording (P2) Channel Number (Channel_Number)]

A processing of acquiring "(M2) TLV stream ID" in the MMT format data corresponding to "(P2) Channel number (channel_number)" as information recorded in the playlist will be described below with reference to FIG. 14.

As described above, "(M2) TLV stream ID" is acquired from the TLV network information table (TLV-NIT) 121 transmitted as the signaling message (TLV-SI) 120 described with reference to FIG. 12.

The TLV network information table (TLV-NIT) 121 defined in the MMT format records notification information associated with a physical network.

FIG. 14 is a diagram illustrating a data configuration (syntax) of the TLV network information table (TLV-NIT) 121.

The TLV network information table (TLV-NIT) sets therein a network information recording region 162 for recording various items of information associated with a communication network for exchanging contents (programs) in units of stream (channel).

The network information recording region 160 records network information in units of stream (channel) therein. The network information includes (M2) TLV stream ID described with reference to FIG. 12.

(M2) TLV stream ID indicates a TLV stream identification number, specifically a channel number providing a program.

The information processing apparatus acquires "(M2) TLV stream ID" information corresponding to contents (program) recorded in the medium from the TLV network information table (TLV-NIT) illustrated in FIG. 14.

Further, the information processing apparatus stores the acquired "(M2) TLV stream ID" information in the "(P2) channel number (channel_number)" recording region in the playlist file generated in the BDAV format, and records it in the information recording medium.

[5-3. Exemplary Processing of Recording (P3) Channel Name (Channel_Name)]

A processing of acquiring "(M3) Provider name/service name" in the MMT format data corresponding to "(P3) Channel name (channel_name)" as information recorded in the playlist will be described below with reference to FIG. 15.

As described above, "(P3) Channel name (channel_name)" is acquired from the broadcaster information table (MH-BIT)) 132 transmitted a s the signaling message (MMT-SI) 130 described with reference to FIG. 12.

The broadcaster information table (MH-bloadcaster information table (BIT)) 132 defined in the MMT format records notification information associated with a broadcaster of a broadcasting station or the like on a network.

FIG. 15 is a diagram illustrating a data configuration (syntax) of a MH-broadcaster name descriptor as configuration data of the broadcaster information table (MH-BIT) defined in the MMT format.

As illustrated, the MH-broadcaster name descriptor recorded in the broadcaster information table (MH-BIT) includes a region for recording the name of a provider or a service delivering contents (programs), or a region (char (meaning a character string recording region)) for recording (M3) Provider name/service name described with reference to FIG. 12.

This specifically corresponds to a channel name (broadcasting station name) recording region, for example.

The information processing apparatus acquires "(M3) Provider name/service name" information corresponding to contents (program) recorded in the medium from the MH-broadcaster name descriptor in the broadcaster information table (MH-BIT) illustrated in FIG. 15.

Further, the information processing apparatus stores the acquired "(M3) Provider name/service name" information in the "(P3) Channel name (channel_name)" recording region in the playlist file generated in the BDAV format, and records it in the information recording medium.

[5-4. Exemplary Processing of Recording (P4) Video-Recorded Program Name (Playlist_Name) and (P5) Video-Recorded Program details (Playlist_Detail)]

A processing of acquiring "(M4) Event name" and "(M5) Event details" in the MMT format data corresponding to "(P4) Video-recorded program name (Playlist_name)" and "(P5) Video-recorded program details (Playlist_detail)" as information recorded in the playlist will be described below with reference to FIG. 16.

As described above, "(P4) Video-recorded program name (Playlist_name)" and "(P5) Video-recorded program details (Playlist_detail)" are acquired from the event information table (MH-EIT) 131 transmitted as the signaling message (MMT-SI) 130 described with reference to FIG. 12 similarly to (P1) Video-record start time (record_time_and_date) described above.

The event information table (MH-event information table (EIT)) 131 defined in the MMT format records notification information associated with a program such as program name, broadcast time/date, and explanation of contents.

The data configuration (syntax) of the event information table (MH-EIT) is as described above with reference to FIG. 13, and the event information recording region 160 illustrated in FIG. 13 records each item of data described below associated with each event (program).

(1) Event (program) ID (event_id)
(2) Program start time (start_time)
(3) Program duration (duration)
(4) Program fee information (charged/free (free_CA_mode))
(5) Program detail information (descriptor)

The information is data recorded in units of program.

"MH-short event descriptor (MH-Short_Event_Descriptor)" is recorded as data configuring "(5) Program detail information (descriptor)" among the data.

FIG. 16 is a diagram illustrating a data configuration (syntax) of "MH-short event descriptor (MH-Short_Event_Descriptor)" recorded in the event information table (MH-EIT).

As illustrated in FIG. 16, the data recording regions including (M4) Event (program) name recording region (event_name_char) and (M5) Event (program) detail recording region (text_char) described above with reference to FIG. 12 are included in "MH-short event descriptor" recorded in the event information table (MH-EIT).

The information processing apparatus acquires "(M4) Event (program) name" information and "(M5) Event (program) detail" information corresponding to contents (program) recorded in the medium from "MH-short event descriptor" in the event information table (MH-EIT) illustrated in FIG. 16.

Further, the information processing apparatus stores the acquired "(M4) Event (program) name" information and "(M5) Event (program) detail" information in the following data recording regions in the playlist file generated in the BDAV format, or (P4) Video-recorded program name (Playlist_name) recording region, and
(P5) Video-recorded program details (Playlist_detail) recording region, and records them in the medium.

[6. Exemplary Recording of Video-Recorded Contents' Attribute Data in Clip Information File]

Exemplary recording of video-recorded contents' attribute data in a clip information file will be described below in and subsequent to FIG. 17.

As described above, a clip information file records therein information associated with data to be reproduced by use of the clip information file. Specifically, the clip information file has the reproduction position information and the like of the clip AV stream file, for example.

FIG. 17 is a diagram illustrating a data configuration (syntax) of one clip information file.

The clip information file records therein information associated with reproduction data associated with the clip information. As illustrated in FIG. 17, each item of information described below is recorded, for example.

Clip information [ClipInfo( )] 201
Sequence information [SequenceInfo( )] 202
Program information [ProgramInfo( )] 203

The clip information [ClipInfo( )] 201 records therein attribute information of the AV stream file corresponding to the clip information file.

The sequence information [SequenceInfo( )] 202 records therein information associated with a sequence of reproducing data to be reproduced stored in the AV stream file corresponding to the clip information file.

The program information [ProgramInfo( )] 203 will be described.

Information recorded in the program information [ProgramInfo( )] 203 will be described in and subsequent to FIG. 18.

The program information [ProgramInfo( )] 203 records therein information associated with a program (program_sequence) including definition information and the like of a reproduction period or a temporal period of the clip AV stream reproduced by the clip information file.

Main data recorded in ProgramInfo illustrated in FIG. 18 will be described.

(a) Program sequence number [num_of_program_sequences]211 records therein the number of program sequences (program_sequence) included in the clip information file.

(b) SPN program sequence start address [SPN_program_sequence_start[i]] 212 records therein a relative address of a place where the program sequence starts on the AV stream file.

(c) Program map PID [program_map_PID[i]] 213 records therein a packet identifier (PID) storing a map of the program sequence (program_sequence).

(d) Stream PID [stream_PID] 214 records therein a packet identifier (PID) storing a stream reproduced according to the program sequence of the clip information file.

(e) Stream coding information [StreamCodingInfo] 215 records therein coding information of a stream to be reproduced.

In this way, the clip information file records therein various items of information required to reproduce the data stored in the associated clip AV stream file to be reproduced.

FIG. 19 is a diagram illustrating a data configuration (syntax) of stream coding information [StreamCodingInfo] set in the program information [ProgramInfo( )] recording region in the clip information file, The stream coding information [StreamCodingInfo] records the following data, (1) Video stream coding information 221
(2) Audio stream coding information 222

Additionally, various coding types of video streams or audio streams recorded in the information recording medium are permitted, and identifiers depending on each coding type of video and audio are previously defined.

A video is associated with a type identifier=0×01, 0×02, 0×1B, and the like, for example, depending on a coding type.

An audio is associated with a type identifier=0×03, 0×04, 0×0F, 0×80, 0×81, and the like depending on a coding type.

Exemplary setting of the coding types of video streams and audio streams defined in the current BDAV format is illustrated in FIG. 20.

For example, the coding type 0×01 is set for a MPEG-1 video stream, the coding type 0×02 is set for a MPEG-2 video stream, and the coding type 0×03 is set for a MPEG-1 audio stream or the like.

Additionally, HEVC coding as a video coding type not defined in the current BDAV format is used for the MMT format.

Further, MPEG-4 AAC coding or MPEG-4 ALS coding as an audio coding type not defined in the current BDAV format is used for the MMT format.

Coding type identifiers need to be newly assigned to the coding types.

FIG. 20 illustrates exemplary setting of coding type identifiers of new coded data in the MMT format data.

Coding type=0x10=MPEG-4 AAC coding audio data
Coding type=0x11=MPEG-4 ALS coding audio data
Coding type=0x24=HEVC coding video data For example, the coding type identifiers of new coded data used in the MMT format are set in this way.

Returning to FIG. 19, the stream coding information [StreamCodingInfo] will be continuously described.

(1) Information recorded as the video stream coding information 221 is each item of information described below.

(1a) Video format (video_format)
(1b) Frame rate (frame rate)
(1c) Aspect ratio (aspect_ratio)

The information relates to a video recorded in the information recording medium. Further, in a case where a video recorded in the medium is data obtained by performing format conversion or the like, for example, on an input video (original video), in a case where it has a different format from the input video (original video), or in other cases, each item of information described below is also recorded as information indicating the original video before conversion or information indicating the original video input on a broadcast wave or the like by the information processing apparatus in addition to the above video information.

(1d) Original video format (original_video_format)
(1e) Original aspect ratio (original_aspect_ratio)

On the other hand, information recorded as (2) Audio stream coding information 222 is each item of information described below.

(2a) Audio type (audio_presentation_type)
(2b) Sampling frequency (sampling_frequency)

Additionally, as described above with reference to FIG. 20, the MMT format data uses new coded data not defined in the current BDAV format.

The new coded data is the following coded data described with reference to FIG. 20

Coding type=0x10=MPEG-4 AAC coding audio data
Coding type=0x11=MPEG-4 ALS coding audio data
Coding type=0x24=HEVC coding video data The coding types of the new coded data used in the MMT format need to be recorded in the stream coding information [StreamCodingInfo] illustrated in FIG. 19.

FIG. 19 illustrates the following information recording regions as new coded data information recording regions.

HEVC coded data-related information recording region 223

MPEG-4 AAC, ALS coded data-related information recording region 224.

The new information recording regions are set in this way so that each item of information of (1a) to (1e) for video data described above and each item of information of (2a) to (2b) for audio data described above are recorded.

Additionally, each item of information of (1a) to (1e) described above and additional information are preferably recorded for HEVC video data.

Exemplary data recorded in the stream coding information [StreamCodingInfo] for HEVC video data will be described with reference to FIG. 21.

Information recorded as stream coding information for HEVC video is each item of information described below as illustrated in FIG. 21(a).

(1) Video format (video_format)
(2) Frame rate (frame rate)
(3) Aspect ratio (aspect_ratio)
(4) Video signal transfer characteristics (video_transfer_characteristics)

The information relates to a video recorded in the information recording medium. Further, in a case where a video recorded in the medium is data obtained by performing format conversion or the like, for example, on an input video (original video), in a case where it has a different format from the input video (original video), or in other cases, each item of information described below is also recorded as information of the original video before conversion or information of the original video input on a broadcast wave or the like by the information processing apparatus in addition to the above video information.

(5) Original video format (original_video_format)
(6) Original aspect ratio (original_aspect_ratio)
(7) Original video signal transfer characteristics (original_video_transfer_characteristics)

FIG. 21(b) is a diagram illustrating specific exemplary recording and meanings of the video signal transfer characteristics (video_transfer_characteristics).

The video signal transfer characteristics (video_transfer_characteristics) are set at any value of 0 to 15. The meaning of each set value is as follows.

0: Not designated
1: VUI transfer characteristics (transfer_characteristics)=1 (Rec. ITU-R BT. 709-5)
2: VUI transfer characteristics (transfer_characteristics)=11 (IEC 61966-2-4)
3: VUI transfer characteristics (transfer_characteristics)=4 (Rec. ITU-R BT. 2020)
4: VUI transfer characteristics (transfer_characteristics)=6 (SMPTE ST 2084)
5: VUI transfer characteristics (transfer_characteristics)=8 (ARIB STD-B607)
6 to 15: Reserve The video signal transfer characteristics (video_transfer_characteristics) are information indicating a correspondence between an input signal value and an output signal.

Rec. ITU-R BT. 709-5, IEC 61966-2-4, Rec. ITU-R BT. 2020, SMPTE ST 2084, and ARIB STD-B607 indicate an I/O characteristic curve indicating a correspondence between an input signal and an output signal, and have different characteristics.

The I/O characteristics of the HEVC coded video can be known depending on a set value of 0 to 15 of the video signal transfer characteristics (video_transfer_characteristics).

As described with reference to FIG. 19, the following data is recorded in the stream coding information [StreamCodingInfo] set in the program, information [ProgramInfo( )] recording region in the clip information file.

(1) Video stream coding information 221
(2) Audio stream coding information 222

Information recorded as (1) Video stream coding information 221 is each item of information described below, (1a) Video format (video_format)
(1b) Frame rate (frame rate)

(1c) Aspect ratio (aspect_ratio)
(1d) Original video format (original_video_format)
(1e) Original aspect ratio (original_aspect_ratio)

Data, which is received by the information processing apparatus on a broadcast wave or the like, for example, is the MMT format data, and includes video data in a data format not defined in the conventional BDAV format.

Thus, each item of video information in (1a) to (1e) described, above needs to be modified and added depending on a video format stored in the MMT format data.

Exemplary modifications will be described in and subsequent to FIG. 22.

FIG. 22 is a diagram illustrating exemplary modifications of the following data recording regions,
(1a) Video format (video_format)
(1d) Original video format (original_video_format)

FIG. 22 illustrates exemplary recorded data described below.
(p) Data recorded in conventional video format
(q) Data recorded in new video format
(p) Data recorded in conventional video format is set as follows.

Each of the bit values of 0 to 15 is associated with each video form of 480i, 576i, 480p, 1080i, 720p, and 1080p.

Additionally, i indicates an interlace video output configuration and p indicates a progressive video output configuration, and the numerical values of 480, 576, and the like indicate the number of horizontal pixels in a video.

1080p is a progressive video with 1080 horizontal pixels.

(q) Data recorded in new video format is set such that (p) Data recorded in conventional video format is further added with the definition of 4K video or 8K video. The illustrated following data 251 is added.
Bit value: 7=2160p
Bit value: 8=4380p 2160p corresponds to a video format of 4K video and 4380p corresponds to a video format of 8K video.

These are the latest video formats capable of being delivered in the MMT format.

The new definition data is added to the BDAV format so that a video in the latest format delivered in the MMT format can be recorded in a correct video data format (coding information) in the stream coding information in the clip information file defined in the BDAV format.

Figure 23:
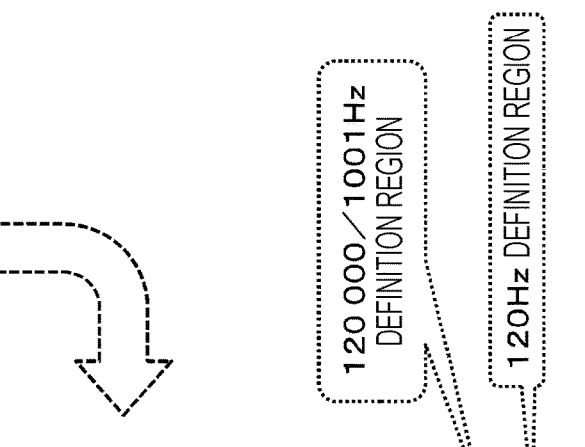
FIG. 23 is a diagram for explaining exemplary data recording of a frame rate (frame rate) of the clip information file.

FIG. 23 is a diagram illustrating exemplary modifications of the following data recording region.
(1b) Frame Rate (Frame Rate)

FIG. 23 illustrates exemplary recorded data described below.
(p) Data recorded at conventional frame rate
(q) Data recorded at new frame rate
(p) Data recorded at conventional frame rate is set as follows.

Each of the bit values of 0 to 15 is associated with each video with a frame rate of 24000/1001 (23.976) to 60 Hz.

(q) Data recorded at new frame rate is set such that (p) Data recorded at conventional frame rate is further added with definition data of a high frame rate. The illustrated following data 252 is added.
Bit value: 9=120000/1001 (119.94) Hz
Bit value: 10=120 Hz The data is definition information of video data at a high frame rate of about 120 Hz.

These are the latest video formats capable of being delivered in the MMT format.

The new definition data is added to the BDAV format so that a video in the latest format delivered in the MMT format can be recorded in a correct video data format (coding information) in the stream coding information in the clip information file defined in the BDAV format.

FIG. 24 is a diagram illustrating exemplary recording of the following data.
(1c) Aspect ratio (aspect_ratio)
(1e) Original aspect ratio (original_aspect_ratio)

Data delivered in the MMT format is also within the definition data in the conventional BDAV format, and the aspect ratio does not need to be particularly changed.

As illustrated in FIG. 24, each item of data of 4:3, 16:9, and 2.21:2 can be recorded as an aspect ratio for each of the bit values of 0 to 15.

Further, as described with reference to FIG. 19, (2) Audio stream coding information 222 is recorded in the stream coding information [StreamCodingInfo] set in the program information [ProgramInfo( )] recording region in the clip information file.

Information recorded as (2) Audio stream coding information 222 is each item of information described below.
(2a) Audio type (audio_presentation_type)
(2b) Sampling frequency (sampling_frequency)

Exemplary recording of each item of the data will be described with reference to FIG. 25.

(a) Audio type recording data in FIG. 25 is set such that various items of audio type information such as monaural channel, stereo, and surround can be identified for a bit value of 0 to 15.

(b) Sampling frequency in FIG. 25 is set such that each sampling frequency of 48 to 192 kHz can be identified for a bit value of 0 to 15.

Data delivered in the MMT format is also within the definition data in the current BDAV format, and the audio data formats do not need to be particularly modified.

As described with reference to FIG. 17 to FIG. 25, the stream coding information [StreamCodingInfo] set in the program information [ProgramInfo( )] recording region needs to be recorded in the clip information file defined in the BDAV format.

Specifically, as described with reference to FIG. 19 and others, the following data requires to be recorded.
(1) Video stream coding information,
(2) Audio stream coding information Additionally, as described with reference to FIG. 17 to FIG. 25, information for HEVC video data newly used in the MMT format data or information for MPEG-4-AAC, ALS coded audio data also needs to be recorded in the stream coding information in the future.

The information processing apparatus can confirm the attributes of video data or audio data to be reproduced by use of the stream coding information, and can perform the decoding processing and the reproduction processing depending on the confirmed video attributes or audio attributes.

Further, also in a case where the list of video-recorded contents (programs) described above with reference to FIG. 9 is displayed, the information is acquired from the clip information file to generate display data.

The information processing apparatus which receives contents (program) delivered from a broadcasting station, for example, as MMT format data and records the received contents in the information recording medium needs to extract information corresponding to the video attribute information (video stream coding information) and the audio attribute information (audio stream coding information)

from the received data according to the MMT format data, and to generate a clip information file recording the data therein.

As described above with reference to FIG. 2 and others, the MMT format data includes a signaling message configured of the setting information required to receive contents (program) in the information processing apparatus 30, the guidance information or notification information of program guide and the like, the control information, and the like.

The signaling messages defined in the MMT format include a signaling message (MMT-SI) transmitted in MMTP packets and a signaling message (TLV-SI) transmitted in TLV packets.

The information processing apparatus 30 which receives the MMT format data and records the received data in the medium extracts data corresponding to the video attribute information (video stream coding information) and the audio attribute information (audio stream coding information) from the signaling message of TLV-SI, MMT-SI, or the like included in the MMT format, and generates a clip information file recording the data therein.

Specific examples of the processings performed by the information processing apparatus 30 will be described with reference to FIG. 26.

Figure 26:
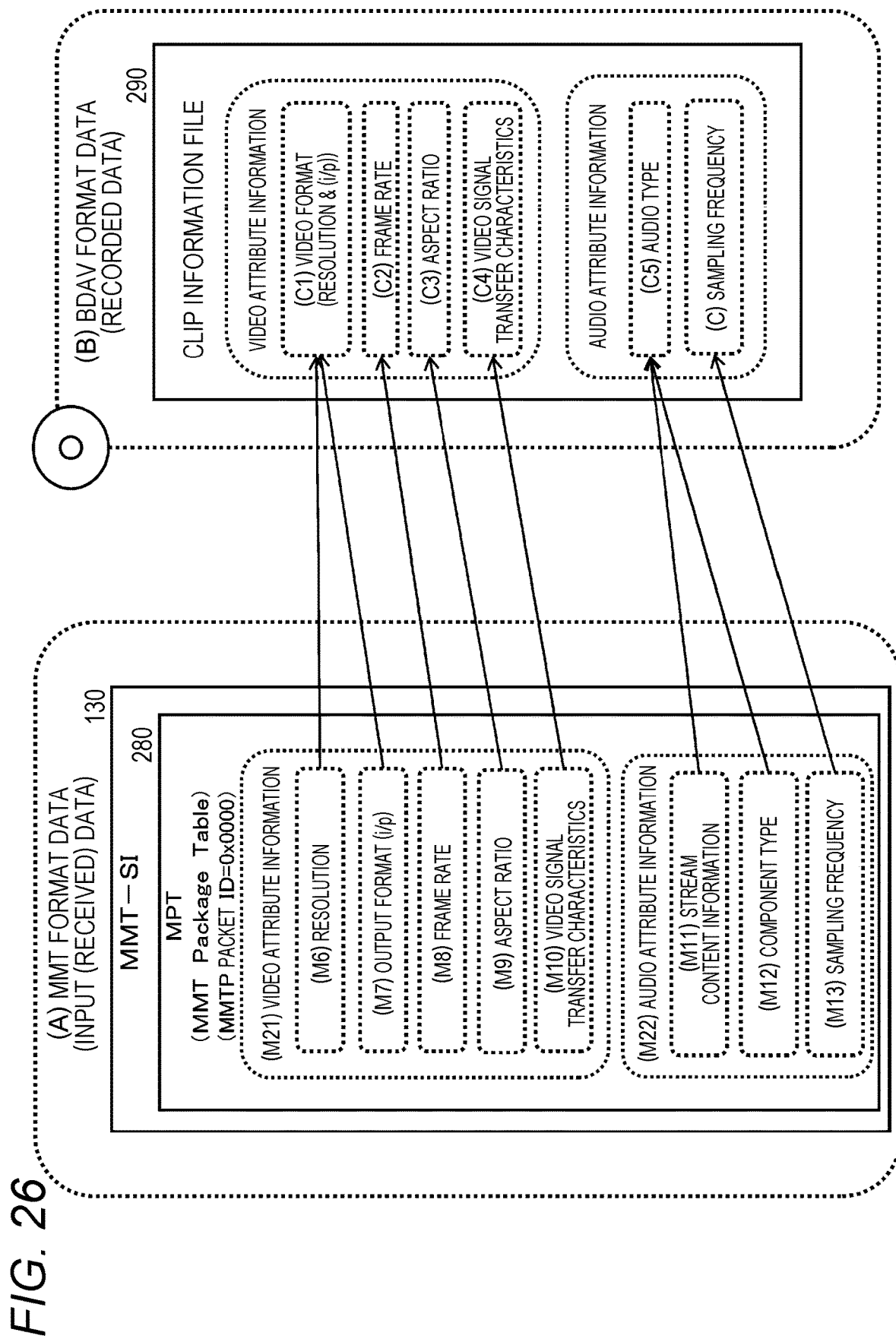
FIG. 26 is a diagram for explaining exemplary processings of recording recorded data of the MMT format data in the clip information file.

FIG. 26 illustrates (A) MMT format data received by the information processing apparatus 30 and (B) BDAV format data as a format of data recorded in the medium.

(A) MMT format data in FIG. 26 indicates only the MMTP packet signaling message (MMT-SI) 130.

On the other hand, (B) BDAV format data indicates only a clip information file 290.

The clip information file 290 illustrated in FIG. 26(B) is required to record each item of information described below as described above with reference to FIG. 17 to FIG. 25.

Video attribute information:
(C1) Video format (resolution and video output format (i: interlace/p: progressive)
(C2) Frame rate
(C3) Aspect ratio
(C4) Video signal transfer characteristics
Audio attribute information:
(C5) Audio type
(C6) Sampling frequency In order to record the information in the clip information file, the information processing apparatus 30 acquires similar data to the video attribute information and the audio attribute information from a signaling message transmitted in the MMT format such as the signaling message (MMT-SI) 130 illustrated in FIG. 26(A), and records it in the clip information file 290.

Additionally, in a case where the video data attributes recorded in the information recording medium are different from the video attributes of the original input video as described above with reference to FIG. 19 and others, the video attribute information recorded in the clip information file needs to record the attribute information of the original video therein.

For example, this is applicable also to the above video attributes (C1) to (C4), and in a case where the information processing apparatus performs data conversion on the input video and the above characteristics (C1) to (C4) are different between the input video and the video recorded in the medium, the video attributes of each of the input video and the video recorded in the medium are recorded in the clip information file.

Additionally, in this case, the video attribute information of the original video is acquired from the signaling message (MMT-SI) 130 in the MMT format data, and the video attribute information of the attributes of the data recorded in the medium is generated and recorded in the clip information file by the information processing apparatus which performs the conversion processing.

As illustrated in FIG. 26, the attribute information (C1) to (C6) to be recorded in the clip information file 290 corresponds to the following data (M6) to (M13) recorded in the MMT format, respectively.

The information processing apparatus acquires each item of data of (C1) to (C6) to be recorded in the clip information file from the MMT format data and records it in the clip information file as described below.

For (C1) Video format (resolution and video output format (i: interlace/p: progressive), the data including (M6) Resolution and (M7) Output format (i: interlace/p: progressive) recorded in a MMT package table (MPT) 280 transmitted as the signaling message (MMT-SI) 130 is acquired and recorded in the clip information file 290.

The MMT package table (MPT) 280 defined in the MMT format records data attribute information (asset descriptor) in detail per data type (asset type) such as video, audio, and subtitle, for example.

A data configuration of the MMT package table (MPT) 280 will be described below.

Additionally, the MMT package table (MPT) 280 is stored in a MMTP packet with a packet ID=0×0000, and the information processing apparatus can determine the packet storing the MMT package table (MPT) 280 therein on the basis of the packet ID.

In addition, for the data:
(C2) Frame rate
(C3) Aspect ratio
(C4) Video signal transfer characteristics, which are the video attribute information to be recorded in the clip information file 290, the data:
(M8) Frame rate
(M9) Aspect ratio
(M10) Video signal transfer characteristics, which are recorded in the MMT package table (MPT) 280 transmitted as the signaling message (MMT-SI) 130, is acquired and recorded in the clip information file 290.

Further, also for the data:
(C5) Audio type
(C6) Sampling frequency, which are the audio attribute information to be recorded in the clip information file 290, the data:
(M11) Stream content information
(M12) Component type
(M13) Sampling frequency, which are recorded in the MMT package table (MPT) 280 transmitted as the signaling message (MMT-SI) 130, is acquired and recorded in the clip information file 290.

In this way, the content (program) attribute information to be recorded in the clip information file, or the following information:
(M6) Resolution
(M7) Output format (i: interlace/p: progressive)
(M8) Frame rate
(M9) Aspect ratio
(M10) Video signal transfer characteristics
(M11) Stream content information
(M12) Component type
(M13) Sampling frequency, which correspond to the information:
(C1) Video format (resolution and video output format (i: interlace/p: progressive)

(C2) Frame rate
(C3) Aspect ratio
(C4) Video signal transfer characteristics
(C5) Audio type
(C6) Sampling frequency, is recorded in the MMT-SI 130 as signaling data delivered in the MMT format.

The information processing apparatus which receives the MMT format data and records it as BDAV format data in the medium acquires each item of data of (M6) to (M13) described above from the MMT-SI 130 as signaling data included in the MMT format data, and performs the processings of storing the data in the clip information file 290 defined in the BDAV format and recording it in the medium.

[6-1. MMT Package Table (MPT)]

There will be first described with reference to FIG. 27 a configuration of a MMT package table (MPT) recording the configuration data of the MMT-SI as signaling data included in the MMT format data such as the video attribute information and the audio attribute information, or (M6) Resolution
(M7) Output format (i: interlace/p: progressive)
(M8) Frame rate
(M9) Aspect ratio
(M10) Video signal transfer characteristics
(M11) Stream content information
(M12) Component type
(M13) Sampling frequency FIG. 27 is a diagram illustrating a data configuration (syntax) of the MMT package table (MPT).

The MMT package table (MPT) 280 defined in the MMT format records therein, for example, data attribute information (asset descriptor) per data type (asset type) such as video, audio, and subtitle in detail as described above.

The MMT package table (MPT) includes the data recording regions such as:

Asset type (asset_type)
Asset descriptor (asset_descriptors_byte), as illustrated in FIG. 27.

Asset type (asset_type) is a region in which an identifier per data type such as video, audio, or subtitle is recorded. Asset is a unit of data processings having common attributes, and video, audio, subtitle, and the like are set as different assets, respectively.

Specific examples of asset type (asset_type) recorded in the MMT package table (MPT) are illustrated in FIG. 28.

As illustrated in FIG. 28, asset type (asset_type) recorded in the MPT has the following kinds, for example.

hvc1: HEVC video
mp4a: Audio
stpp: Subtitle and the like
aapp: Application

Any type information described above is recorded in the asset type (asset_type) recording field in the MPT illustrated in FIG. 27, for example.

Each asset type (such as video, audio, or subtitle), and various items of attribute information depending on the data type, such as resolution information for video, for example, are recorded in the asset descriptor (asset_descriptors_byte) field illustrated at the lower stage of FIG. 27.

The video and audio attribute information described above with reference to FIG. 26, or the specific information:

(M6) Resolution
(M7) Output format (i: interlace/p: progressive)
(M8) Frame rate
(M9) Aspect ratio
(M10) Video signal transfer characteristics
(M11) Stream content information
(M12) Component type
(M13) Sampling frequency is recorded mainly by use of the "asset descriptor (asset_descriptors_byte)" field.

Specific examples of the processings of acquiring the respective items of information (M6) to (M13) from the MMT format data and recording them in the clip information file will be described below in and subsequent to FIG. 29.

[6-2. Exemplary Processing of Recording Video Attribute Information in Clip Information File]

An exemplary processing of recording video attribute information in a clip information file will be first described in and subsequent to FIG. 29.

As described above with reference to FIG. 26, the video attribute information to be recorded in the clip information file is the following information.

(C1) Video format (resolution and video output format (i: interlace/p: progressive)
(C2) Frame rate
(C3) Aspect ratio
(C4) Video signal transfer characteristics In order to record the information in the clip information file, the information processing apparatus 30 acquires the following data recorded in the MMT package table (MPT) 280 included in a signaling message transmitted in the MMT format such as the signaling message (MMT-SI) 130 illustrated in FIG. 26(A).

(M6) Resolution
(M7) Output format (i: interlace/p: progressive)
(M8) Frame rate
(M9) Aspect ratio
(M10) Video signal transfer characteristics FIG. 29 is a diagram illustrating the video attribute information recorded in the MMT package table (MPT) described with reference to FIG. 27.

That is, FIG. 29 is a diagram illustrating a data configuration (syntax) of the video component descriptor (Video_Component_Descriptor), which is exemplary data recorded as asset descriptor (asset_descriptors_byte) in a case where asset type (asset_type) in the MPT illustrated in FIG. 27 is a type identifier (hvc1) for video.

Additionally, the video data transmitted in the MMT format is HEVC-coded HEVC video, and the attribute information of the HEVC video is recorded in the video component descriptor (Video_Component_Descriptor).

As illustrated in FIG. 29, the following video attribute information is recorded in the video component descriptor (Video_Component_Descriptor).

(M6) Resolution (video_resolution)
(M7) Output format (i: interlace/p: progressive) (video_scan_flag)
(M8) Frame rate (video_frame_rate)
(M9) Aspect ratio (video_aspect_ratio)
(M10) Video signal transfer characteristics (video_transfer_characteristics)

The information processing apparatus which performs the processing of recording data in the information recording medium reads the video attribute information from the MMT package table (MPT), and generates the data to be recorded in the clip information file recorded in the information recording medium, or the data to be recorded such as (C1) Video format (resolution and video output format (i: interlace/p: progressive)
(C2) Frame rate
(C3) Aspect ratio
(C4) Video signal transfer characteristics, and stores it in the clip information file.

Specific examples of the following data recorded in the MMT package table (MPT) illustrated in FIG. 29, or the data:

(M6) Resolution (video_resolution)

(M7) Output format (i: interlace/p: progressive) (video_scan_flag)

(M8) Frame rate (video_frame_rate)

(M9) Aspect ratio (video_aspect_ratio)

(M10) Video signal transfer characteristics (video_transfer_characteristics), will be described in and subsequent to FIG. 30.

FIG. 30 is a diagram illustrating specific examples of (M6) Resolution (video_resolution) recorded in the MMT package table (MPT).

Any bit value of 0 to 15 is stored as video signal resolution information in the MMT package table (MPT), and is associated with the number of pixels of 180 to 4320 depending on each bit value. The number of pixels corresponds to the number of horizontal pixels in a video, and for example, 2160 at a bit value of 6 corresponds to 4K video, and 4320 at a bit value of 7 corresponds to 8K video.

(M7) Output format (i: interlace/p: progressive) (video_scan_flag) recorded in the MMT package table (MPT) illustrated in FIG. 29 is a flag for which a bit value of 0 or 1 is set depending on whether the system is the interlace system or the progressive system.

FIG. 31 is a diagram illustrating specific examples of (M8) Frame rate (video_frame_rate) recorded in the MMT package table (MPT) illustrated in FIG. 29.

Any bit value of 0 to 31 is stored as frame rate information in the MMT package table (MPT), and is associated with a frame rate (f/sec) of 15 to 120 depending on each bit value.

FIG. 32 is a diagram illustrating specific examples of (M9) Aspect ratio (video_aspect_ratio) recorded in the MMT package table (MPT) illustrated in FIG. 29.

Any bit value of 0 to 15 is stored as aspect ratio information in the MMT package table (MPT), and is associated with an aspect ratio of 4:3 to 16:9 depending on each bit value.

FIG. 33 is a diagram illustrating specific examples of (M10) Video signal transfer characteristics (video_transfer_characteristics) recorded in the MMT package table (MPT) illustrated in FIG. 29.

Any bit value of 0 to 15 is stored as video signal transfer characteristics information in the MMT package table (MPT), and is associated with video signal transfer characteristics (I/O characteristics) such as BT. 709-5 or SMPTE ST 2084 depending on each bit value.

The video signal transfer characteristics are information indicating a correspondence between an input signal value and an output signal as described above with reference to FIG. 21.

In this way, the specific information of:

(M6) Resolution (video_resolution)

(M7) Output format (i: interlace/p: progressive) (video_scan_flag)

(M8) Frame rate (video_frame_rate)

(M9) Aspect ratio (video_aspect_ratio)

(M10) Video signal transfer characteristics (video_transfer_characteristics), is recorded in the MMT package table (MPT) included in the signaling message (MMT-SI) m the MMT format data.

The information processing apparatus which performs the processing of recording data in the information recording medium reads the video attribute information from the MMT package table (MPT), and generates data to be recorded in the clip information file recorded in the information recording medium, or the data including:

(C1) Video format (resolution and video output format (i: interlace/p: progressive))

(C2) Frame rate (C3) Aspect ratio (C4) Video signal transfer characteristics, and stores it in the clip information file.

[6-3. Exemplary Processing of Recording Audio Attribute Information in Clip Information File]

An exemplary processing of recording audio attribute information to be recorded in a clip information file will be described below in and subsequent to FIG. 34.

As described above with reference to FIG. 26, the audio attribute information to be recorded in the clip information file includes the following information.

(C5) Audio type (C6) Sampling frequency

In order to record the information in the clip information file, the information processing apparatus 30 acquires the following data recorded in the MMT package table (MPT) 280 (see FIG. 27) included in a signaling message transmitted in the MMT format such as the signaling message (MMT-SI) 130 illustrated in FIG. 26(A).

(M11) Stream content information (M12) Component type (M13) Sampling frequency.

The data is acquired and recorded in the clip information file 290.

FIG. 34 is a diagram illustrating the audio attribute information recorded in the MMT package table (MPT) described with reference to FIG. 27.

That is, FIG. 34 is a diagram illustrating a data configuration (syntax) of audio component descriptor (MH-Audio_Component_Descriptor), which is exemplary data recorded as asset descriptor (asset_descriptors_byte) in a case where asset type (asset_type) in the MPT illustrated in FIG. 27 is a type identifier (mp4a) for audio.

As illustrated in FIG. 34, the following audio attribute information is recorded in the audio component descriptor (MH-Audio_Component_Descriptor).

(M11) Stream content information (M12) Component type (M13) Sampling frequency

The information processing apparatus which performs the processing of recording data in the information recording medium reads the audio attribute information from the MMT package table (MPT), and generates data to be recorded in the clip information file recorded in the information recording medium, or the data:

(C5) Audio type (C6) Sampling frequency, and stores it in the clip information file.

Specific examples of the following data recorded in the MMT package table (MPT) illustrated in FIG. 34, or the data:

(M11) Stream content information (M12) Component type (M13) Sampling frequency will be described in and subsequent to FIG. 35.

FIG. 35 is a diagram illustrating specific examples of (M11) Stream content information recorded in the MMT package table (MPT).

Any bit value of 0×0 to 0×F is stored as stream content information in the MMT package table (MPT). The audio coding information such as:

MPEG-4 AAC audio stream

MPEG-4 ALC audio stream, is associated depending on each bit value.

FIG. 36 is a diagram illustrating specific examples of (M12) Component type recorded in the MMT package table (MPT).

Any bit value of 00000 to 11111 is stored as component type information in the MMT package table (MPT), and is associated with various audio output types (component types) such as monaural and stereo depending on each bit value.

FIG. 37 is a diagram illustrating specific examples of (M13) Sampling frequency recorded in the MMT package table (MPT).

Any bit value of 000 to 111 is stored as sampling frequency information in the MMT package table (MPT), and is associated with a sampling frequency of 16 to 48 kHz depending on each bit value.

In this way, the specific information of:
(M11) Stream content information
(M12) Component type
(M13) Sapling frequency, is recorded in the MMT package table (MPT) included m the signaling message (MMT-SI) in the MMT format data.

The information processing apparatus which performs the processing of recording data in the information recording medium reads the audio attribute information from the MMT package table (MPT), and generates data to be recorded in the clip information file recorded in the information recording medium, or the data to be recorded including:
(C5) Audio type
(C6) Sampling frequency, and stores it in the clip information file.

In this way, the information processing apparatus which inputs MMT format data and records the input data as BDAV format data in the information recording medium acquires various items of video information and audio information acquired from the signaling message included in the MMT format data, and records the information in the playlist file and the clip information file defined in the BDAV format.

The processing enables the processings of decoding and reproducing video and audio from the information recording medium to be correctly performed.

Further, all the information to be output to the list of video-recorded contents described above with reference to FIG. 9 can be acquired from the playlist file and the clip information file and can be displayed in a list.

[7. Configuration and Processings of Information Processing Apparatus for Recording Data in Information Recording Medium]

A configuration and processings of an information processing apparatus which performs a processing of recording data in an information recording medium will be described below in and subsequent to FIG. 38.

As described above, the information processing apparatus according to the present disclosure records input data in the MMT format as BDAV format data in an information recording medium such as BD or flash memory.

Further, in the data recording processing, information for medium-recorded contents, such as information to be output as a list of video-recorded contents described with reference to FIG. 9, other video information, and audio information, is recorded in a database file such as playlist or clip information file.

The information is acquired from various information recording tables configuring the signaling message TLV-SI or MMT-SI included in the input data in the MMT format, or specifically TLV network information table (TLV-NIT) included in TLV-SI, and Event information table (MH-EIT)

Broadcaster information table (MH-BIT)

MMT package table (MPT), which are included in MMT-SI, and information for medium-recorded contents is recorded in a database file such as playlist or clip information file defined in the BDAV format.

A configuration and a processing sequence of an information processing apparatus which performs a processing of generating an information recording medium recording such playlist or clip information file therein, or specifically a processing of recording data in an information recording medium such as BD will be described below.

Figure 38:
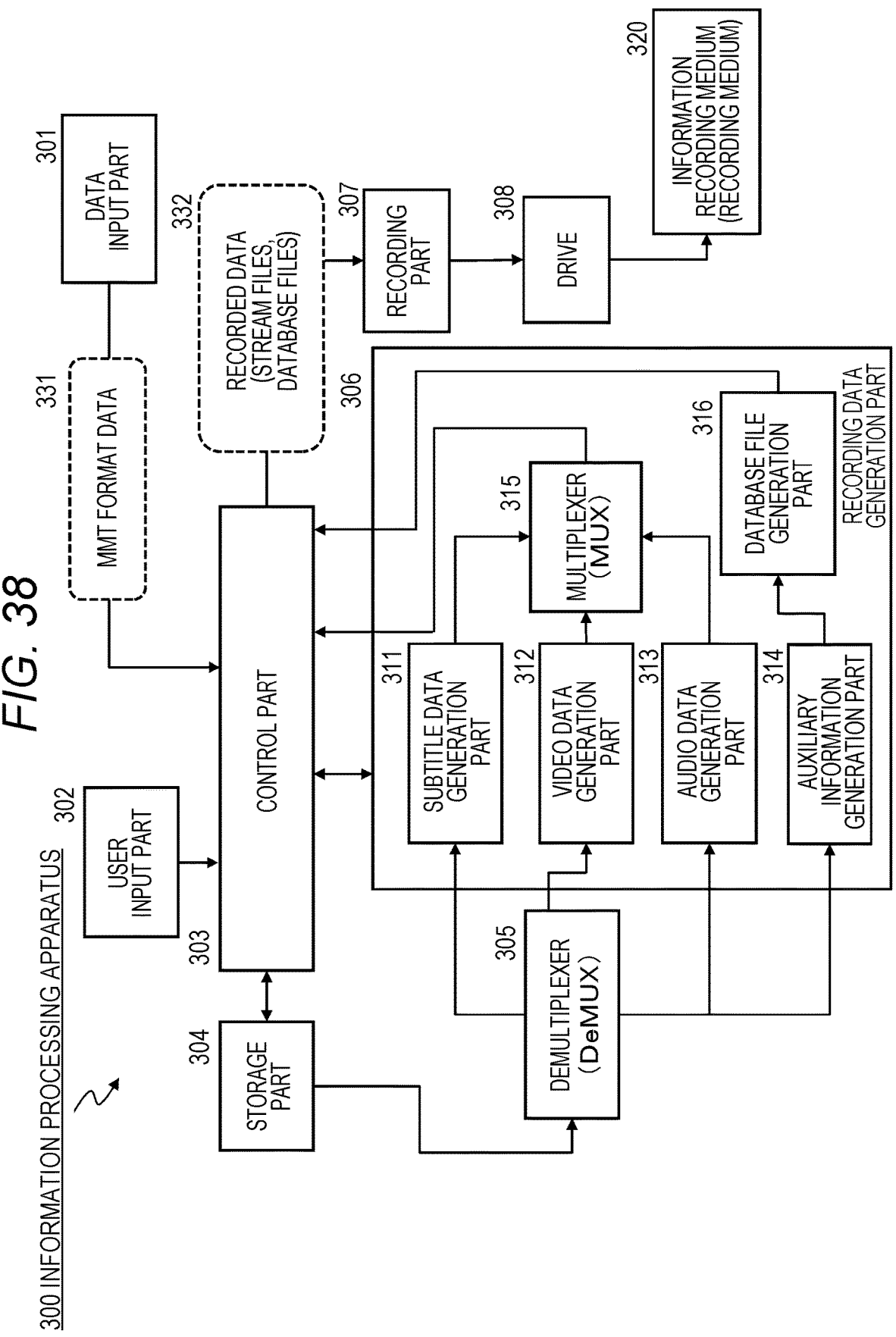
FIG. 38 is a diagram for explaining an exemplary configuration of an information processing apparatus configured to perform a processing of recording data in an information recording medium.

FIG. 38 is a diagram illustrating a configuration of an information processing apparatus 300 for recording data in an information recording medium such as BD.

The information processing apparatus 300 records video data in the MPEG-2TS format, and database files such as playlist or clip information file recording high-frame-rate video-related information therein in an information recording medium 320 illustrated in FIG. 21.

A data input part 301 inputs MMT format data 331, or MMT format data 331 including video data, audio data, subtitle data, and the like in the information recording medium 320.

The data input part 301 is configured of a reception part configured to receive data transmitted from a broadcasting station, a content server, or the like, for example, configured to transmit the MMT format data 331, or a medium reading part, configured to read data from the medium recording the MMT format data 331 therein, or the like.

The MMT format data 331 input via the data input part 301 is in the data format described above with reference to FIG. 2, and includes high-definition video data such as HEVC video, for example.

The MMT format data 331 is stored in a storage part 304 under control of a control part 303.

A user input part 302 inputs, for example, a request to start recording data in the information recording medium 320 or the like.

When a data recording start request is input from the user input part 302, the MMT format data 331 stored in the storage part 304 is input into a demultiplexer (DeMUX) 305 in response to the input.

The demultiplexer (DeMUX) 305 acquires auxiliary information such as packets storing each item of data of video, audio, subtitle, and the like, or a signaling message (TLV-SI, MMT-SI) storing notification information, control information, and the like from the MMT format data 331, classifies the auxiliary information into packets per data type, and inputs each packet into a subtitle data generation part 311, a video data generation part 312, an audio data generation part 313, and an auxiliary information generation part 314 in a recording data generation part 306 depending on a data type.

The subtitle data generation part 311 acquires the subtitle data from the MMT format data 331 input by the data input part 301 and stored in the storage part 304, and generates stream file storage data defined in the BDAV format.

The video data generation part 312 acquires the video data from the MMT format data 331 input by the data input part 301 and stored in the storage part 304, and generates stream file storage data defined in the BDAV format.

The audio data generation part 313 acquires the audio data from the MMT format data 331 input by the data input part 301 and stored in the storage part 304, and generates stream file storage data defined in the BDAV format.

The auxiliary information generation part 314 acquires the auxiliary information such as signaling message (TLV-SI, MMT-SI) storing notification information, control information, and the like from the MMT format data 331 input by the data input part 301 and stored in the storage part 304, and generates data to be stored in a playlist file or clip information file as a database file defined in the BDAV format.

A multiplexer (MUX) 315 inputs each item of data of subtitle, video, and audio converted by the subtitle data generation part 311, the video data generation part 312, and the audio data generation part 313, and generates a stream file storing the data therein.

A database file generation part 316 generates a database file such as playlist file or clip information file recording therein various items of information acquired from the signaling message (TLV-SI, MMT-SI) in the MMT format data 331 by the auxiliary information generation part 314.

Specifically, as described above with reference to FIG. 12 and others, the information:

(P1) Video-record time/date (record_time_and_date)
(P2) Channel number (channel_number)
(P3) Channel name (channel_name)
(P4) Video-recorded program name (Playlist_name)
(P5) Video-recorded program details (Playlist_detail), is recorded in the playlist file on the basis of the information:
(M1) Program start time
(M2) TLV stream ID
(M3) Provider name/service name
(M4) Event name
(M5) Event details, which are acquired from the signaling message (TLV-SI, MMT-SI) in the MMT format data 331.

Further, as described with reference to FIG. 26 and others, the information:

(C1) Video format (resolution and video output format (i: interlace/p: progressive)
(C2) Frame rate
(C3) Aspect ratio
(C4) Video signal transfer characteristics
(C5) Audio type
(C6) Sampling frequency, is recorded in the clip information file on the basis of the information:
(M6) Resolution
(M7) Output format (i: interlace/p: progressive)
(M8) Frame rate
(M9) Aspect ratio
(M10) Video signal transfer characteristics
(M11) Stream content information
(M12) Component type
(M13) Sampling frequency, which are acquired from the signaling message (MMT-SI) in the MMT format data 331.

The stream file data generated by the recording data generation part 306, and recording data 332 including the database files such as playlist file and clip information file are output to and recorded in the information recording medium 320 by the recording part 306 via a drive 307 under control of the control part 303.

A sequence of the processing of recording data in the information recording medium 320 performed by the information processing apparatus 300 illustrated in FIG. 38 will be described below with reference to the flowchart of FIG. 39.

Figure 39:
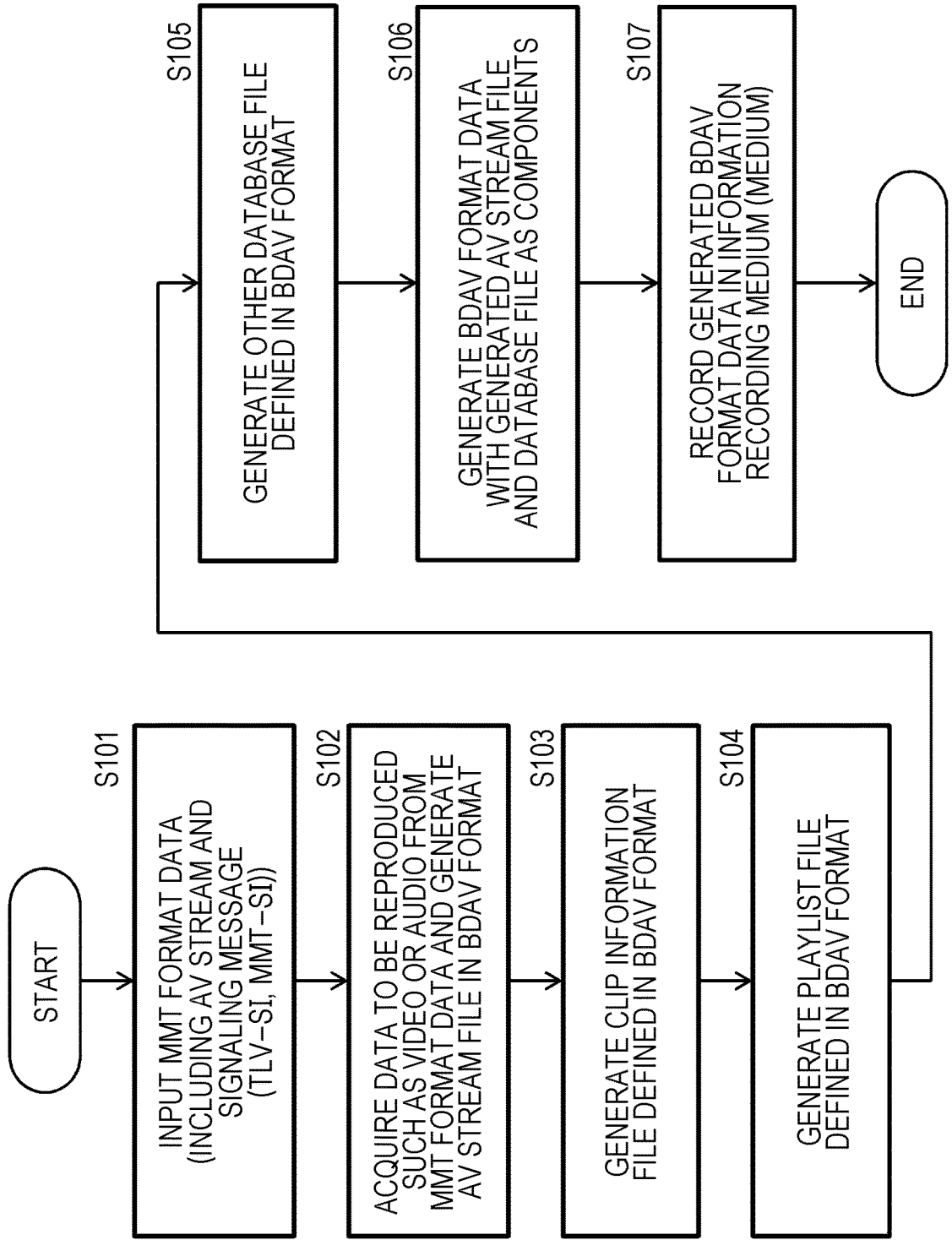
FIG. 39 is a diagram illustrating a flowchart for explaining a processing sequence of the processing of recording data in an information recording medium.

The processings in the flow illustrated in FIG. 39 can be performed under control of the data processing part (control part) including a CPU having a program execution function according to a program stored in the storage part in the information processing apparatus, for example.

The processing in each step illustrated in the flow of FIG. 39 will be sequentially described below.

(Step S101)
At first, in step S101, the information processing apparatus 300 inputs the MMT format data as data to be recorded via the data input part 301.

Additionally, the data to be recorded includes video data, audio data, subtitle data, and a signaling message (TLV-SI, MMT-SI) storing notification information, control information, and the like therein, for example.

(Step S102)
Then in step S102, the information processing apparatus 300 acquires data to be reproduced such as video and audio from the input MMT format data, and generates an AV stream file in the BDAV format.

(Step S103)
Then in step S103, the information processing apparatus 300 generates a clip information file by use of the configuration data of the input MMT format data.

Specifically, the clip information file is generated by use of the signaling message (TLV-SI, MMT-SI) storing notification information, control information, and the like therein.

Additionally, the clip information file generation processing in step S103 will be described below in detail with reference to FIG. 40.

(Step S104)
Then in step S104, the information processing apparatus 300 generates a playlist file by use of the configuration data of the input MMT format data.

Specifically, the playlist file is generated by use of the signaling message (TLV-SI, MMT-SI) storing notification information, control information, and the like therein, for example.

Additionally, the playlist file generation processing in step S104 will be described below in detail with reference to FIG. 41.

(Step S105)
Then in step S105, the information processing apparatus 300 generates other database file by use of the input MMT format data.

A packet is selected to extract the video data for main stream.

(Step S106)
Then in step S106, the information processing apparatus 300 generates BDAV format data by use of the generated AV stream file and database file.

(Step S107)
Then in step S107, the information processing apparatus 300 records the BDAV format data generated in step S106 in the information recording medium.

A detailed sequence of the clip information file generation processing performed in step S103 will be described below with reference to the flowchart of FIG. 40.

Figure 40:
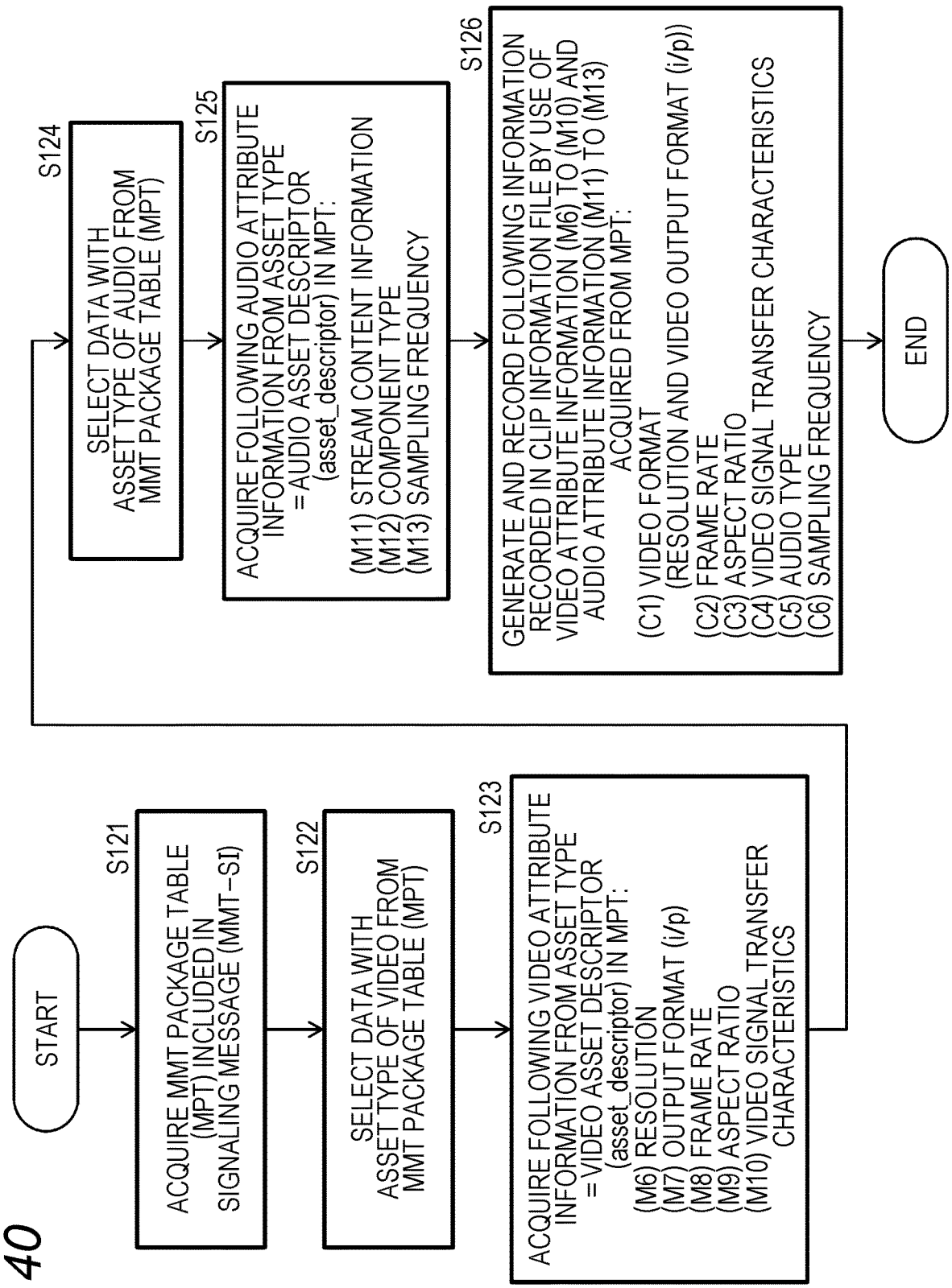
FIG. 40 is a diagram illustrating a flowchart for explaining the processing sequence of the processing of recording data in an information recording medium.

The processing in each step in the flow illustrated in FIG. 40 will be sequentially described.

(Step S121)
At first, in step S121, the information processing apparatus 300 acquires the MMT package table (MPT) included in the signaling message (MMT-SI).

(Step S122)

Then in step S122, the information processing apparatus 300 selects data with an asset type of video from the MMT package table (MPT).

Asset type is a data recording region in the MPT in which a different type identifier is recorded depending on a data type such as video or audio as described above with reference to FIG. 27 and FIG. 28.

(Step S123)

Then in step S123, the information processing apparatus 300 acquires the following video attribute information from asset type=video asset descriptor (asset_descriptor) in the MPT.

(M6) Resolution
(M7) Output format (i/p)
(M8) Frame rate
(M9) Aspect ratio
(M10) Video signal transfer characteristics The information corresponds to the information described with reference to FIG. 26 and FIG. 29 to FIG. 33.

(Step S124)

Then in step S124, the information processing apparatus 300 selects data with an asset type of audio from the MMT package table (MPT).

(Step S125)

Then in step S125, the information processing apparatus 300 acquires the following audio attribute information from asset type=audio asset descriptor (asset_descriptor) in the MPT.

(M11) Stream content information
(M12) Component type
(M13) Sampling frequency

The information corresponds to the information described with reference to FIG. 26 and FIG. 34 to FIG. 37.

(Step S126)

Then in step S126, the information processing apparatus 300 performs the processings of generating and recording the following recording information in the clip information file defined in the BDAV format by use of the video attribute information:

(M6) Resolution
(M7) Output format (i/p)
(M8) Frame rate
(M9) Aspect ratio
(M10) Video signal transfer characteristics, and the audio attribute information:
(M11) Stream content information
(M12) Component type
(M13) Sampling frequency, which are acquired from the MPT,
(C1) Video format (resolution and video output format (i/p))
(C2) Frame rate
(C3) Aspect ratio
(C4) Video signal transfer characteristics
(C5) Audio type
(C6) Sampling frequency The clip information file recording therein predetermined video information and audio information is generated by the processings.

A detailed sequence of the playlist file generation processing performed in step S104 in the flow illustrated in FIG. 39 will be described below with reference to the flowchart of FIG. 41.

Figure 41:
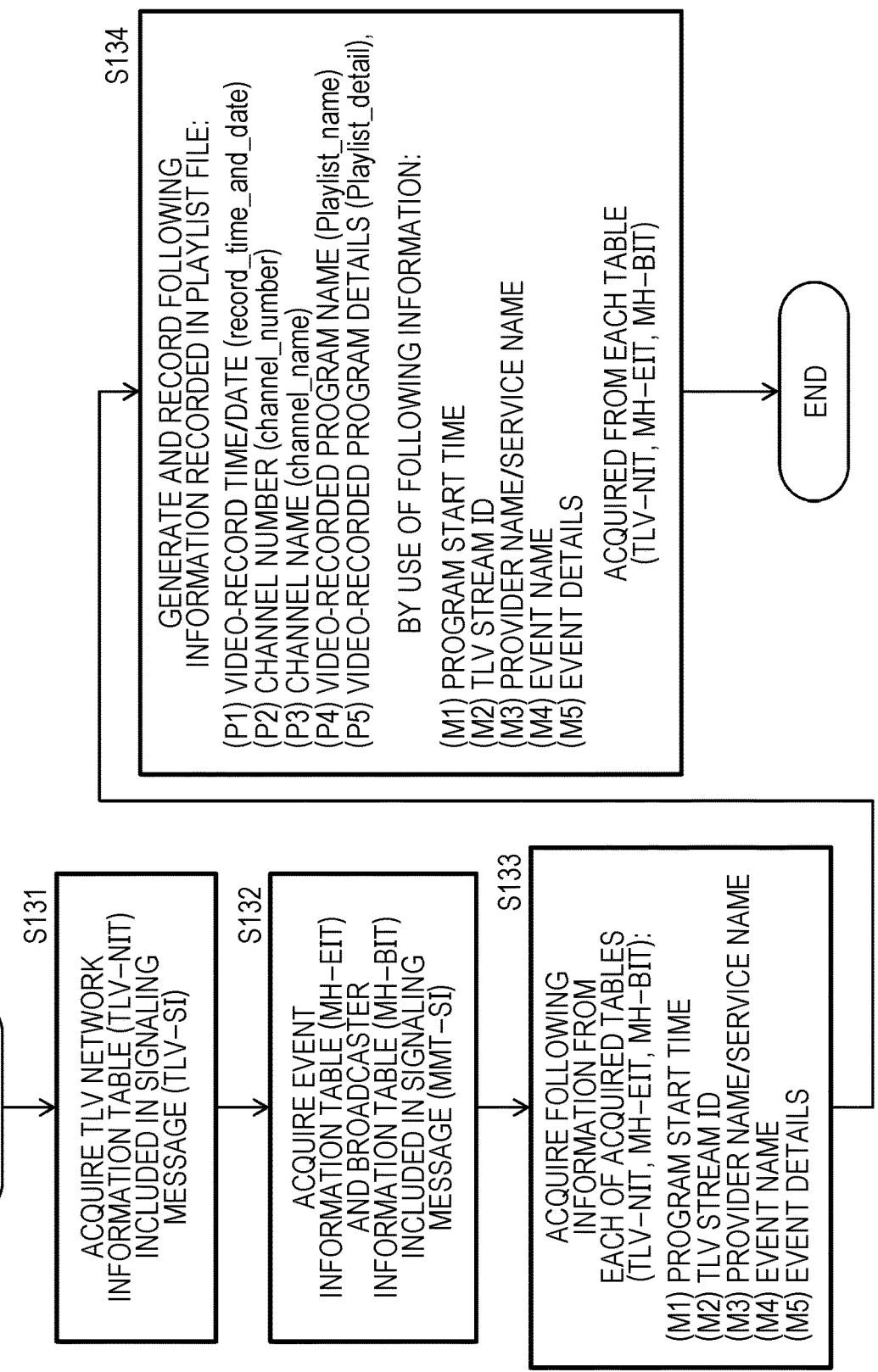
FIG. 41 is a diagram illustrating a flowchart for explaining the processing sequence of the processing of recording data in an information recording medium.

The processing in each step in the flow of FIG. 41 will be sequentially described.

(Step S131)

At first, in step S131, the information processing apparatus 300 acquires the TLV network information table (TLV-NIT) included in the signaling message (TLV-SI).

(Step S132)

Then in step S132, the information processing apparatus 300 acquires the tables:

Event information table (MH-EIT), and
Broadcaster information table (MH-BIT), which are included in the signaling message (MMT-SI) in the TLV network information table included in the signaling message (TLV-SI).

(Step S133)

Then in step S133, the information processing apparatus 300 acquires the following information from each of the acquired tables (TLV-NIT, MH-EIT, and MH-BIT).

(M1) Program start time
(M2) TLV stream ID
(M3) Provider name/service name
(M4) Event name
(M5) Event details The information corresponds to the information described with reference to FIG. 12 and FIG. 13 to FIG. 17.

(Step S134)

Then in step S134, the information processing apparatus 300 acquires the following information from each table (TLV-NIT, MH-EIT, MH-BIT).

(M1) Program start time
(M2) TLV stream ID
(M3) Provider name/service name
(M4) Event name
(M5) Event details The following recording information in the playlist file is generated and recorded by use of the information.

(P1) Video-record time/date (record_time_and_date)
(P2) Channel number (channel_number)
(P3) Channel name (channel_name)
(P4) Video-recorded program name (Playlist_name)
(P5) Video-recorded program details (Playlist_detail)

The playlist file recording predetermined video-recorded content information therein is generated by the processings.

The information processing apparatus 300 performs the processings in the flow described with reference to FIG. 39 to FIG. 41 thereby to accurately record the information indicating the video and audio attribute information in the input MMT format data, video-record time/date, channel, and the like in the playlist file and the clip information file defined in the BDAV format.

In the processings, the attributes of video data or audio data to be reproduced can be confirmed, and the decoding processing and the reproduction processing depending on the confirmed video attributes or audio attributes can be performed.

Further, also in a case where the list of video-recorded contents (programs) described above with reference to FIG. 9 is displayed, the data to be displayed in the list can be accurately acquired from the playlist file or the clip information file thereby to generate display data.

[8. Configuration and Processings of Information Processing Apparatus for Reproducing Data Form Information Recording Medium]

A configuration and processings of an information processing apparatus for reproducing data from an information recording medium will be described below with reference to FIG. 42 and FIG. 43.

Figure 42:
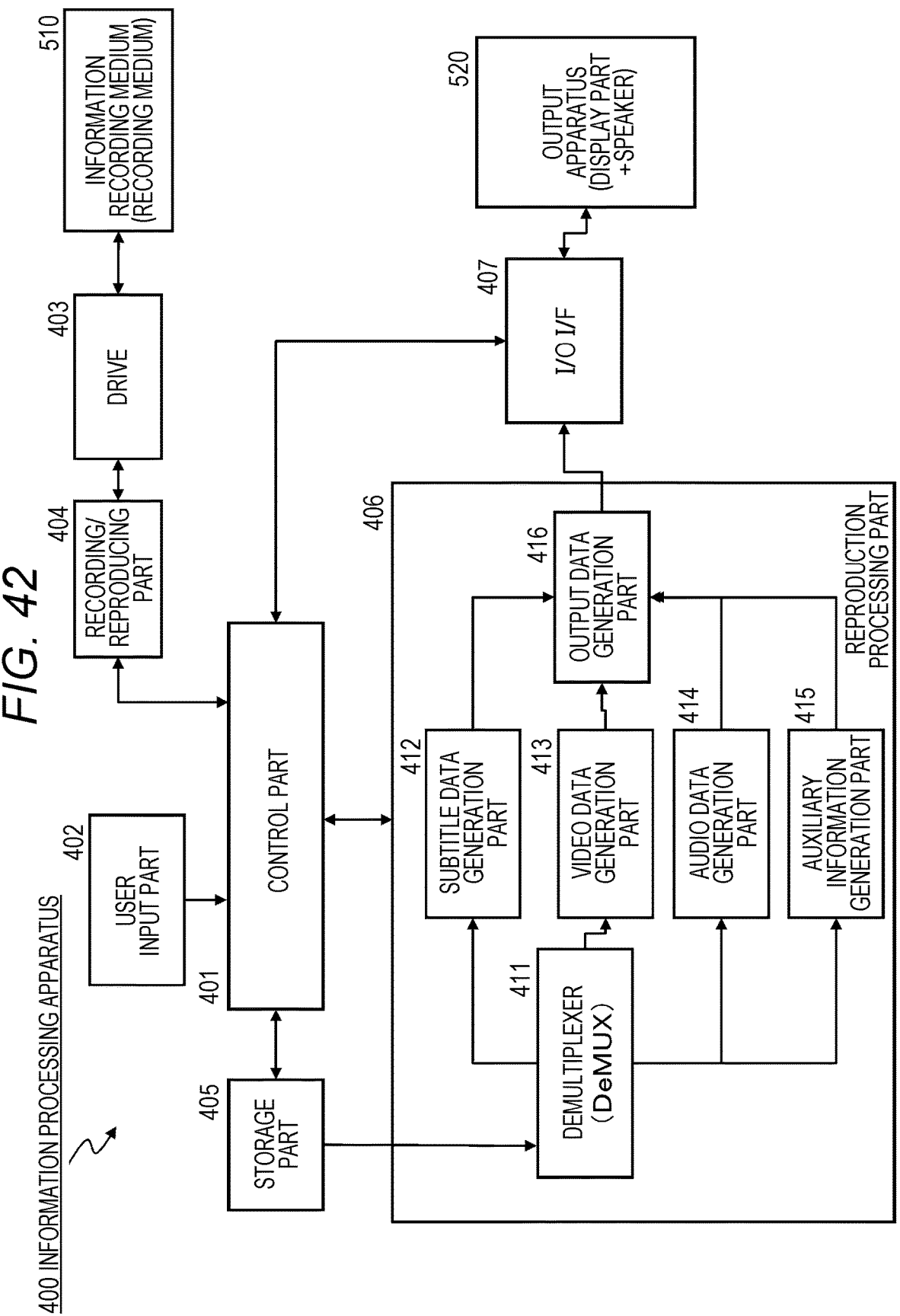
FIG. 42 is a diagram for explaining an exemplary configuration of an information processing apparatus configured to perform a processing of reproducing data from an information recording medium.

An information processing apparatus for performing the reproduction processing reads data recorded in an information recording medium mounted on the apparatus, and performs the reproduction processing FIG. 42 is a diagram illustrating a configuration of an information processing apparatus 400 for reproducing data recorded in an information recording medium 510 such as BD.

The information processing apparatus 400 reads data recorded in the information recording medium 510 illustrated in FIG. 42, and outputs it to an output apparatus (display part+speaker) 520. Additionally, the output apparatus 520 is a TV or the like, for example, and is a display apparatus including a display, a speaker, and the like.

Additionally, the information processing apparatus 400 may be the same as the information processing apparatus 300 for recording data described above with reference to FIG. 38. That is, the information processing apparatus 400 has both the functions of recording and reproducing data.

The information recording medium 510 is a recording medium recording therein the databases of the AV stream file, the playlist, the clip information file, and the like generated in the processings described with reference to FIG. 38 to FIG. 41.

The following information described above is recorded in the playlist file.
(P1) Video-record time/date (record_time_and_date)
(P2) Channel number (channel_number)
(P3) Channel name (channel_name)
(P4) Video-recorded program name (Playlist_name)
(P5) Video-recorded program, details (Playlist_detail)

Further, the following information is recorded in the clip information file.
(C1) Video format (resolution and video output format (i/p))
(C2) Frame rate
(C3) Aspect ratio
(C4) Video signal transfer characteristics
(C5) Audio type
(C6) Sampling frequency A control part 401 reads data recorded in the information recording medium 510 via a recording/reproducing part 404 and a drive 403 in response to an input of reproduction instruction information from a user input part 402, for example, stores it in a storage part 405 as a data buffer, and outputs the stored data to a reproduction processing part 406.

Further, the control part 401 generates the list of video-recorded contents described above with reference to FIG. 9 on the basis of the data recorded in the information recording medium 510 in response to an input of video-recorded content list display instruction information from the user input part 402, and outputs it to the output apparatus (display part) 520.

The reproduction processing part 406 acquires the reproduction data read from the information recording medium 510, or each item of data from the clip AV stream file storing therein each item of data of video, audio, subtitle, and the like, and generates reproduction data under control of the control part 401.

A demultiplexer (DeMUX) 411 acquires a data storage packet storing therein each item of data of video, audio, subtitle, playlist file, clip information file, and the like, classifies it into packets per data type, and outputs each packet to a subtitle data generation part 412, a video data generation part 413, an audio data generation part 414, and an auxiliary information generation part 415 depending on a data type.

The subtitle data generation part 412, the video data generation part 413, and the audio data generation part 414 perform the processing of decoding the data stored in the packets, and the like, and outputs the decoded data to an output data generation part 416.

The output data generation part 416 outputs each item of data of subtitle, video, and audio to the output apparatus (display part+speaker) 520 via an I/O interface 407.

Additionally, the information recording medium 510 may have a stream file storing MPEG-2TS format data therein and a stream file storing MMT format data therein as stream files storing data to be reproduced therein.

In this case, the information processing apparatus 400 performs the processing of reproducing the stream file storing the MPEG-2TS format data therein and the stream file storing the MMT format data therein by use of the playlist file and the clip information file defined in the BDAV format.

The auxiliary information generation part 415 acquires the video-recorded content list display data stored in the playlist file and the clip information file, for example, thereby to generate the list of video-recorded contents as illustrated in FIG. 9, and outputs the generated list to the output apparatus (display part+speaker) 520.

The output apparatus (display part+speaker) 520 outputs each item of data of subtitle, video, audio, and the like, and a list of video-recorded contents input from the information processing apparatus 400 via the output apparatus (display part+speaker) 520.

Additionally, the information recording medium 510 stores the MMT format data recorded in the BDAV format, and the information processing apparatus 400 acquires the recording information in the playlist file and the clip information file as database files defined in the BDAV format, and generates a list of video-recorded contents.

In the processings, the information processing apparatus 400 outputs data extracted from the signaling message included in the MMT format data as output data of the list of video-recorded contents.

A sequence of the processing of reproducing data from the information recording medium 510 performed by the information processing apparatus 400 illustrated in FIG. 42 will be described below with reference to the flowchart of FIG. 43.

Figure 43:
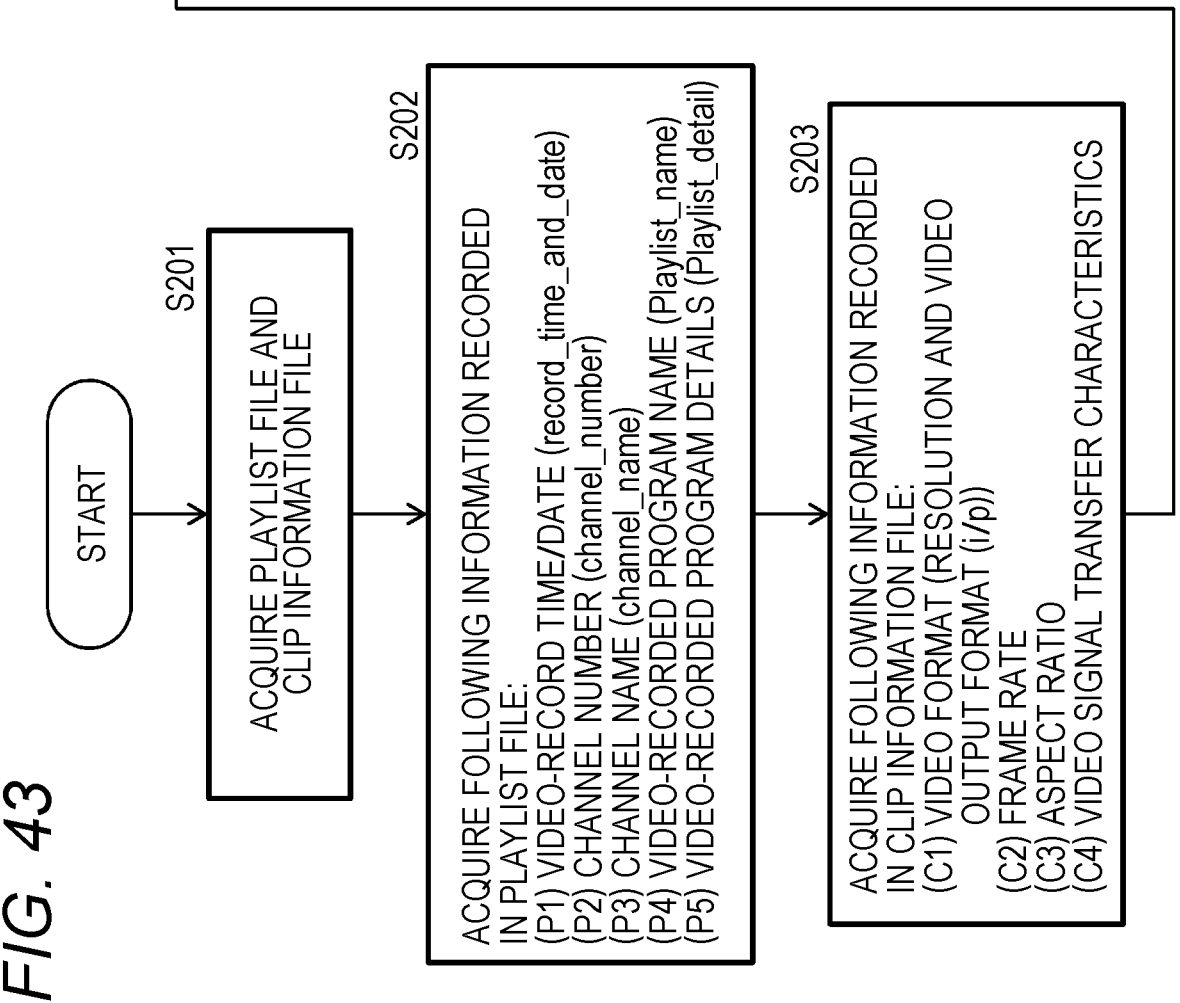
FIG. 43 is a diagram illustrating a flowchart for explaining a processing sequence of the processing of reproducing data from an information recording medium.

The processings in the flow illustrated in FIG. 43 can be performed under control of the data processing part (control part) including a CPU having a program execution function according to a program stored in a storage part in the information processing apparatus 400, for example.

Additionally, an information processing apparatus which performs the processings in the flow of FIG. 43 is the information processing apparatus 400 illustrated in FIG. 42, which mounts the information recording medium 510 thereon, reads data recorded in the mounted information recording medium 510, and outputs it to the output apparatus (display part+speaker) 520. Additionally, the output apparatus 520 is a TV or the like, for example, and is a display apparatus including a display, a speaker, and the like.

The information recording medium 510 records databases of streams, playlists, clip information files, and the like generated in the processings described with reference to FIG. 38 to FIG. 41.

The processing in each step illustrated in the flow of FIG. 43 will be sequentially described below.

(Step S201)

At first, in step S201, the control part 401 in the information processing apparatus 400 acquires a playlist file and a clip information file.

(Step S202)

Then in step S202, the control part 401 in the information processing apparatus 400 acquires the following information recorded in the playlist file.

(P1) Video-record time/date (record_time_and_date)
(P2) Channel number (channel_number)
(P3) Channel name (channel_name)
(P4) Video-recorded program name (Playlist_name)
(P5) Video-recorded program details (Playlist_detail)

(Step S203)

Then in step S203, the control part 401 in the information processing apparatus 400 acquires the following information recorded in the clip information file.

(C1) Video format (resolution and video output format (i/p))
(C2) Frame rate
(C3) Aspect ratio
(C4) Video signal transfer characteristics (Step S204)

Then in step S204, the control part 401 in the information processing apparatus 400 generates and displays a list of video-recorded contents on the basis of the information acquired from the playlist file and the clip information file.

Specifically, for example, the list of video-recorded contents described above with reference to FIG. 9 is generated and displayed.

Data extracted from the signaling message included in the MMT format data is output as output data of the list of video-recorded contents.

(Step S205)

Then in step S205, the control part 401 in the information processing apparatus 400 determines the presence of a content-designated reproduction instruction input from the user for the displayed list of video-recorded contents.

In a case where the user inputs the content-designated reproduction instruction, the processing proceeds to step S206, and otherwise, the processing waits.

(Step S206)

In a case where the user inputs the content-designated reproduction instruction, in step S206, the content reproduction processing is performed by use of the playlist file and the clip information file associated with the reproduction-instructed contents.

As described above, the playlist file and the clip information file record the video attribute information and the audio attribute information therein in detail, and the decoding processing and the reproduction processing can be correctly performed by use of the information.

Additionally, in a case where a stream file storing the MPEG-2TS format data therein and a stream file storing the MMT format data therein are present together as data to be reproduced, the information processing apparatus 400 reproduces the stream file storing the MPEG-2TS format data and the stream file storing the MMT format data by use of the playlist file and the clip information file defined in the BDAV format.

[9. Exemplary Configuration of Information Processing Apparatus]

An exemplary hardware configuration of an information processing apparatus capable of being applied as an information processing apparatus for recording data in an information recording medium and reproducing data from the information recording medium will be described below with reference to FIG. 44.

A central processing unit (CPU) 601 functions as a data processing part for performing various processings according to programs stored in a read only memory (ROM) 602 or a storage part 608. For example, the CPU 601 performs the processings in the sequences described according to the above embodiment. A random access memory (RAM) 603 stores the programs executed by the CPU 601, data, and the like therein. The CPU 601, the ROM 602, and the RAM 603 are mutually connected via a bus 604.

The CPU 601 is connected to an I/O interface 605 via the bus 604, and the I/O interface 605 is connected with an input part 606 configured of various switches, a keyboard, a mouse, a microphone, and the like, and an output part 607 configured of a display, a speaker, and the like. The CPU 601 performs various processings in response to instructions input from the input part 606, and outputs the processing results to the output part 607, for example.

The storage part 608 connected to the I/O interface 605 is configured of a hard disc or the like, for example, and stores the programs executed by the CPU 601, or various items of data. A communication part 609 functions as a data communication exchange part via a network such as Internet or local area network, and a broadcast wave exchange part, and makes communication with external apparatuses.

A drive 610 connected to the I/O interface 605 drives a removable medium 611 such as magnetic disc, optical disc, magnetooptical disc, or semiconductor memory such as memory card, and records or reads data.

[10. Summary of Configurations of Present Disclosure]

Embodiments of the present disclosure have been described above in detail with reference to the specific embodiments. However, it is clear that those skilled in the art can modify or substitute the embodiments without departing from the spirit of the present disclosure. That is, the present invention has been disclosed in exemplary forms, and should not be interpreted in a limited manner. CLAIMS should be considered in order to determine the spirit of the present disclosure.

Additionally, the technology disclosed in the present specification can take the following configurations.

(1)

An information processing apparatus including:

a data processing part configured to input MMT format data and to generate data recorded in a BDAV format as a data recording format in an information recording medium, in which the data processing part extracts data to be recorded in a database file defined in a BDAV format from MMT format data to be input, and generates a database file.

(2)

The information processing apparatus according to (1), in which the data processing part extracts data to be applied to display a list of video-recorded contents as a list of recorded contents in the information recording medium from MMT format data, and records the data in a database file defined in a BDAV format.

(3)

The information processing apparatus according to (1) or (2), in which the data processing part extracts data to be recorded in a database file defined in a BDAV format from a signaling message included in MMT format data, and generates a database file.

(4)

The information processing apparatus according to (3), in which the signaling message is MMT-SI or TLV-SI defined in a MMT format.

(5)

The information processing apparatus according to any of (1) to (4), in which the database file is a playlist file or a clip information file.

(6)

The information processing apparatus according to any of (1) to (5), in which the data processing part extracts data to be recorded in a playlist file as a database file defined in a BDAV format from each of the tables:

(a) TLV network information table (TLV-NIT),
(b) Event information table (MH-EIT), and
(c) Broadcaster information table (MH-BIT), which are configuration data of MMT format data, and generates a playlist file.

(7)

The information processing apparatus according to (6), in which the data processing part acquires at least any item of information among record time/date, channel number, channel name, recorded program name, and recorded program details, which are content information recorded in the information recording medium, from the tables (a) to (c), and records the information in the playlist file.

(8)

The information processing apparatus according to any of (1) to (7), in which the data processing part extracts data to be recorded in a clip information file as a database file defined in a BDAV format from a MMT package table (MPT) as configuration data of MMT format data, and generates a clip information file.

(9)

The information processing apparatus according to (8), in which the data processing part acquires at least any item of information of video attribute information and audio attribute information, which are content information recorded in the information recording medium, from the MMT package table (MPT), and records the information in the playlist file.

(10)

The information processing apparatus according to (9), in which the video attribute information includes at least any item of information among video format, resolution, frame rate, aspect ratio, and video signal transfer characteristics, and the audio attribute information includes at least any item of information of audio type and sampling frequency.

(11)

An information processing apparatus including:

a data processing part configured to reproduce data recorded in an information recording medium, in which the information recording medium is an information recording medium that stores data in which MMT format data is recorded in a BDAV format, the data processing part acquires information recorded in a playlist file and a clip information file as database files defined in a BDAV format, and generates a list of video-recorded contents, and the data processing part outputs data extracted from a signaling message included in the MMT format data as output data of the list of video-recorded contents.

(12)

The information processing apparatus according to (11), in which output data of the list of video-recorded contents is extracted from any of the tables:

(a) TLV network information table (TLV-NIT),
(b) Event information table (MH-EIT),
(c) Broadcaster information table (MH-BIT), and
(d) MMT package table (MPT), which are configuration data of MMT format data.

(13)

The information processing apparatus according to (11) or (12), in which the information recording medium has a stream file storing MPEG-2TS format data therein and a stream file storing MMT format data therein as stream files storing data to be reproduced, and the data processing part reproduces a stream file storing MPEG-2TS format data therein and a stream file storing MMT format data therein by use of a playlist file and a clip information file defined in a BDAV format.

(14)

An information processing method performed in an information processing apparatus, in which the information processing apparatus includes a data processing part configured to input MMT format data and to generate data recorded in a BDAV format as a data recording format in an information recording medium, and the data processing part extracts data to be recorded in a database file defined in a BDAV format from MMT format data to be input, and generates a database file.

(15)

A method for manufacturing an information recording medium performed in an information processing apparatus, in which the information processing apparatus includes a data processing part configured to input MMT format data and to generate data recorded in a BDAV format as a data recording format in an information recording medium, the data processing part extracts data to be recorded in a database file defined in a BDAV format from MMT format data to be input, and generates a database file, and manufactures an information recording medium recording the database file therein.

(16)

An information processing method performed in an information processing apparatus, in which the information processing apparatus includes a data processing part configured to reproduce data recorded in an information recording medium, the information recording medium is an information recording medium that stores data in which MMT format data is recorded in a BDAV format, the data processing part acquires information recorded in a playlist file and a clip information file as database files defined in a BDAV format, and generates a list of video-recorded contents, and outputs data extracted from a signaling message included in the MMT format data as output data of the list of video-recorded contents.

(17)

A program for causing an information processing apparatus to perform an information processing, in which the information processing apparatus includes a data processing part configured to input MMT format data and to generate data recorded in a BDAV format as a data recording format in an information recording medium, and the program causes the data processing part to extract data to be recorded in a database file defined in a BDAV format from MMT format data to be input and to generate a database file.

(18)

A program for causing an information processing apparatus to perform an information processing, in which the information processing apparatus includes a data processing part configured to reproduce data recorded in an information recording medium, the information recording medium is an information recording medium that stores data in which MMT format data is recorded in a BDAV format, the program causes the data processing part to acquire information recorded in a playlist file and a clip information file as database files defined in a BDAV format and to generate a list of video-recorded contents, and to output data extracted from a signaling message included in the MMT format data as output data of the list of video-recorded contents.

Further, a series of processings described in the specification can be performed in hardware, in software, or in a composite configuration of them. In a case where the processings are performed in software, the programs recording the processing sequences can be installed and executed in a memory in a computer incorporated in dedicated hardware, or the programs can be installed and executed in a general-purpose computer capable of performing various processings. For example, the programs can be previously recorded in a recording medium. The programs can be installed from a recording medium into a computer, and further can be received via a network such as local area network (LAN) or Internet and can be installed in a recording medium such as incorporated hard disc.

Additionally, various processings described in the specification are performed in time series as described herein, and further may be performed in parallel or individually depending on the processing capability of the apparatus for performing the processings or as needed. Further, a system in the present specification is a logical collection of a plurality of apparatuses, and the apparatuses in each configuration are not necessarily in the same casing.

INDUSTRIAL APPLICABILITY

As described above, with the configuration according to one embodiment of the present disclosure, MMT format data can be recorded as BDAV format data in a medium, and a list of video-recorded contents can be displayed or reproduced by an application for BDAV.

Specifically, for example, data to be recorded in a playlist or a clip information file defined in the BDAV format, is extracted from the MMT format data input on a broadcast wave or the like thereby to generate the data files thereof. For example, data to be applied to display a list of video-recorded contents is extracted from MMT-SI or TLV-SI in the MMT format data, and recorded in the playlist or clip information file.

With the present configuration, MMT format data can be recorded as BDAV format data in a medium, and a list of video-recorded contents can be displayed or reproduced by an application for BDAV.

REFERENCE SIGNS LIST

20 Transmission apparatus
21 Broadcasting server
22 Data delivery server
30 Information processing apparatus
31 BD player
32 TV
33 PC
34 Portable terminal
40 Information recording medium
41 BD
42 HDD
43 Flash memory
300 Information processing apparatus
301 Data input part
302 User input part
303 Control part
304 Storage part
305 Demultiplexer
306 Recording data generation part
307 Recording part
308 Drive
311 Subtitle data generation part
312 Video data generation part
313 Audio data generation part
314 Auxiliary information generation part
315 Multiplexer
316 Database file generation part
320 Information recording medium
400 Information processing apparatus
401 Control part
402 user input part
403 Drive
404 Recording/reproducing part
405 Storage part
406 Reproduction processing part
407 I/O I/F
411 Demultiplexer
412 Subtitle data generation part
413 Video data generation part
414 Audio data generation part
415 Auxiliary information generation part
416 Output data generation part
510 Information recording medium
520 Output apparatus (display part+speaker)
601 CPU
602 ROM
603 RAM
604 Bus
605 I/O interface
606 Input part
607 Output part
608 Storage part
609 Communication part
610 Drive
611 Removable medium

The invention claimed is:

1. An information processing apparatus comprising:
a data processing part configured to input data defined in a MMT format and to generate data recorded in a BDAV format as a data recording format in a non-transitory computer-readable information recording medium,
wherein the data processing part
extracts data recorded in a plurality of signaling messages defined in the MMT format, and
generates a database file including the data recorded in the BDAV format based on the extracted data defined in the MMT format,
wherein the data defined in the MMT format, which is input to generate the data recorded in the BDAV format, includes the plurality of signaling messages, each signaling message comprising at least one of notification information or control information,
wherein the data processing part extracts the data to be recorded in the database file defined in the BDAV format from the notification information or control information of each signaling message of the plurality of signaling messages included in the MMT format data in order to generate the database file, wherein the plurality of signaling messages include at least one MMT-SI and at least one TLV-SI defined in the MMT format, wherein the at least one TLV-SI is generated in a TLV layer, and wherein the data processing part is implemented via at least one processor.

2. The information processing apparatus according to claim 1, wherein the data processing part extracts data to be applied to display a list of video-recorded contents as a list of recorded contents in the non-transitory computer-readable information recording medium from the MMT format data, and records the data in the database file defined in the BDAV format.

3. The information processing apparatus according to claim 1, wherein each database file is a playlist file or a clip information file.

4. The information processing apparatus according to claim 1, wherein the data processing part extracts data to be recorded in a playlist file as a database file defined in the BDAV format from each of the following tables:
(a) TLV network information table (TLV-NIT),
(b) Event information table (MH-EIT), and
(c) Broadcaster information table (MH-BIT), which are configuration data of the MMT format data, and generates a playlist file.

5. The information processing apparatus according to claim 4, wherein the data processing part acquires at least any item of information among record time/date, channel number, channel name, recorded program name, and recorded program details, which are content information recorded in the non-transitory computer-readable information recording medium, from the tables (a) to (c), and records the information in the playlist file.

6. The information processing apparatus according to claim 1, wherein the data processing part extracts data to be recorded in a clip information file as a database file defined in the BDAV format from a MMT package table (MPT) as configuration data of MMT format data, and generates a clip information file.

7. The information processing apparatus according to claim 6, wherein the data processing part acquires at least any item of information of video attribute information and audio attribute information, which are content information recorded in the non-transitory computer-readable information recording medium, from the MMT package table (MPT), and records the information in the playlist file.

8. The information processing apparatus according to claim 7, wherein the video attribute information includes at least any item of information among video format, resolution, frame rate, aspect ratio, and video signal transfer characteristics, and the audio attribute information includes at least any item of information of audio type and sampling frequency.

9. The information processing apparatus according to claim 1, wherein the generated database file includes a clip information file and a playlist file.

10. The information processing apparatus according to claim 1, wherein the data defined in the MMT format further includes a stream file configured of data to be reproduced comprising at least one of audio, visual, or subtitle data.

11. The information processing apparatus according to claim 1, wherein the at least one MMT-SI is generated in a MMT layer.

12. An information processing apparatus comprising:
a data processing part configured to reproduce data recorded in a non-transitory computer-readable information recording medium, wherein the information recording medium is configured to store data in which input data defined in a MMT format is recorded in a BDAV format, wherein the data processing part
acquires information recorded in a playlist file and a clip information file as database files defined in the BDAV format, and
generates a list of video-recorded contents, wherein the data processing part outputs data extracted from a plurality of signaling messages included in the input data defined in the MMT format as output data of the list of video-recorded contents, wherein the input data extracted from each signaling message of the plurality of signaling messages comprises at least one of notification information or control information, wherein the input data is extracted from the notification information or control information of each signaling message of the plurality of signaling messages recorded in the database files defined in the BDAV format in order to generate the output data defined in the MMT format, wherein the plurality of signaling messages include at least one MMT-SI and at least one TLV-SI defined in the MMT format, wherein the at least one TLV-SI is generated in a TLV layer, and wherein data processing part is implemented via at least one processor.

13. The information processing apparatus according to claim 12, wherein output data of the list of video-recorded contents is extracted from any of the tables:
(a) TLV network information table (TLV-NIT),
(b) Event information table (MH-EIT),
(c) Broadcaster information table (MH-BIT), and
(d) MMT package table (MPT), which are configuration data of MMT format data.

14. The information processing apparatus according to claim 12, wherein the non-transitory computer-readable information recording medium has a stream file storing MPEG-2TS format data therein and a stream file storing MMT format data therein as stream files storing data to be reproduced, and the data processing part reproduces a stream file storing MPEG-2TS format data therein and a stream file storing MMT format data therein by use of a playlist file and a clip information file defined in a BDAV format.

15. An information processing method performed in an information processing apparatus,
  wherein the information processing apparatus comprises a data processing part configured to input data defined in a MMT format and to generate data recorded in a BDAV format as a data recording format in a non-transitory computer-readable information recording medium,
  wherein the data processing part
    extracts data recorded in a plurality of signaling messages defined in the MMT format, and
    generates a database file including the data recorded in the BDAV format based on the extracted data defined in the MMT format,
  wherein the data defined in the MMT format, which is input to generate the data recorded in the BDAV format, includes the plurality of signaling messages, each signaling message comprising at least one of notification information or control information,
  wherein the data processing part extracts the data to be recorded in the database file defined in the BDAV format from the notification information or control information of each signaling message of the plurality of signaling messages included in the MMT format data in order to generate the database file,
  wherein the plurality of signaling messages include at least one MMT-SI and at least one TLV-SI defined in the MMT format,
  wherein the at least one TLV-SI is generated in a TLV layer, and
  wherein the data processing part is implemented via at least one processor.

16. A method for manufacturing a non-transitory computer readable information recording medium performed in an information processing apparatus,
  wherein the information processing apparatus comprises a data processing part configured to input data defined in a MMT format and to generate data recorded in a BDAV format as a data recording format in the non-transitory computer-readable information recording medium,
  wherein the data processing part
    extracts the data to be recorded in a plurality of signaling messages defined in the MMT format,
    generates a database file including the data recorded in the BDAV format based on the extracted data defined in the MMT format, and
    manufactures the non-transitory computer-readable information recording medium recording the database file therein,
  wherein the data defined in the MMT format, which is input to generate the data recorded in the BDAV format, includes the plurality of signaling messages, each signaling message comprising at least one of notification information or control information,
  wherein the data processing part extracts the data to be recorded in the database file defined in the BDAV format from the notification information or control information of the signaling message included in the MMT format data in order to generate the database file,
  wherein the plurality of signaling messages include at least one MMT-SI and at least one TLV-SI defined in the MMT format,
  wherein the at least one TLV-SI is generated in a TLV layer, and
  wherein the data processing part is implemented via at least one processor.

17. An information processing method performed in an information processing apparatus, wherein the information processing apparatus comprises a data processing part configured to reproduce data recorded in a non-transitory computer-readable information recording medium, the method comprising:
  storing data defined in a MMT format in the non-transitory computer-readable storage medium, wherein the MMT format data is recorded in a BDAV format;
  causing the data processing part to
    acquire information recorded in a playlist file and a clip information file as database files defined in the BDAV format, and
    generate a list of video-recorded contents; and
  outputting data extracted from a plurality of signaling messages included in the data defined in the MMT format as output data of the list of video-recorded contents,
  wherein the data extracted from each signaling message that is output comprises at least one of notification information or control information,
  wherein the data is extracted from the notification information or control information of each signaling message of the plurality of signaling messages recorded in the database files defined in the BDAV format in order to generate the output data defined in the MMT format,
  wherein the plurality of signaling messages include at least one MMT-SI and at least one TLV-SI defined in the MMT format, and
  wherein the at least one TLV-SI is generated in a TLV layer.

18. A non-transitory computer-readable storage medium having embodied thereon a program, which when executed by an information processing apparatus causes the information processing apparatus to perform an information processing method, the method comprising:
  inputting data defined in a MMT format, using a data processing part of the information processing apparatus;
  generating data recorded in a BDAV format as a data recording format in the non-transitory computer-readable storage medium; and
  causing the data processing part to extract data in a plurality of signaling messages defined in the MMT format and to generate a database file including the data recorded in the BDAV format based on the extracted data defined in the MMT format,
  wherein the data defined in the MMT format, which is input to generate the data recorded in the BDAV format, includes each signaling message comprising at least one of notification information or control information,
  wherein the data to be recorded in the database file defined in the BDAV format is extracted from the notification information or control information of each signaling message of the plurality of signaling messages included in the MMT format data in order to generate the database file,
  wherein the plurality of signaling messages include at least one MMT-SI and at least one TLV-SI defined in the MMT format, and
  wherein the at least one TLV-SI is generated in a TLV layer.

19. A non-transitory computer-readable storage medium having embodied thereon a program, which when executed by an information processing apparatus causes the information processing apparatus to perform an information processing method, the method comprising:

reproducing data recorded in the non-transitory computer-readable storage medium, using a data processing part of the information processing apparatus;

storing data defined in a MMT format in the non-transitory computer-readable storage medium, wherein the MMT format data is recorded in a BDAV format;

causing the data processing part to acquire information recorded in a playlist file and a clip information file as database files defined in the BDAV format and to generate a list of video-recorded contents; and outputting data extracted from a plurality of signaling messages included in the data defined in the MMT format as output data of the list of video-recorded contents, wherein the data extracted from each signaling message that is output comprises at least one of notification information or control information, wherein the data is extracted from the notification information or control information of each signaling message of the plurality of signaling messages recorded in the database files defined in the BDAV format in order to generate the output data defined in the MMT format, wherein the plurality of signaling messages include at least one MMT-SI and at least one TLV-SI defined in the MMT format, and wherein the at least one TLV-SI is generated in a TLV layer.

* * * * *